United States Patent
Fisher

(10) Patent No.: US 7,599,678 B2
(45) Date of Patent: Oct. 6, 2009

(54) PROCESSOR FOR A PASSIVE RANGER

(76) Inventor: Daniel E. Fisher, 40452 Hickory Ridge Pl., Aldie, VA (US) 20105

(*) Notice: Subject to any disclaimer, the term of this patent is extended or adjusted under 35 U.S.C. 154(b) by 0 days.

(21) Appl. No.: 11/808,145

(22) Filed: Jun. 7, 2007

(65) Prior Publication Data

US 2007/0238428 A1 Oct. 11, 2007

Related U.S. Application Data

(63) Continuation-in-part of application No. 09/696,956, filed on Oct. 27, 2000, now Pat. No. 7,231,197, and a continuation-in-part of application No. 11/802,604, filed on May 24, 2007.

(51) Int. Cl.
*H04B 1/26* (2006.01)
(52) U.S. Cl. .............. 455/323; 455/67.16; 455/207; 342/156; 342/407
(58) Field of Classification Search .......... 455/207, 455/323, 214, 314, 334, 456.5, 456.6, 424, 455/425, 550.1, 561, 575.1, 137, 164.2, 132, 455/182.2, 277.1, 192.1, 182.1, 180.3, 456.1, 455/265, 209, 256, 190.1, 272.1, 276.1, 67.16; 342/113, 44, 104, 424, 378, 179, 194, 100, 342/353, 458, 461–465, 450, 445, 442, 107, 342/420, 444, 449, 418, 84, 110, 147, 146, 342/156.9, 357, 8, 417, 428; 343/450, 445, 343/424, 394, 402, 405, 113 R; 375/97, 375/75

See application file for complete search history.

(56) References Cited

U.S. PATENT DOCUMENTS

| | | | |
|---|---|---|---|
| 3,090,957 A | | 5/1963 | Albanese et al. |
| 3,392,390 A | | 7/1968 | Schelisch |
| 3,680,124 A | * | 7/1972 | Stone et al. .............. 342/424 |
| 3,697,997 A | | 10/1972 | Cooper |
| 3,766,556 A | * | 10/1973 | Amoroso, Jr. ............ 342/156 |
| 3,789,410 A | | 1/1974 | Smith et al. |

(Continued)

FOREIGN PATENT DOCUMENTS

EP    01 30 9018    4/2002

OTHER PUBLICATIONS

*Radar Handbook*, Merrill Skolnik, Editor in Chief, 2$^{nd}$ Ed., p. 7.72, 1990, McGraw-Hill Pub.

*Primary Examiner*—Duc Nguyen
*Assistant Examiner*—Charles Chow

(57) ABSTRACT

A receiver includes an RF bridge and a processor coupled to the RF bridge to receive an information signal from the RF bridge. The processor includes a clock source and a processor front end. The processor front end includes first and second frequency sources, a processor down converter and an analog to digital converter. The first frequency source generates a reference signal based on a signal from the clock source. The reference signal is coupled to the RF bridge. The second frequency source generates a first local oscillator signal based on the signal from the clock source. The processor down converter heterodynes the first local oscillator signal and the information signal. The analog to digital converter is coupled to the processor down converter and provides a digitized down converted signal.

25 Claims, 26 Drawing Sheets

U.S. PATENT DOCUMENTS

| | | | |
|---|---|---|---|
| 3,816,834 A * | 6/1974 | Wilson | 342/424 |
| 4,245,220 A | 1/1981 | Johnson | |
| 4,481,519 A * | 11/1984 | Margerum | 342/434 |
| 4,509,052 A | 4/1985 | Cash | |
| 4,546,354 A * | 10/1985 | Boles | 342/179 |
| 4,704,613 A | 11/1987 | Albanese et al. | |
| 4,717,916 A | 1/1988 | Adams et al. | |
| 4,845,502 A | 7/1989 | Carr et al. | |
| 4,876,549 A | 10/1989 | Masheff | |
| 4,893,266 A * | 1/1990 | Deem | 708/405 |
| 4,893,316 A | 1/1990 | Janc et al. | |
| 4,903,030 A | 2/1990 | Maitre | |
| 4,942,404 A | 7/1990 | Kefer | |
| 5,107,522 A | 4/1992 | Kitayama et al. | |
| 5,255,000 A | 10/1993 | Puzzo | |
| 5,355,767 A | 10/1994 | Moria | |
| 5,369,790 A * | 11/1994 | Yokota | 455/164.1 |
| 5,416,446 A | 5/1995 | Holler et al. | |
| 5,448,245 A * | 9/1995 | Takase | 342/195 |
| 5,469,173 A * | 11/1995 | Skudera, Jr. | 342/202 |
| 5,541,608 A * | 7/1996 | Murphy et al. | 342/442 |
| 5,805,200 A * | 9/1998 | Counselman, III | 342/357.08 |
| 5,812,523 A * | 9/1998 | Isaksson et al. | 370/208 |
| 5,982,819 A * | 11/1999 | Womack et al. | 375/316 |
| 5,991,273 A * | 11/1999 | Abu-Dayya | 370/252 |
| 6,047,192 A * | 4/2000 | Maloney et al. | 455/456.2 |
| 6,229,844 B1 * | 5/2001 | Kong | 375/150 |
| 6,268,829 B1 * | 7/2001 | Weckstrom | 342/418 |
| 6,313,795 B1 * | 11/2001 | Herrmann et al. | 342/442 |
| 6,330,452 B1 * | 12/2001 | Fattouche et al. | 455/456.1 |
| 6,452,986 B1 * | 9/2002 | Luxford et al. | 375/343 |
| 6,677,862 B1 * | 1/2004 | Houlihane et al. | 340/870.03 |
| 6,898,235 B1 * | 5/2005 | Carlin et al. | 375/219 |
| 7,317,698 B2 * | 1/2008 | Jagger et al. | 370/328 |
| 2006/0250296 A1 * | 11/2006 | Focke et al. | 342/70 |

\* cited by examiner

PROCESSOR FOR A PASSIVE RANGER

This application is a continuation-in-part application and claims the priority benefit of Ser. No. 09/696,956 filed on Oct. 27, 2000 now U.S. Pat. No. 7,231,197 and is a continuation-in-part application and claims the priority benefit of Ser. No. 11/802,604 filed on May 24, 2007.

BACKGROUND OF THE INVENTION

1. Field of the Invention

The present invention relates to a processor for an angle rate interferometer and passive ranger.

2. Description of Related Art

U.S. Pat. No. 3,090,957 to Albanese et al. describes an aircraft guiding system for landing aircraft at airports that uses a phase rate interferometer homing system based upon signals received by two spaced apart antennas on an aircraft. U.S. Pat. No. 3,789,410 to Smith et al. describes a passive ranging technique based upon a rate of change of in phase difference between two signals received by widely separated pairs of antennas on an aircraft. U.S. Pat. No. 4,704,613 to Albanese et al. describes a phase-rate interferometer passive ranging system based upon signals received at two spaced apart antennas on an aircraft. All of these known systems rely on a significantly long observation interval.

When attempting to range on an emitting radar, the radar is seldom emitting a steady beacon for a significantly long observation interval. In fact, often such emitting radars are emitting for only a short time duration to avoid detection or other reasons. The short time duration is in the order of a hundred milliseconds or so. As will be discussed herein, the frequency difference observed by two spaced apart antennas at desired ranges are often in the order of only a few Hertz in the desired ranges (about 20 kilometers). To achieve desired range accuracies (about 20% of range), it is necessary to not only measure the frequency difference, but also to measure the frequency difference very accurately. An improved approach is needed to achieve accurate enough measurements of phase rate in just a hundred milliseconds or less.

SUMMARY OF THE INVENTION

An embodiment of a receiver includes an RF bridge and a processor coupled to the RF bridge to receive an information signal from the RF bridge. The processor includes a clock source and a processor front end. The processor front end includes first and second frequency sources, a processor down converter and an analog to digital converter. The first frequency source generates a reference signal based on a signal from the clock source. The reference signal is coupled to the RF bridge. The second frequency source generates a first local oscillator signal based on the signal from the clock source. The processor down converter heterodynes the first local oscillator signal and the information signal. The analog to digital converter is coupled to the processor down converter and provides a digitized down converted signal.

An embodiment of a method includes generating a reference signal, an information signal and a first local oscillator signal. The method further includes heterodyning and sampling. The generating of a reference signal generates the reference signal based on a signal from a clock source. The reference signal is coupled to an RF bridge. The generating of an information signal generates the information signal in the RF bridge based on the reference signal with a frequency difference modulated thereon. The frequency difference is a difference between frequencies of first and second RF signals received at respective first and second antennas. The generating of a first local oscillator signal generates the first local oscillator signal based on the signal from the clock source. The heterodyning heterodynes the first local oscillator signal and the information signal to provide a heterodyned signal. The sampling samples the heterodyned signal in an analog to digital converter to provide a digitized down converted signal.

BRIEF DESCRIPTION OF DRAWINGS

The invention will be described in detail in the following description of preferred embodiments with reference to the following figures.

DETAILED DESCRIPTION OF PREFERRED EMBODIMENTS

Figure 1:
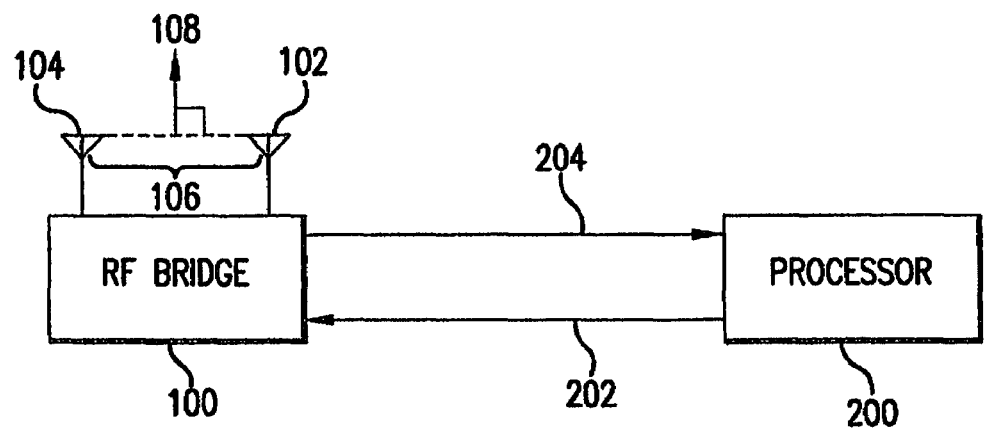
FIG. 1 is a block diagram of a first embodiment of the present invention.

In FIG. 1, an RF angle rate interferometer is constituted by a receiver that includes RF bridge 100 coupled to processor 200. RF bridge 100 receives two signals at respective antennas 102 and 104. Antennas 102 and 104 are spaced apart at opposite ends of baseline 106 of length d. Each antenna preferably, but not necessarily, has a broad beam pattern (e.g., 10 or more degrees), and each beam pattern is oriented to be generally directed toward direction 108 defined perpendicular to baseline 106.

RF bridge 100 receives, at both antennas, an emitter signal from a single emitter that is a distance away from the antennas. When the baseline is rotating with respect to a line of sight to the emitter, the signals received at the antennas have different frequencies. A frequency difference between frequencies of the signals received at antennas 102 and 104 is proportional to an angle rate of rotation of direction 108 with respect to the line of sight to the emitter.

Processor 200 provides processor reference signal 202. Processor reference signal 202 is an 8 MHz signal in the example discussed herein, but may be of a greater or lesser frequency. RF bridge 100 produces an information signal that has the frequency difference between the frequencies of signals received at antennas 102 and 104 frequency modulated onto processor reference signal 202. In FIG. 1, processor 200 receives the information signal as processor input signal 204. Processor 200 then computes this frequency difference and the corresponding angle rate of rotation.

Figure 2:
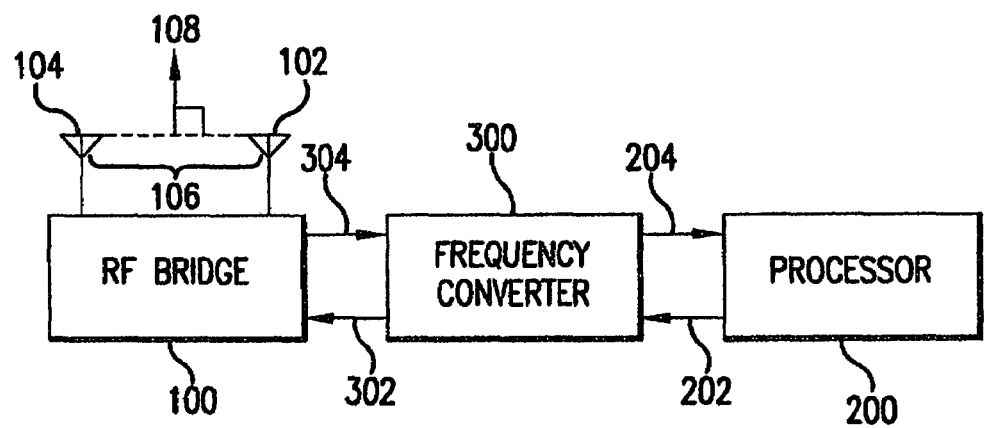
FIG. 2 is a block diagram of a second embodiment of the present invention.

In FIG. 2, an RF angle rate interferometer is constituted by a receiver that includes RF bridge 100 coupled through frequency converter 300 to processor 200. Frequency converter 300 up converts (heterodynes up) processor reference signal 202 by a predetermined intermediate frequency step to form intermediate reference signal 302. In the example discussed herein the frequency step is 792 MHz so that intermediate reference signal 302 has a frequency of 800 MHz. In FIG. 2, RF bridge 100 produces an information signal that has the frequency difference between the frequencies of signals received at antennas 102 and 104 frequency modulated onto intermediate reference signal 302. Frequency converter 300 also down converts (heterodynes down) the information signal (intermediate input signal 304) produced by RF bridge 100 by the predetermined intermediate frequency step (in the example discussed herein, 792 MHz) to form a down converted information signal that is used as processor input signal 204. In the example discussed herein, the down converted information signal that is used as processor input signal 204 is a signal having a frequency of 8 MHz plus any measured frequency difference between signals received at antennas 102 and 104. Processor 200 then computes this frequency difference and the corresponding angle rate of rotation.

The choice between the receiver of FIG. 1 and the receiver of FIG. 2 is at least in part governed (1) by available filter technology for filter 130 that is included in RF bridge 100 (see FIG. 3) at the required frequencies, and (2) by the ratio of the frequency of processor reference signal 202 to the frequency range of the emitter signal: either a range over a band or instantaneous range. This tradeoff will be explained in greater detail after the internal circuitry of RF bridge 100 is described.

Figure 3:
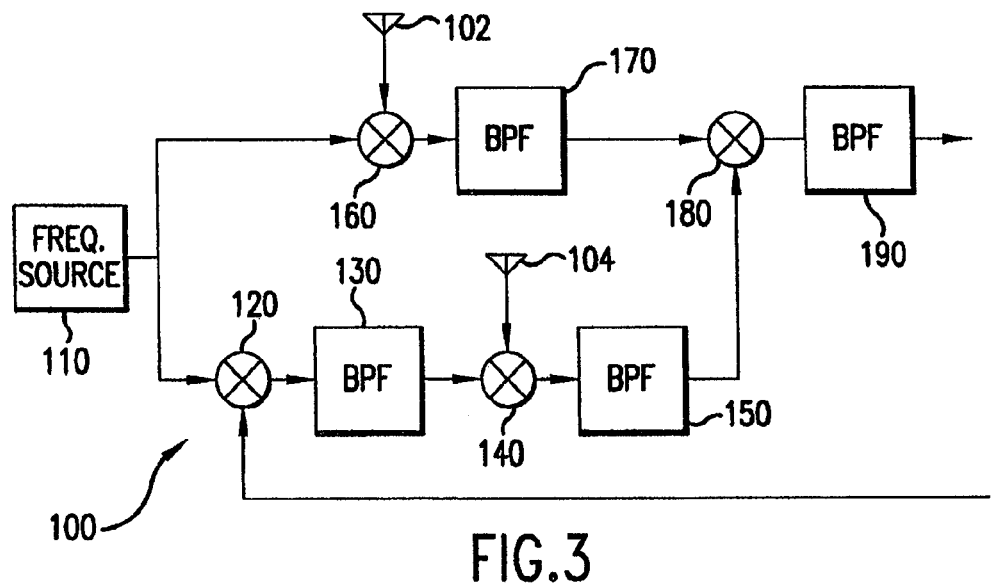
FIG. 3 is a block diagram of an RF bridge of the present invention.

In FIG. 3, RF bridge 100 includes frequency source 110, mixers 120, 140, 160 and 180 and filters (preferably bandpass filters) 130, 150, 170 and 190. Frequency source 110 is a single frequency source providing a mixer pump signal that is either fixed at a predetermined frequency or tunable over a narrow band or a wide band of frequencies to a frequency that is fixed during the measurement interval.

Mixer 120 is preferably a single sideband (SSB) mixer that produces the upper sideband mixer result. To the extent present in the output of mixer 120, any part of the lower sideband signal, the pump signal or any other signal outside of the desired upper sideband is removed by filter 130. Mixer 120 and filter 130 produce a frequency shifted pump signal that is a replica of the pump signal from frequency source 110 replicated at an up converted frequency. The frequency shifted pump signal has a frequency higher than the frequency of the signal from frequency source 110 by the frequency of either processor reference signal 202 (FIG. 1) or intermediate reference signal 302 (FIG. 2).

Preferably, mixers 140 and 160 are single sideband (SSB) mixers that both produce the upper sideband mixer results. To the extent present in the outputs of mixers 140 and 160, any lower sideband signals, pump signals or other signals outside of the desired upper sideband are removed by filters 150 and 170, respectively.

Mixer 160 and filter 170 produce a signal that is a frequency shifted replica of the emitter signal received at antenna 102. The frequency shifted replica has a frequency that is higher than a frequency of the emitter signal received at antenna 102 by the frequency of the pump signal from frequency source 110.

Mixer 140 and filter 150 produce a signal that is a frequency shifted replica of the emitter signal received at antenna 104. The frequency shifted replica has a frequency that is higher than a frequency of the emitter signal received at antenna 104 by the frequency of the frequency shifted pump signal from mixer 120 and filter 130.

The signals from filters 150 and 170 are then combined in mixer 180. Mixer 180 is preferably, but not necessarily, a single sideband (SSB) mixer that produces the lower sideband mixer result. To the extent present in the output of mixer 180, any upper sideband signal or any other signal outside of the desired lower sideband is removed by filter 190 to provide the information signal from RF bridge 100.

U.S. Pat. No. 3,816,834 to Wilson describes a radio interferometer to provide an indication of the direction of a signal source, but not the angle rate. Wilson's high frequency oscillator 8 is roughly analogous to frequency source 110 depicted in present FIG. 3. Wilson's mixer 6, coupled to Wilson's antenna 4, is roughly analogous to frequency converter 160 coupled to antenna 102 depicted in present FIG. 3. Wilson's mixer 14, coupled to Wilson's antenna 5, is roughly analogous to frequency converter 140 coupled to antenna 104 depicted in present FIG. 3. However, Wilson's beat detector 31 and voltage controlled oscillator 16 are coupled between Wilson's high frequency oscillator 18 and Wilson's mixer 14.

In contrast, present frequency converter 120 and filter 130 are coupled between frequency source 110 and frequency converter 140 as depicted in present FIG. 3. Wilson's voltage controlled oscillator 16 is part of a phase locked loop (PLL) that includes beat detector 31, filter 33 and phase detector 35 as well as voltage controlled oscillator 16. The principal of Wilson's PLL is that frequency variations in the signal from Wilson's oscillator 16 are detected by Wilson's phase detector 35 and used to generate a D.C. Control Voltage to adjust Wilson's voltage controlled oscillator 16 to bring the frequency variation back into specified limits. However, such frequency variations are simply not suitable for the present application. A frequency variation of one Hz is more than the entirety of the frequency difference to be measured in many cases. Thus, a frequency variation of only one part (one Hertz) in a billion (1 GHz) would destroy the accuracy needed in the present application. At least for this reason, present frequency converter 120 and filter 130 are coupled between frequency source 110 and frequency converter 140 as depicted in present FIG. 3, and a reference signal is provided to frequency converter 120 by processor 200 (see present FIG. 1).

In a representative example of the receiver of FIG. 1 (the narrow band model), the emitter signal is a signal at 54 MHz, +/−2 MHz (approximately TV channel 2). The "instantaneous" frequency difference between the signal received at antenna 102 and the signal received at antenna 104 is a mere 1 Hertz. Frequency source 110 produces a single frequency signal at 72 MHz, and processor reference signal 202 is an 8 MHz signal. The output of filter 130 is a signal at an 80 MHz frequency. The outputs of filters 150 and 170 are signals centered at frequencies of 134 MHz and 126 MHz, respectively, with a bandwidth of about +/−2 MHz. The outputs of filters 150 and 170 are mixed in mixer 180 and filtered in filter 190. The output of filter 190 is the information signal applied as processor input signal 204, the information signal having a frequency equal to the sum of the approximately 1 Hertz frequency difference and 8 MHz from processor reference signal 202.

Signals from frequency source 110 and processor reference signal 202 are preferably spectrally pure. Typically, the frequency of processor reference signal 202 is based on a direct digital synthesizer, a frequency multiplied replica of a crystal oscillator, or a phase locked loop synthesizer. Filter 130 can be any narrow band filter (high Q filter) that operates in the frequency range (in this example, 80 MHz). For example, in a filter designed to pass a bandwidth of only 100 kHz, a Q of 800 would be required. Such filters include surface acoustic wave devices (SAW devices) and some ceramic resonators, but there are many alternatives.

Similarly, filters 150 and 170 are constructed from any narrow band filter (high Q filter) that operates in the desired frequency range (in this example, 134 and 126 MHz). Filters 150 and 170 are preferably designed to pass a bandwidth of 4 MHz (e.g., the +/−2 MHz frequency range of the emitter signal), and such filters may be implemented with surface acoustic wave devices (SAW devices) and some ceramic resonators, but there are many alternatives.

Filter 190 can be of an extremely high Q design since the signal bandwidth at the output of filter 190 is only a few Hz: +/−1 Hertz in this example. A Q of over 2 million could be used where such filters and resonators are available and can be trimmed accurately to the frequency of processor reference signal 202 (about 8 MHZ). Generally, a quartz crystal based filter will perform well in filter 190, but there are many alternatives.

Alternatively, in a representative example of the receiver of FIG. 2 (the wide band model), the emitter signal is a signal existing at a frequency anywhere from 3,000 MHz down to 2,520 MHz (a 480 MHz frequency range). In this example, the signal has a bandwidth of only +/−1 MHz (a bandwidth of 2 MHz), and the instantaneous frequency difference between the signals received at antenna 102 and at antenna 104 is still a mere 1 Hz. Frequency source 110 produces a signal (the pump signal) that can be tuned in frequency steps of 2 MHz starting at 3,825 MHz and stepping to 4,295 MHz (239 stepped frequencies). Processor reference signal 202 is an 8 MHz signal, and intermediate reference signal 302 is an 800 MHz signal. The output of filter 130 is a signal that is tuned in frequency steps of 2 MHz starting at 4,625 MHz and stepping to 5,095 MHz (239 stepped frequencies). Filters 150 and 170 are signals centered at frequencies of 7,620 MHz and 6,820 MHz, respectively, with a bandwidth of about +/−1 MHz. The outputs of filters 150 and 170 are mixed in mixer 180 and filtered in filter 190. The output of filter 190 is a signal having a frequency equal to the sum of the 1 Hertz frequency difference and 800 MHz from intermediate reference signal 302.

The signal from processor reference signal 202 and intermediate reference signal 302 are preferably spectrally pure. Typically, the frequencies of processor reference signal 202 and frequency source 310 (see FIG. 5) and indirectly intermediate reference signal 302 are based on a direct digital synthesizer, a frequency multiplied replica of a crystal oscillator, or a phase locked loop synthesizer. The signal from frequency source 110 is tunable over a range starting at 3,825 MHz and stepping to 4,295 MHz (239 stepped frequencies). At any stepped frequency, the signal is reasonably spectrally pure, at least to the extent achievable with a direct digital synthesizer or a phase locked loop synthesizer.

When implemented as a single filter, filter 130 requires a relatively flat frequency response over a frequency range from 4,620 MHz to 5,100 MHz and steep "skirts" (particularly on the lower frequency side) to reject any frequency component from the pump signal from frequency source 110. When frequency source 110 is tuned to the lower frequency end of its tuning range (i.e., 3,825 MHz in this example), there is a 795 MHz frequency gap between the pump signal and the lower frequency end of the bandpass of filter 130. However, when frequency source 110 is tuned to the upper frequency end of its tuning range (i.e., 4,295 MHz in this example), there is only a 325 MHz frequency gap between the pump signal and the lower frequency end of filter 130.

Removal of the pump signal from the output of filter 130 is desired in order to prevent the pump signal from leaking through mixer 120 and through filter 130 to mix with a strong, off frequency, signal picked up by antenna 104. The pump signal is removed by good isolation in single sideband mixer 120, by good band rejection by filter 130, or both. The filter "skirt" on the lower frequency end of the pass band may required to drop 30 dB in just 325 MHz on the 4,620 MHz end of the bandpass. This is a 30 dB drop in just 7% of the bandwidth. Such a single filter will require at least 14 "polls" to achieve. Present filter technologies in the 4,600 to 5,100 MHz region use various types of stripline filters, microstrip filters, waveguide filters, coax filters, and the like.

Dielectric resonator filters (DR filters) are promising in this frequency range, but DRs have such high Q values that many such separately tuned filters would be required to cover the 4,620 MHz to 5,100 MHz bandpass of filter 130. Preferably, 239 separately tuned DR filters (having a Q of about 1000) are tuned to the specific frequencies desired in the output of filter 130 when corresponding frequency steps are selected by frequency source 110. Hybrid filters can also be formed by combining DR filters and various types of stripline filters, microstrip filters, waveguide filters, coax filters, and the like.

Of course, there is no reason why filter 130 needs to be a single filter. Filter 130 may be constructed as several narrower band filters (e.g., 239 separately trimmed or tuned DR filters) with switching between the filters synchronized to the selection of frequency in frequency source 110.

Filters 150 and 170 are preferably constructed from DR filters (high Q filter) that operates in the desired frequency range (in this example, 7,620 and 6,820 MHz). In a filter designed to pass a bandwidth of 2 MHz (e.g., the +/−1 MHz frequency range of the emitter signal), a Q of about 1500 would be desired. Such filters include DR filters and some ceramic resonators, but there are many alternatives. Filter 190 can be of an extremely high Q design since the signal bandwidth at the output of filter 190 is only a few Hertz: 1 Hertz in this example. A Q of over 200 million could be used if such filter and resonator were available and could be trimmed accurately to the frequency of intermediate reference signal 302 (about 800 MHz in this example). Generally, a SAW based filter or a high Q DR filter will perform well in filter 190, but there are alternatives.

In the wide band example discussed with respect to FIG. 2, and due to the possibility of leakage of the pump signal (from frequency source 110) through mixer 120 and filter 130 into mixer 140, filter 130 is an important design issue. Requirements for this filter can be relaxed if the tunable bandwidth of frequency source 110 is made more narrow, or if intermediate reference signal 302 is made to have a higher frequency. In either case, the difference between the highest pump signal frequency and the lower frequency end of the pass band of filter 130 is widened which relaxes the requirement on the steepness of the filter "skirts" of filter 130.

Figure 4:
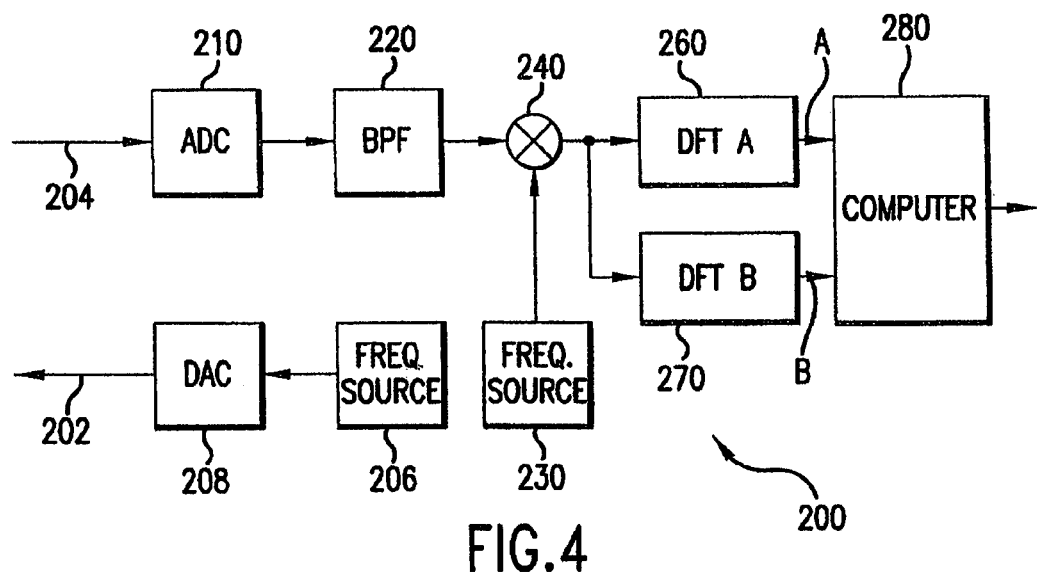
FIG. 4 is a block diagram of a processor of the present invention.

In FIG. 4, processor 200 includes digital frequency source 206 and digital to analog converter 208 (DAC 208) to produce processor reference signal 202. Collectively, frequency source 206 and DAC 208 constitute a direct digital synthesizer. In the examples discussed above, processor reference signal 202 is a spectrally pure 8 MHz signal. Processor 200 further includes analog to digital converter 210 (ADC 210) to received the down converted information signal (FIG. 2) or the information signal (FIG. 1) as processor input signal 204. In the examples discussed above, signal 204 is an 8 MHz signal onto which has been modulated a frequency difference signal, the frequency difference signal being the difference in frequency between the emitter signal received at antenna 102 and the emitter signal received at antenna 104. This frequency difference is typically of the order of 1 Hertz under the circumstances described in the examples herein.

In the examples discussed above, ADC 210 samples signal 204 at 16 MSPS (million samples per second). Each sample is preferably a complex sample with a 12 to 14 bit resolution for each complex part, and the output is filtered through digital bandpass filter 220. Filter 220 removes any bias or offset (dc offset) that may appear in physical realizations of ADC 210. An example of filter 220 is described in more detail below. The sampling process of ADC 210 may fold out-of-band frequencies into the desired frequency band of ADC 210 in a process called aliasing. To avoid undesired alias frequencies being processed, either filter 190 (FIG. 3, discussed above) or filter 350 (discussed with respect to FIG. 5) is carefully designed to include the anti-aliasing filter function (i.e., removing frequencies that might be aliased into the desired frequency band).

In FIG. 4, digital frequency source 230 provides a "local oscillator" signal having a frequency that is the sum the frequency of processor reference signal 204 and an offset frequency. In the example discussed herein, the offset frequency is 64 Hz. The "local oscillator" signal is in digital form. Preferably, the "local oscillator" signal is a sinusoidal wave represented by complex digital numbers at a predetermined sample rate that matches the sample rate at the output of filter 220. In the present example, ADC 210 samples its input signal at 16 MSPS (million samples per second) and filter 220 filters the signal using a 16 MHz clock frequency to process the 16 MSPS from ADC 210 through filter 220. The "local oscillator" signal is a digitally sampled 8 MHz sinusoidal wave that is sampled at 16 MSPS. Preferably, all digital representations of the various signals are complex numbers.

The offset frequency discussed above is 64 Hz in this example. The weight signals for DFT A and DFT B are sinusoidal signals at frequencies above and below this offset frequency. DFTs A and B are discussed in more detail below. In FIG. 4, mixer 240 mixes the "local oscillator" signal from frequency source 230 with the information signal in digital form as processed through filter 220 (e.g., carried on an offset frequency subcarrier). Mixer 240 preferably includes a single sideband mixer that provides the lower sideband result. The digital signal produced by mixer 240 has the difference signal (i.e., a signal at a frequency that is the difference between the frequency of signals received at antennas 102 and 104) modulated on the offset signal subcarrier (the difference between frequencies produced by frequency sources 206 and 230), a 64 Hz signal in this example. The difference signal has a frequency that varies from zero to about +/−1 Hz in this example or to as much as +/−5 Hz difference between emitter signals received at antennas 102 and 104.

The digital signal produced by mixer 240 is processed by discrete Fourier Transforms 260 and 270 (DFTs 260 and 270). DFT 260 uses a weight signal at 96 Hz in this example, and DFT 270 uses a weight signal at 32 Hz in this example. Accumulators within DFT 260 are reset at the beginning of a DFT integration time period and then allowed to accumulate over the DFT integration time period. At the end of the DFT integration time period; computer 280 samples the accumulator of DFT 260 (output denoted A) and the accumulator of DFT 270 (output denoted B). Computer 280 computes the frequency difference between frequencies of the signals received at antennas 102 and 104 and multiplies this by a constant to determine the angle of rotation of direction 108 (FIG. 1) since the frequency difference is proportional to an angle rate of rotation with respect to the line of sight to the emitter.

Figure 5:
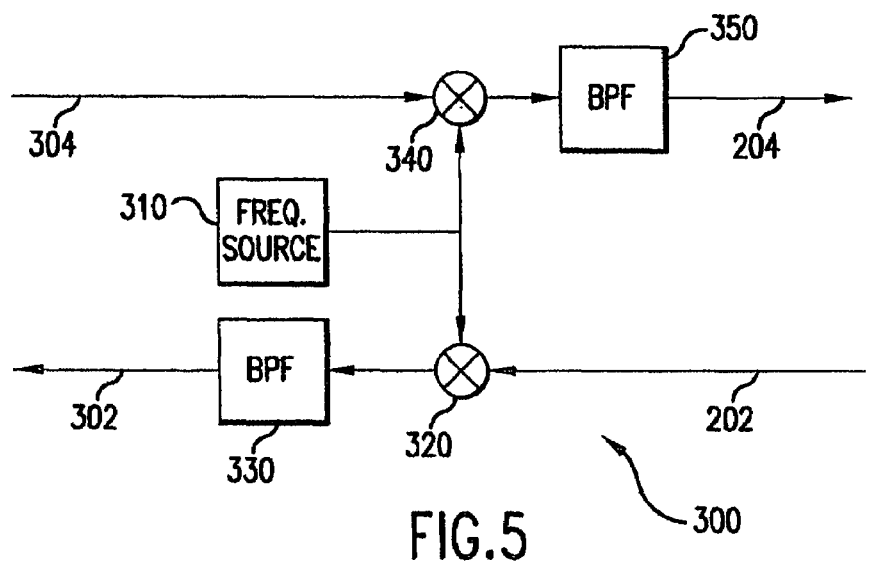
FIG. 5 is a block diagram of a frequency converter of the present invention.

In FIG. 5, frequency converter 300 includes common frequency source 310 to provide a reference signal for both up conversion and down conversion. Frequency converter 300 also includes mixer 320 (preferably an upper sideband single sideband mixer) and bandpass filter 330 that together comprise an up converter. Frequency converter 300 also includes mixer 340 (preferably a lower sideband single sideband mixer) and bandpass filter 350 that together comprise a down converter. In an example discussed above, frequency source 310 provides a 792 MHz "local oscillator" signal to pump both mixers 320 and 340, and processor reference signal 202 is provided as an 8 MHz signal. Intermediate reference signal 302 is therefore produced as an 800 MHz signal. Information signal 304 is a signal having a frequency of about 800 MHz plus a small frequency difference. Down converted information signal 204 is therefore produced as an 8 MHz signal with the small frequency difference frequency modulated thereon.

Figure 6:
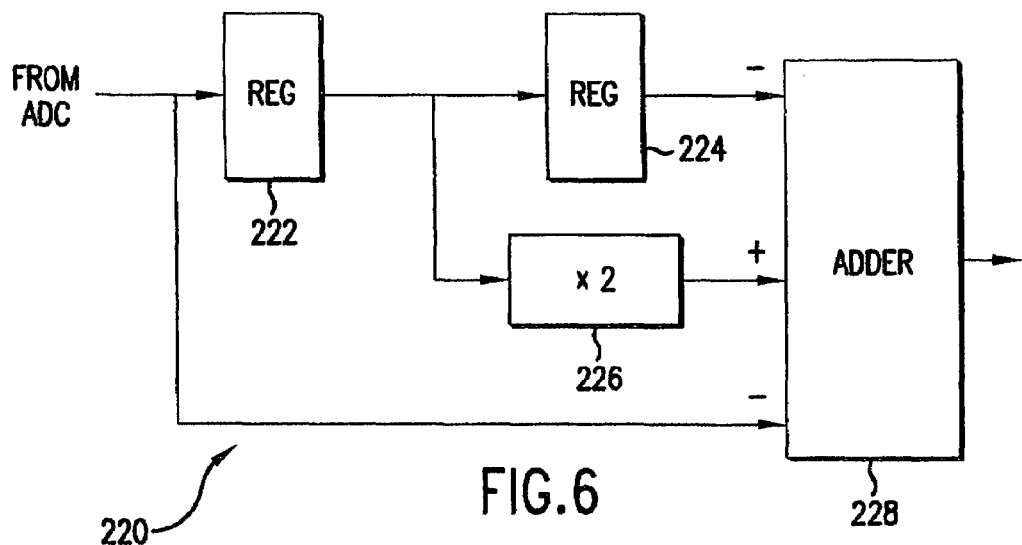
FIG. 6 is a block diagram of a digital filter of the present invention.

In FIG. 6, exemplary filter 220 includes a digital delay line that includes series connected registers 222 and 224 as well as shift circuit 226 (to be used as a multiply by two circuit) and adder 228. The registers are "clocked" at the same sample rate as used to clock ADC 210. The connection between registers 222 and 224 is also connected to multiply by two circuit 226.

Actually, this is just a shift of one place in the data at the connection between registers 222 and 224. Then, the outputs from registers 222 and 224 are made negative and added to the output of shift circuit 226 in adder 228.

A Fourier Transform of arbitrary signal f(t) is defined to be F(T). Let signal f(t) be the output of register 222. The output of register 224 would then be given by $f(t-t_0)$ where to is the clocking repeat interval, in this example, the inverse of 16 MSPS. Similarly, the input to register 222 (the output of ADC 210) is given by $f(t+t_0)$. The Fourier Transform of the input to register 222 and the output of register 224 would be given by $F(T)e^{-jTt0}$ and $F(T)e^{+jTt0}$, respectively. The sum of $F(T)e^{-jTt0}$ and $F(T)$ and $F(T)e^{+jTt0}$ is $[1-\cos(Tt_0)]$. Thus, the transfer function of filter 220 has a peak when $Tt_0=B$ and is zero when $Tt_0=2$ B or zero. Since in this example, T=2 B times 8 MHz, and $t_0$=the inverse of 16 MSPS, the peak of the transfer function is at 8 MHz and there is zero transfer at dc. This will remove any dc bias that may exist in the output signal from ADC 210. Persons skilled in the art will appreciate in light of these teachings that other digital filters may be used as filter 220.

Processor 200 is preferably a digital signal processor coupled to a general purpose computer. However, processor 200 may be implemented out of discrete digital multipliers, adders and the like, or integrated together on a custom circuit such as an application specific integrated circuit (ASIC). In any event, performing digital processing at 16 MSPS consumes processing capacity, and where permitted, it is desirable to minimize the processing capacity required. This is generally performed by down sampling.

One way to down sample is to use an "integrate and dump" filter. For example, two consecutive input samples at 16 MSPS are added together and then the sum is output once. Then, the next two input samples are added together and output once, and so forth. In this example, the output of the "integrate and dump" filter would be a sequence of samples at 8 MSPS (i.e., the Nyquist rate for complex sampling of an 8 MHZ signal).

Figure 7:
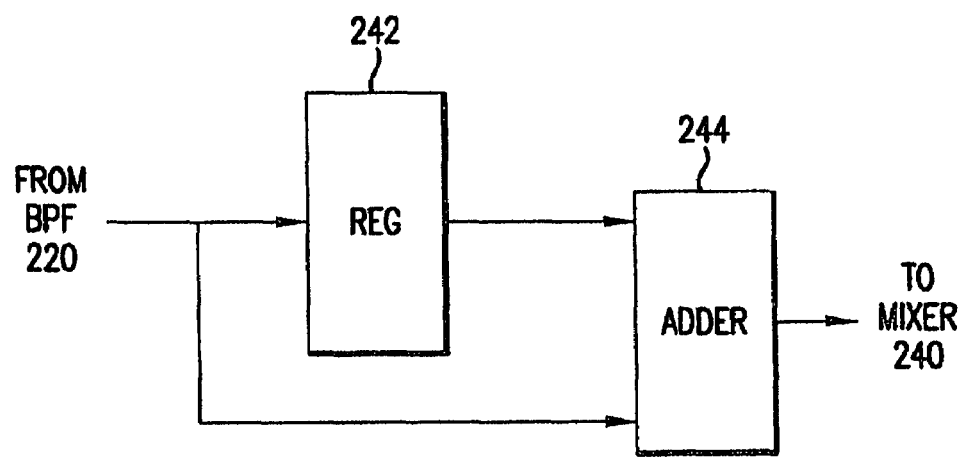
FIG. 7 is a block diagram of a down sample circuit of the present invention.

In FIG. 7, an integrate and dump filter is preferably, but not necessarily, coupled between filter 220 and mixer 240. The signal from filter 220, in the form of a sequence of complex numbers at 16 MSPS, is applied to both register 242 and a first input of complex adder 244. Register 242 is clocked at 16 MSPS in this example so that the output of register 242 is a delayed replica of the signal at its input. The delay is one clock period or the inverse of 16 MSPS in this example. The output of register 242 is applied to a second input of complex adder 244. The additive sum from complex adder 244 is sampled at only 8 MSPS (i.e., a 2:1 down sample). In operation, register 242 operates as a delay line where the delay is the inverse of the clock rate or the inverse of 16 MSPS in this example. This process combines the 16 MSPS samples in pairs and reports out an average of the pair of the two samples that makes up the pair.

Figure 8:
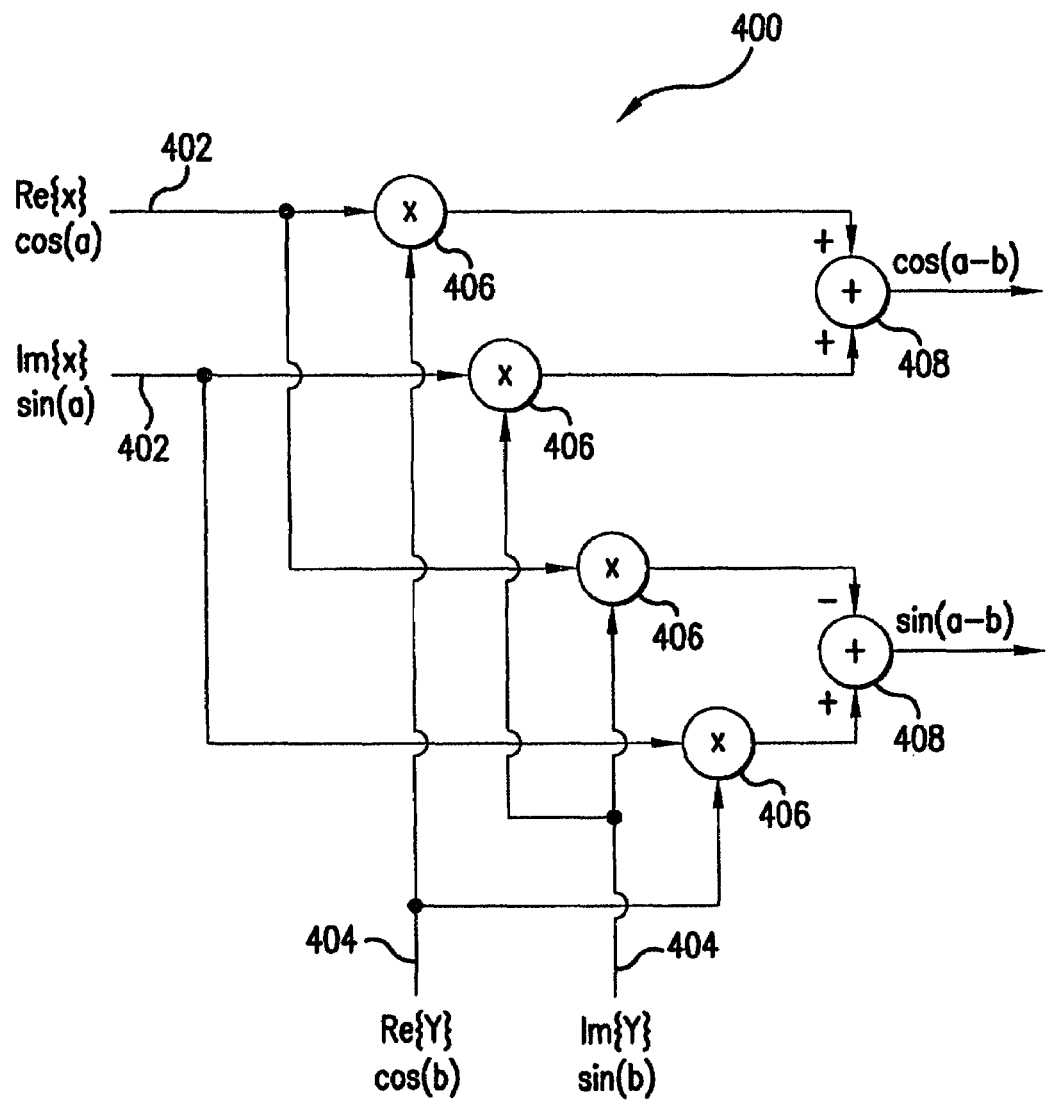
FIG. 8 is a block diagram of a single sideband frequency converter of the present invention.

In FIG. 8, single sideband down converter 400 is one possible implementation of mixer 240 of FIG. 4. Down converter 400 includes four identical real-by-real multipliers 406A, 406B, 406C and 406D and two identical real adders 408A and 408B. Adder 408A adds the signals from multipliers 406A and 406B as indicated in FIG. 8. However, adder 408B subtracts the signal from multiplier 406C from the signal from multiplier 406D as indicated in FIG. 8.

Down converter 400 mixes a first input signal X on inputs lines 402 with a second input signal Y on input lines 404, both complex numbers. The real component of signal X is Re{X} and the imaginary component of signal X is Im{X}. X may be represented by:

$$X=\cos(a)+j\sin(a) \quad (1)$$

where $\cos(a)=\text{Re}\{X\}$ and $\sin(a)=\text{Im}\{X\}$. Similarly, the real component of signal Y is Re{Y} and the imaginary component of signal Y is Im{Y}. Y may be represented by:

$$Y=\cos(b)+j\sin(b) \quad (2)$$

where $\cos(b)=\text{Re}\{Y\}$ and $\sin(b)=\text{Im}\{Y\}$.

Signal X on input lines 402 is the signal from filter 220 sampled at 16 MSPS (or the signal from the down sampler of FIG. 7 at 8 MSPS). Signal Y on input lines 404 is the signal from frequency source 230 sampled at 16 MSPS (or 8 MSPS depending on the sample rate of the signal on input lines 402). The combined output of down converter 400 provides cos(a−b) as the output from adder 408A and provides sin(a−b) as the output from adder 408B. Down converted signal Z is then given by:

$$Z=\cos(a-b)+j\sin(a-b). \quad (3)$$

When down converter 400 is used as mixer 240, the output of mixer 240 has a frequency that is the difference between the frequency of the signal from filter 220 sampled at 16 MSPS, if no down sampling is used (or the signal from the down sampler of FIG. 7 at 8 MSPS, if down sampling used), and the "local oscillator" signal from frequency source 230 (see FIG. 4). As discussed above, the "local oscillator" signal has a frequency equal to the frequency of signal 204 plus the offset frequency. In the examples discussed herein, the frequency of signal 204 is 8 MHz and the offset frequency is 64 Hz. The output signal from mixer 240 has the frequency of the offset frequency plus any frequency deviation caused by the difference in the frequencies of the signals received by antennas 102 and 104. It is this small frequency deviation that is to be measured.

Figure 9:
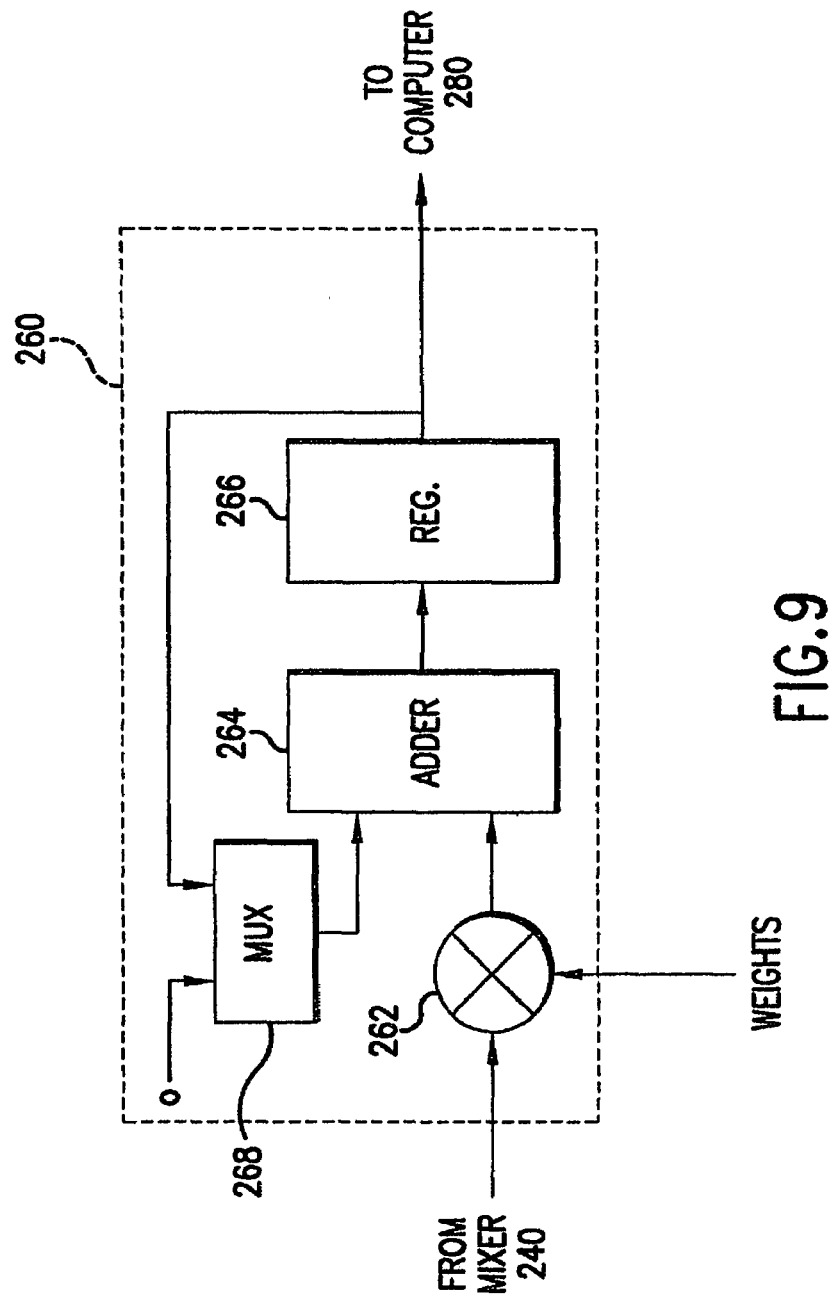
FIG. 9 is a block diagram of a Fourier Transformer of the present invention.

In FIG. 9, DFT 260 includes complex-by-complex multiplier 262, complex adder 264, accumulation register 266 and multiplexer 268. The signal from mixer 240 is multiplied by a weight (from frequency source 230) in multiplier 262. During the first clock period of an integration interval, multiplexer 268 is set to provide zero to adder 264, and the complex product from multiplier 262 is passed unchanged through adder 264 and set into register 266. During subsequent clock periods of the integration interval, multiplexer 268 is set to provide the value stored in register 266 to a first input of adder 264, and the complex product from multiplier 262 is provided to the second input of adder 264 to be added to the complex value from register 266. The complex sum from adder 264 is then stored in register 266 for the next clock period.

With this arrangement, the weighted signal from mixer 240 is accumulated in register 266. At the end of the integration interval, computer 280 samples the output of register 266 as a discrete Fourier Transform of the signal from mixer 240 at a frequency defined by the weight signal. The weight signal is a sequence of digital numbers representing a sinusoidal wave at the center frequency of the discrete Fourier Transform. Referring to FIG. 4, DFT 260 is preferably tuned to have a center frequency of 32 Hz and output complex accumulated value A at the end of the integration interval. DFT 270 is preferably tuned to have a center frequency of 96 Hz and output complex accumulated value B at the end of the integration interval. The Fourier Transforms developed at these center frequencies evenly bracket the offset frequency (64 Hz in this example).

Computer 280 determines the actual frequency difference between frequencies of the signals received at antennas 102 and 104. Denote the DFT integration time interval as T. A discrete Fourier Transform (DFT) using a weighting function of frequency $\omega_0+\delta\omega$ (DFT 260, FIG. 4) produces a Fourier Transform value A of:

$$\frac{\sin(\omega - \omega_0 - \delta\omega)}{(\omega - \omega_0 - \delta\omega)} \quad (4)$$

where $\omega_0$ is the offset frequency ($2\pi$ times 64 Hz in this example) and $\delta\omega$ is a displacement ($2\pi$ times 32 Hz in this example) of the DFT center frequency from the offset frequency. A discrete Fourier Transform (DFT) using a weighting function of frequency $\omega_0-\delta\omega$ (DFT 270) produces a Fourier Transform value B of:

$$\frac{\sin(\omega - \omega_0 + \delta\omega)}{(\omega - \omega_0 + \delta\omega)} \quad (5)$$

Set $\delta\omega$ equal to $\pi/(2\,T)$ where T is the accumulation interval. The above example discussed with respect to FIG. 3 assumes that $\delta\omega$ is $2\pi$ times 32 Hz and that $\delta\omega$ is $2\pi$ times 64 Hz. Therefore, T in seconds is $\pi/64$ or about 49 milliseconds. With the integration time T related to $\delta\omega$ in this way, it can be shown that the actual frequency difference between frequencies of the signals received at antennas 102 and 104 is given by:

$$\omega - \omega_0 = \frac{\pi(A-B)}{2T(A+B)} \quad (6)$$

where A is the accumulated output of DFT 260 and B is the accumulated output of DFT 270.

Figure 10:
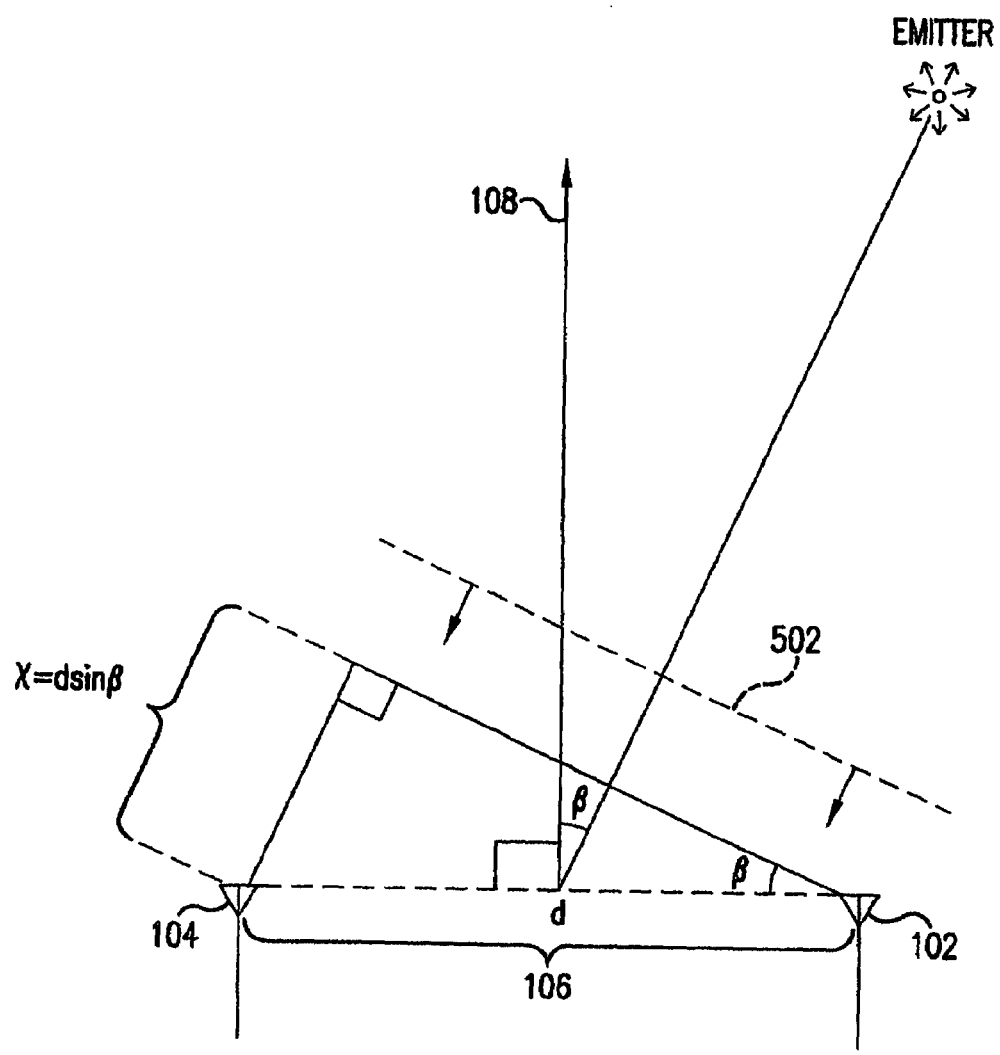
FIG. 10 is a schematic diagram of a static plan view of the geometry of the angle rate interferometer of the present invention.

In FIG. 10, antennas 102 and 104 are spaced apart over baseline 106 by length d. Baseline 106 is perpendicular to direction 108, and direction 108 forms angle $\beta$ with a line of sight from baseline 106 to the EMITTER. The EMITTER is at such a great distance that wavefront 502 from the EMITTER appears as a straight line that intersects baseline 106 at angle $\beta$. In FIG. 10, antenna 102 is closer to the EMITTER than antenna 104 by distance $x=d\sin\beta$. The electrical phase change over distance x is given by $\theta=[2\pi/\lambda]x=[2\pi/\lambda]d\sin\beta$ where $\lambda$ is the wavelength of the signal from the EMITTER. Computing the time derivative of $\theta$ where $\beta$ also varies with time results in:

$$\dot\theta = \omega - \omega_0 = \frac{2\pi}{\lambda}d\cos(\beta)\dot\beta \quad (7)$$

Here, the time rate of change of $\theta$ (i.e., $d\theta/dt$) is the frequency difference (in radians per second) observed between the signal received at antenna 102 and the same signal received at antenna 104 (i.e., $\omega-\omega_0$).

Computer 280 (FIG. 4) receives an input of $\lambda$, $\beta$ and d from some outside source. For example, d is a predetermined constant for a given design. Wavelength $\lambda$ is a constant to which the system was designed (e.g., a single frequency narrow band system), a parameter selected based on the frequency selected by frequency source 110 of FIG. 3 (e.g., a multi frequency stepped wide band system) or a parameter measured by an intercept receiver. Angle $\beta$ is an angle measured by an associated angle interferometer or a monopulse angle discriminator (similar to an automatic direction finder). With $\lambda$, $\beta$ and d known and $d\theta/dt$ measured as $\omega-\omega_0$, computer 280 can compute $d\beta/dt$.

Figure 11:
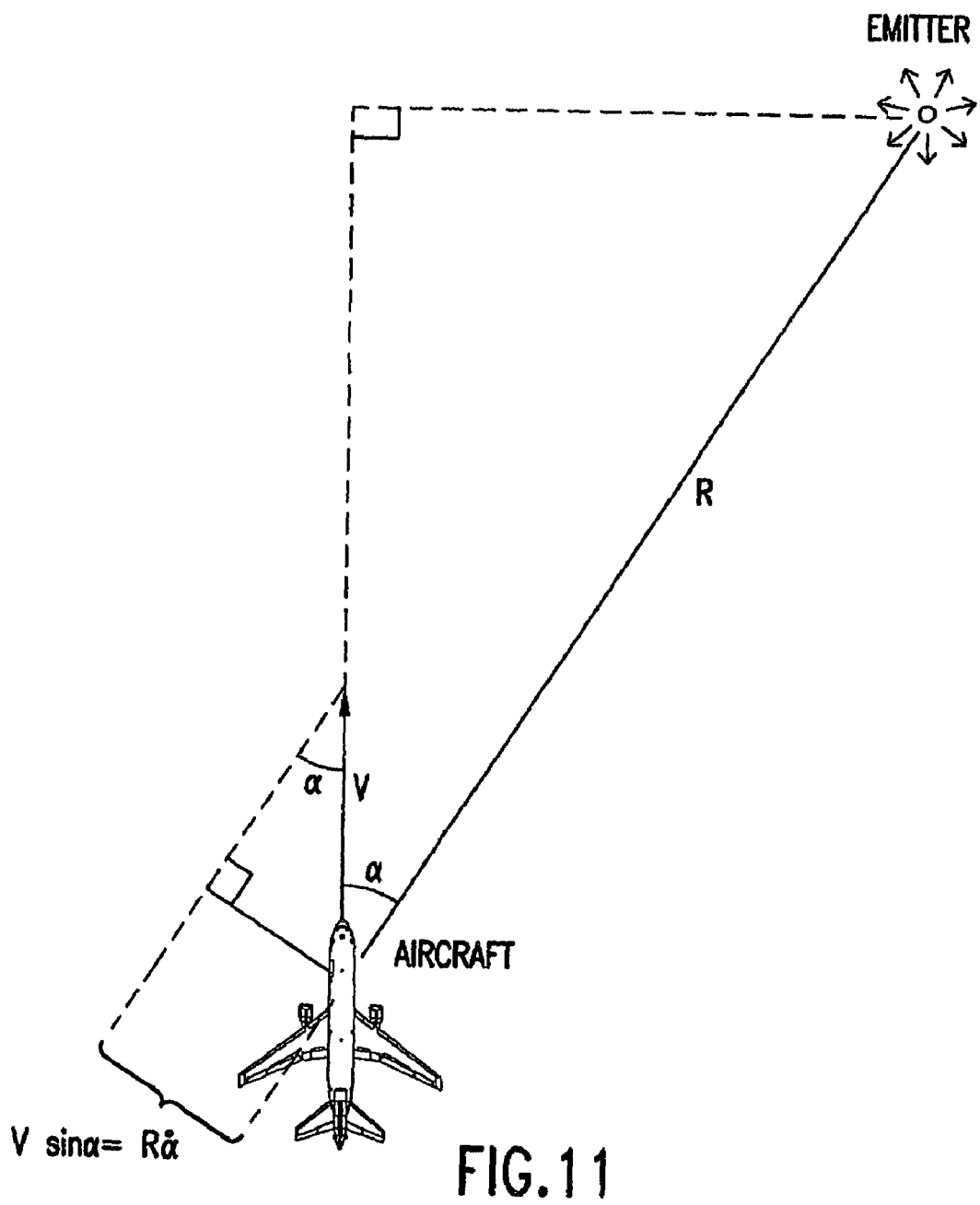
FIG. 11 is a schematic diagram of a dynamic plan view of the geometry of the angle rate interferometer of the present invention.

In FIG. 11, an AIRCRAFT at range R from the EMITTER flies at velocity V obliquely toward or away from the EMITTER at angle $\alpha$ to a line of sight to the EMITTER. The tangential component of the AIRCRAFT's velocity V is $V\sin\alpha = R\,[d\alpha/dt]$.

Figure 12:
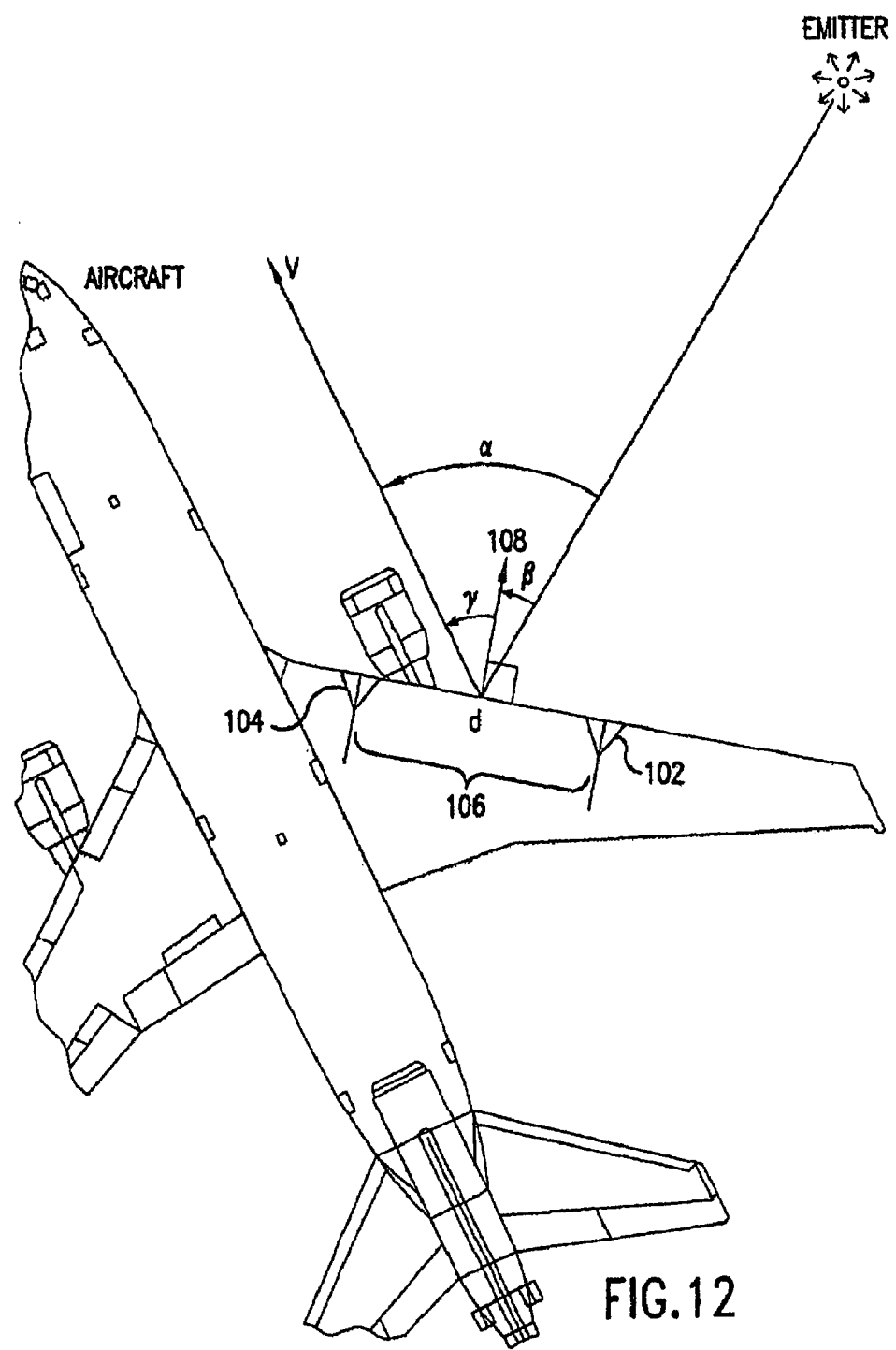
FIG. 12 is a schematic diagram of the relation between the dynamic and static plan views of the geometry of the angle rate interferometer of the present invention.

As depicted in FIG. 12, angles $\alpha$ and $\beta$ are generally different depending on the mounting orientation of baseline 106 with respect to the AIRCRAFT's flight direction as represented by the direction of velocity V. As a general matter, $\alpha$ minus $\beta$ equals $\gamma$. Generally, $\gamma$ is a known predetermined constant over the time intervals involved in the measurement so that $d\alpha/dt$ equals $d\beta/dt$ and $V\sin\alpha$ equals $R\,[d\beta/dt]$.

With the AIRCRAFT's velocity V known from an external navigation system (e.g., an inertial navigation system), computer 280 computes range R based on inputs V, $\beta$, $\gamma$ and d and the measured frequency difference $\omega-\omega_0$ as follows:

$$R = V\sin(2\beta+\gamma)\frac{\pi d}{\lambda}\frac{1}{\omega-\omega_0} + V\sin(\gamma) \quad (8)$$

$$= \frac{\pi d}{\lambda}\frac{1}{\omega-\omega_0}$$

where the first term is a function of the measured frequency difference $\omega-\omega_0$ and the angle $\beta$, and the second term is substantially constant.

For a passive ranger to be of value, the inputs V, $\lambda$, $\beta$, $\gamma$ and d and the measured frequency difference $\omega-\omega_0$ must be determined to a sufficient accuracy to achieve the desired range accuracy. For example, the range uncertainty $\Delta R$ may be desired to be no more than 20% of range R. This accuracy has an impact on the accuracy to which other parameters must be determined. As it turns out, a modern inertial navigation system (INS) can track velocity V to an accuracy that is more than sufficient to eliminate velocity uncertainty $\Delta V$ as a significant contributor to range uncertainty. Modern intercept radios can measure wavelength $\lambda$ to an accuracy that is in excess of what is needed to eliminate wavelength uncertainty $\Delta\lambda$ as a significant contributor to range uncertainty. The baseline length d and angle $\gamma$ are known to a sufficient accuracy to eliminate baseline uncertainty $\Delta d$ and angle uncertainty $\Delta\gamma$ as contributors to range uncertainty. This leaves two factors to be concerned with: angle uncertainty $\Delta\beta$ and frequency difference uncertainty $\Delta(\omega-\omega_0)$. The range uncertainty $\Delta R$ as a fraction of range R is determined by forming the differentials of range R with respect to angle uncertainty $\Delta\beta$ and with respect to frequency difference uncertainty $\Delta(\omega-\omega_0)$ and then normalizing this with respect to range R:

$$\frac{\Delta R}{R} = \frac{\partial R}{\partial \beta}\frac{\Delta\beta}{R} + \frac{\partial R}{\partial(\omega-\omega_0)}\frac{\Delta(\omega-\omega_0)}{R} \quad (9)$$

so that when angle $\gamma$ is sufficiently small that the second term of range R can be ignored:

$$\frac{\partial R}{\partial \beta}\frac{1}{R} = 2\cot(2\beta + \gamma) \quad (10)$$

and $$\frac{\partial R}{\partial(\omega - \omega_0)}\frac{1}{R} = \frac{1}{(\omega - \omega_0)} \quad (11)$$

Therefore:

$$\frac{\Delta R}{R} = 2\cot(2\beta + \gamma)\Delta\beta - \frac{\Delta(\omega - \omega_0)}{(\omega - \omega_0)}. \quad (12)$$

For example, to achieve a range accuracy of $[\Delta R/R]=20\%$ requires a tradeoff between angle $\beta$, angle uncertainty $\Delta\beta$ and frequency difference uncertainty $\Delta(\omega-\omega_0)$ as illustrated in Table 1.

TABLE 1

| $\beta$ (degrees) | $\Delta\beta$ (degrees) | $2\cot(\beta) \Delta\beta$ | $\frac{\Delta(\omega - \omega_0)}{(\omega - \omega_0)}$ | $\frac{\Delta R}{R}$ |
| --- | --- | --- | --- | --- |
| 22.5 | 1 | 0.084 | 0.182 | 0.2 |
| 22.5 | 2 | 0.169 | 0.107 | 0.2 |
| 22.5 | 3 | 0.253 | 0.060 | 0.26 |
| 30 | 1 | 0.060 | 0.191 | 0.2 |
| 30 | 2 | 0.121 | 0.159 | 0.2 |
| 30 | 3 | 0.181 | 0.085 | 0.2 |
| 45 | 1 | 0.035 | 0.197 | 0.2 |
| 45 | 2 | 0.070 | 0.187 | 0.2 |
| 45 | 3 | 0.105 | 0.170 | 0.2 |
| 60 | 1 | 0.020 | 0.199 | 0.2 |
| 60 | 2 | 0.040 | 0.196 | 0.2 |
| 60 | 3 | 0.060 | 0.191 | 0.2 |

Note that the range accuracy is more difficult to achieve at a smaller angle $\beta$. In fact at $\beta=22.5$ degrees and $\Delta\beta=3$ degrees, it is not possible to achieve a 20% range accuracy.

In a representative use, an aircraft may fly at about 480 knots (i.e., about 800 feet per second) so that V=243.84 meters per second. Assuming the EMITTER transmits at 3 GHz the $\lambda=0.1$ meters. Assuming that range R is 10 kilometers and baseline d is 2 meters, then the frequency difference $(\omega-\omega_0)$ given by:

$$\omega - \omega_0 = V\sin(\beta)\frac{\pi d}{\lambda}\frac{1}{R} \quad (13)$$

is $$\omega - \omega_0 = 1.532\sin(\beta) \quad (14)$$

As can be seen in Table 2, the frequency difference $(\omega-\omega_0)$ is very small and the required difference accuracy $\Delta(\omega-\omega_0)$ is even smaller.

TABLE 2

| $\beta$ (degrees) | $\Delta\beta$ (degrees) | $(\omega - \omega_0)$ (Hertz) | $\frac{\Delta(\omega - \omega_0)}{(\omega - \omega_0)}$ | $\Delta(\omega - \omega_0)$ (Hertz) |
| --- | --- | --- | --- | --- |
| 22.5 | 1 | 0.586 | 0.182 | 0.107 |
| 22.5 | 2 | 0.586 | 0.107 | 0.063 |
| 22.5 | 3 | 0.586 | 0.060 | 0.035 |
| 30 | 1 | 0.766 | 0.191 | 0.146 |
| 30 | 2 | 0.766 | 0.159 | 0.122 |
| 30 | 3 | 0.766 | 0.085 | 0.065 |
| 45 | 1 | 1.083 | 0.197 | 0.213 |
| 45 | 2 | 1.083 | 0.187 | 0.203 |
| 45 | 3 | 1.083 | 0.170 | 0.184 |
| 60 | 1 | 1.327 | 0.199 | 0.264 |
| 60 | 2 | 1.327 | 0.196 | 0.260 |
| 60 | 3 | 1.327 | 0.191 | 0.253 |

Prior art systems require long time periods in order to measure this the frequency difference to a required accuracy $\Delta(\omega-\omega_0)$. The present invention recognizes that there may be only 50 milliseconds or so during which to make all measurements. The frequency differences $(\omega-\omega_0)$ from Table 2 vary from only 0.59 Hz to 1.33 Hz. At 0.59 Hz, 50 milliseconds represents only 11 degrees of phase. At 1.33 Hz, 50 milliseconds represents only 24 degrees of phase. In such a short measurement interval, it is difficult to measure frequency difference $(\omega-\omega_0)$ to the required frequency difference accuracy $\Delta(\omega-\omega_0)$. The angle rate interferometer disclosed herein, using an RF bridge structure, solves the problem of accurately measuring the frequency difference.

Noise imposes a limit on the accuracy of the measurement process. The performance of the angle rate interferometer is based on the signal to noise ratio of the signals received. Referring again to FIG. 3, mixers 140 and 160 preferably have a low noise amplifier (LNA) coupled between the antenna and the mixer input. In this example, the LNA has noise figure $N_f$ of 5 dB that is typical in the 3 GHz band. The signal bandwidth is initially limited by the bandwidth of filters 150 and 170 (in this example, assume 2 MHz or 63 dB referenced to one Hertz) and subsequently limited by the bandwidth of filter 190. The thermal noise into the mixer is given by:

$$\text{noise} = kT \cdot Nf \cdot Bf \quad (15)$$

where kT is −171 dBm (decibels referenced to one milliwatt per Hertz). Thus, the noise level is about −103 dBm for each of mixers 140 and 160. The combined noise from both mixers 140 and 160 is about −100 dBm.

The signal to noise ratio required for a given frequency accuracy is given by $$SNR = \frac{1}{2T\,(\Delta(\omega - \omega_0))^2} \quad (16)$$

where T is the time period over which coherent integration takes place and $\Delta(\omega-\omega_0)$ is the required frequency difference accuracy. In the example herein, T is 49 milliseconds. The required frequency difference accuracy $\Delta(\omega-\omega_0)$ is of the order of 0.15 to 0.2 Hertz. Assume that $\Delta(\omega-\omega_0)$ is 0.2, then, the required SNR is 255 (24.07 when expressed in dB).

The EMITTER may not be a constant beacon of radiation that provides a signal for the full duration of the DFT integration interval T. Often the EMITTER includes a scanning antenna that illuminates the phase rate interferometer for only a brief dwell time. For example, a representative EMITTER of this scanning type may be modeled from the description of the AN/TPS-70 described in the *The Radar Handbook*, second edition, published by McGraw Hill, Merrill Skolnik as editor, 1990, page 7.72. The EMITTER has a 1.6° azimuth and 4° elevation 3 dB beamwidth (i.e., an antenna gain of about 6,250 or 37.95 dB). Assuming that the scanning antenna completes a 360 degree revolution in 9 seconds, the dwell time during which the EMITTER illuminates the phase rate interferometer is only 40 milliseconds, not the full 49 milliseconds. The dwell time may be determined by providing a threshold circuit to detect when a sufficiently strong signal is being received by the phase rate interferometer.

The DFT integration interval is still preferably one-half π divided by the displacement frequency defined by δω but in Hertz (the difference between the center frequency of the DFT and the offset frequency defined by $\omega_0$) as discussed above with respect to equations (4), (5) and (6). In the example discussed herein, δω is π divided by 64, or 49 milliseconds. If the dwell time of the EMITTER is only 40 milliseconds, then the remaining 9 milliseconds of the DFT integration interval is filled with a balanced number of leading and trailing zero values for calculation purposes (so that the shape of the two discrete Fourier Transforms combine to form a linear frequency discriminator). In the case of a 40 millisecond dwell time, the required signal to noise ratio is determined by Equation (16) as if T were 40 milliseconds even though the DFT filter function uses a 49 millisecond integration interval. The required SNR is 312.5 (24.95 dB).

The reason for using a DFT integration interval T equal to one-half π divided by the displacement frequency defined by δω but in Hertz is to provide a linear frequency discrimination function. However, small contractions or expansions of the interval T may be used as long as the frequency discrimination function remains substantially linear or correctable to be substantially linear. Corrections may be affected by adding a quadratic or higher order correction function to the frequency difference $(\omega-\omega_0)$ for each of the possible values of (A–B)/(A+B).

In general, the power flux (i.e., the power transmitted through a unit area) at range R from the EMITTER that transmits power $P_T$ through an antenna with gain $G_T$ is given by:

$$\frac{P_T G_T}{4\pi R^2} \quad (17)$$

A receive antenna having gain $G_R$ has an effective aperture of:

$$\frac{G_R \lambda^2}{4\pi} \quad (18)$$

where λ is the wavelength of the radiation received, and the signal received by the receive antenna is $$S_R = \frac{P_T G_T}{4\pi R^2} \frac{G_R \lambda^2}{4\pi} \quad (19)$$

In exemplary EMITTER modeled after the description in the *The Radar Handbook*, second edition, published by McGraw Hill, Merrill Skolnik as editor, 1990, page 7.72, the EMITTER has an antenna gain $G_T$ of about 6,250 (i.e., 37.95 dB), a peak power of 3 megawatts and an average power of 5 kilowatts. The pulse repetition interval PRI is 600 times the pulse duration PD. In Equations (17) and (19), $P_T$ may be regarded as the average power (i.e., 5 kilowatts or 66.99 dBm referenced to one milliwatt). If λ is 0.1 meters (i.e., based on 3 GHz) and $G_R$ is taken to be 2 dB, then $S_R$ is –75.07 dBm (i.e., about 0.03 microwatt). With a required SNR of 24.95 dB (based on a 40 millisecond dwell time), the noise level should not be allowed to rise above –100 dBm. In the exemplary embodiment described herein, the noise level is kept below –100 dBm.

The noise in the measurement process can be limited by appropriately designed filters. Filters 150 and 170 in the example herein are designed for a 2 MHz bandpass. However, broader bandpass filters may be used if the system noise is narrowed in other filters, for example filter 190. For example, if filter 190 were to be designed as a high quality DR filter with a Q of 20,000, then the band pass would be about 380 kilohertz. This would limit the noise bandwidth and lower the system noise to 19 percent of the noise of a 2 MHz noise bandwidth system (–7.21 dB). In such a case, the bandwidth of filters 150 and 170 could be opened up to pass 20 MHz signals. This has the advantage of being better able to measure a frequency switching EMITTER.

The ability to achieve 20% range accuracy is quite difficult. It is only by the use of the frequency differencing techniques described herein that it is possible to transfer the frequency difference sensed at antennas 102 and 104 to the digital frequency measuring circuitry that evaluates (A–B)/(A+B).

One source of this difficulty is the short dwell times that are available when intercepting a scanning antenna EMITTER. In the example herein, the dwell time is 40 milliseconds. Typically, this dwell time is parsed into three to five look times, for example, four look times averaging 10 milliseconds each. During each look time, the EMITTER transmits pulses repeated at a different pulse repetition interval (i.e., inverse of pulse repetition frequency PRF) so as to resolve ambiguous Doppler indicated velocities in low and medium PRF modes and so as to resolve ambiguous range reflections in medium and high PRF modes.

When switching from one look to another, the EMITTER frequency may also be switched. The angle rate interferometer described herein is not adversely effected by this form of frequency switching because it is only the frequency difference between the frequencies received at antennas 102 and 104 that is measured. Because of the pulse structure of the EMITTER's waveform, it is not possible to receive one frequency at antenna 102 and another frequency at antenna 104. On the occasional time when the measurement (ADC sampling) exactly corresponds to a time when one antenna receives signal power and the other antenna receives no signal power, the described angle rate interferometer treats the measurement as noise. If one were concerned with this occurrence, a signal power level threshold circuit may be installed at the outputs of mixers 140 and 160 to detect this condition and block the ADC sampling.

Even when the EMITTER's signal comes from a TV band broadcast, or similar source, with either FM or AM modulation thereon, to effect the described angle rate interferometer, the frequency modulation imparted to the signal from the EMITTER would have to change the carrier frequency fast enough so that the frequencies at antennas 102 and 104 are significantly different. This would depend on length d of baseline 106 and the angle of arrival β of the EMITTER's signal.

An angle rate interferometer as described herein may advantageously exploit signals from continuous wave sources to achieve longer integration times. Such sources include TV broadcasts, FM radio broadcasts, and VOR (VHS omni-directional ranging) broadcasts as are installed at many airports. The integration intervals for the DFTs are still defined by the center frequencies of the DFTs, and the integration time is short. However, the outputs of the DFTs may be saved in complex form (real and imaginary components) and then later recombined coherently using the time shifting property of Fourier Transforms so that each measurement of A and B appears to have been made at the same time. The benefits of this long time averaging is at least partially offset by the shorter length (measured in the number of wavelengths) of interferometer baseline d that can be installed on an aircraft for these continuous wave sources since the continuous wave sources typically operate at lower frequencies.

According to an embodiment of the present invention, a receiver includes processor 200 and RF bridge 100. RF bridge 100 is coupled to processor 200 to receive reference signal 202 or intermediate reference signal 302. RF bridge 100 includes first and second frequency converters 140 and 160 coupled to respective first and second antennas 104 and 102. RF bridge also includes third frequency converter 180 coupled to outputs of the first and second frequency converters 140 and 160.

U.S. Pat. No. 3,090,957 to Albanese et al. (FIG. 4) discloses mixer 11 and mixer 12 coupled to respective antennas 3 and 4. However, Albanese et al. '957 does not disclose a third frequency converter coupled to mixers 11 and 12. Instead, Albanese et al. '957 discloses an adder coupled to mixers 1 and 12.

In RF bridge 100, the first and second frequency converters 140 and 160 receive respective first and second signals from the respective first and second antennas 104 and 102. The third frequency converter 180 heterodynes signals from the first and second frequency converters 140 and 160 to provide a signal that is characterized by a frequency difference modulated onto the reference signal. The frequency difference is a difference between a frequency of the first signal and a frequency of the second signal.

RF bridge 100 further includes frequency source 110 coupled to first frequency converter 140, and fourth frequency converter 120 coupled to reference signal 202 and coupled between frequency source 110 and second frequency converter 160. RF bridge 100 further includes filter 130 coupled between fourth frequency converter 120 and second frequency converter 140, the filter providing a stop band at a highest frequency of a signal from the frequency source and a pass band at a shifted frequency that is a sum of a frequency of the reference signal and a lowest frequency from the frequency source.

U.S. Pat. No. 3,789,410 to Smith et al. (FIG. 5) discloses two receivers coupled to respective antennas and driven by a common local oscillator. However, Smith et al does not disclose and offset mixer or filter such as presently disclosed as frequency converter 120 and filter 130 of RF bridge 100.

The claimed receiver advantageously includes up converter 320 and down converter 340. Up converter 320 is coupled between processor 200 and RF bridge 100 to frequency translate reference signal 202 by a predetermined frequency into intermediate reference signal 302 that is coupled to the RF bridge. Down converter 340 is coupled between RF bridge 100 and processor 200 to frequency translate information signal 304 from RF bridge 100 by a predetermined frequency into shifted information signal 204. The predetermined frequency is provided by frequency source 310.

In an alternative embodiment, a receiver includes RF bridge 100 and processor 200 coupled to the RF bridge to receive information signal 204 from the RF bridge. The processor includes a central clock source (not shown but common in digital designs), digital frequency source 206 to generate reference signal 202 based on a signal from the clock source, and reference signal 202 is coupled to RF bridge 100. The processor further includes circuitry to detect a frequency difference from the information signal based on the signal from the clock source (e.g., circuit parts 230, 240, 260, 270 and 280 of FIG. 4).

The circuitry to detect includes first Fourier Transformer 260 having a first center frequency, and second Fourier Transformer 270 having a second center frequency where the first center frequency is different than the second center frequency. The circuitry to detect further includes digital frequency generator 230 that generates a first digital signal at the first center frequency coupled to first Fourier Transformer 260, and a second digital signal at the second center frequency coupled to second Fourier Transformer 270. The circuitry to detect further includes frequency discriminator (a part of computer 280) coupled to first and second Fourier Transformers 260, 270. The circuitry to detect further includes frequency converter 240 coupled between information signal 204 and inputs to first and second Fourier Transformers 260, 270. Digital frequency generator 230 further generates a third digital signal coupled to frequency converter 240. The third digital signal is generated at a frequency to cause the frequency converter to shift a frequency of the information signal to a frequency between the first and second center frequencies.

An improvement to the herein described receiver is achieved by used of a system wide clock having a clock frequency FC. The clock frequency is derived from a master clock.

Figure 13:
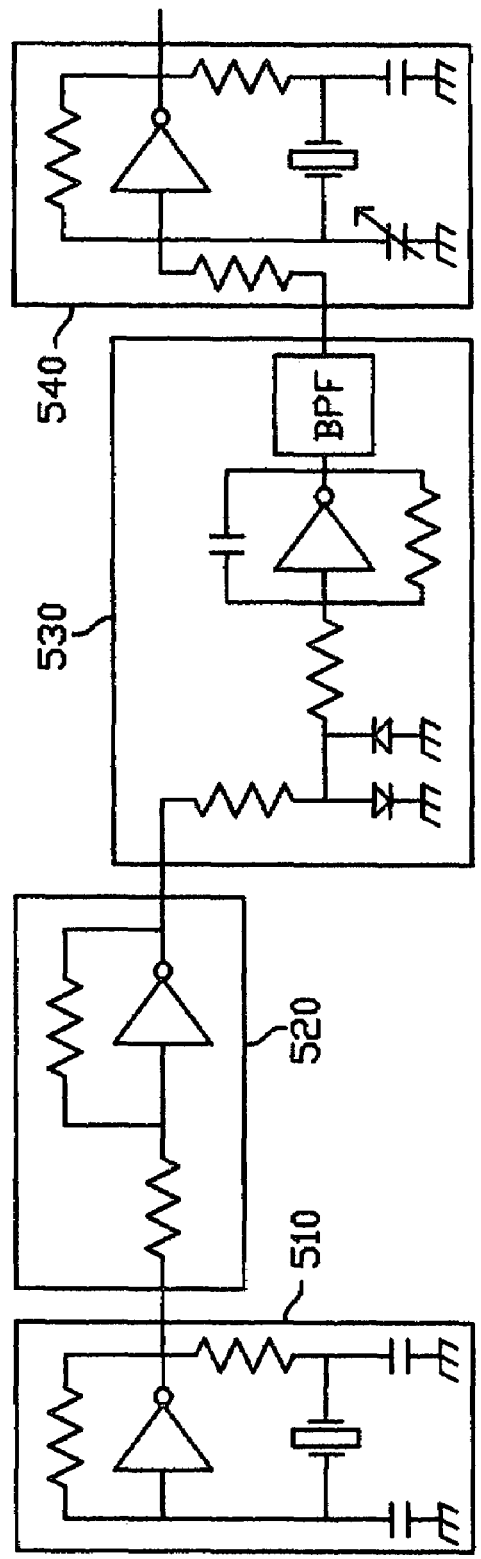
FIGS. 13 and 14 are schematic diagrams depicting a master clock source according to an example of the present invention.
Figure 14:
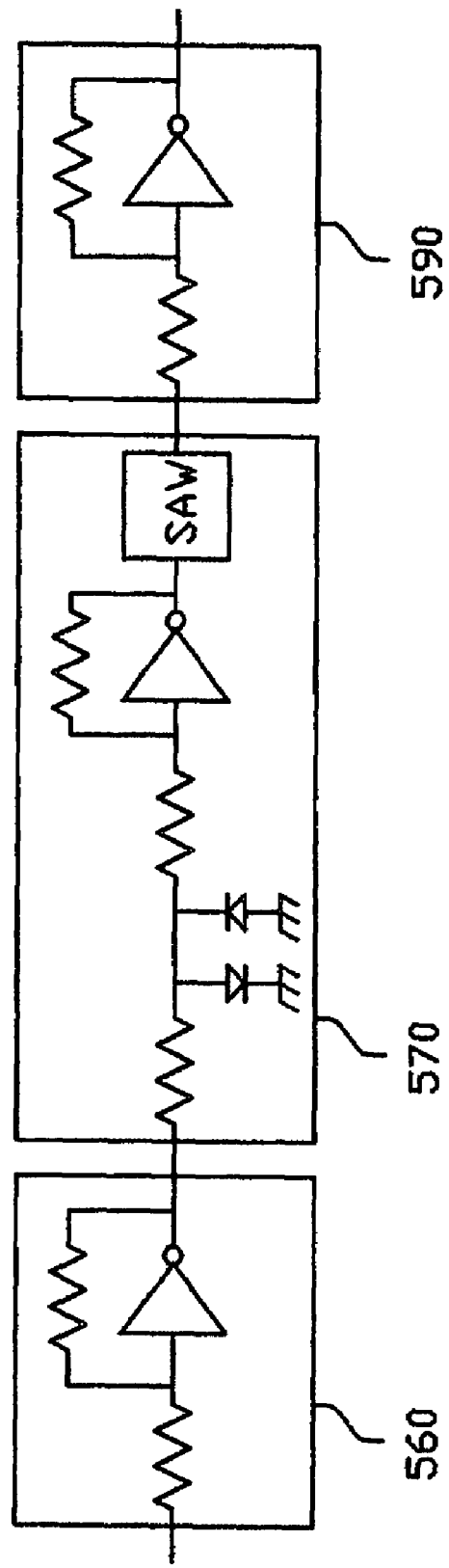

In FIGS. 13 and 14, a representative master clock is depicted in which an exemplary quartz crystal reference oscillator 510 oscillates at a frequency of one twenty-fourth of FC. Resistors are adjusted for a unity oscillator loop gain or just a little more so non-linear distortions do not lead to spurious frequencies. In the improvement to be discussed herein, the clock frequency FC is approximately 804 MHz; therefore, reference oscillator 510 oscillates at about 33.5 MHz. An AT cut quartz crystal at this frequency may oscillate in a fundamental mode with a Q of 400,000 to 450,000 producing an oscillator with a 3 dB bandwidth of about 75 Hz. The output of oscillator is amplified in amplifier 520. The frequency of the output of amplifier 520 is tripled in frequency tripler 530. The resistor and two diodes at the input of frequency tripler 530 function to clip the input waveform into a square wave. The integrating amplifier in frequency tripler 530 functions to turn the square wave into a triangle wave. The spectrum of a triangle wave includes the fundamental frequency and the third harmonic frequency in substantial proportions. The band pass filter at the output of frequency tripler 530 passes the third harmonic frequency, in this example, about 101.5 MHz. The output of frequency tripler 530 is coupled to resonator 540. Resonator 540 is a crystal-controlled oscillator that has a synchronization input that is coupled to the output of frequency tripler 530. Resistors are adjusted for a unity oscillator loop gain or just a little less so non-linear distortions do not lead to spurious frequencies, so non-resonant frequencies do not self oscillate and so the desired resonant frequency resonates due to the additional energy at the resonant frequency added to the circuit by the synchronizing input. Resonator 540 includes an AT cut quartz crystal that is cut to oscillate at this frequency (e.g., 101.5 MHz) in an overtone mode (e.g., third harmonic) with a Q of about 150,000. Resonator 540 passes a signal synchronized with the third harmonic of oscillator 510 with a 3 dB bandwidth of about 700 Hz.

When the resonant frequency of the crystal of resonator 540 is manufactured to be exactly three times the resonant frequency of the crystal of oscillator 510, the signal from oscillator 510 is tripled and passes through resonator 540 easily. However, manufacturing tolerances may make this exact resonant frequency ratio difficult to achieve. In such case, the tripled frequency output of frequency tripler 530 may be outside of the bandpass of resonator 540, and therefore, may be blocked. The capacitor at the input of resonator 540 is made to be adjustable (for example, a back biased diode adjusted by a bias voltage). This adjusts the center frequency of the bandpass of resonator 540 to pass the tripled frequency output of frequency tripler 530.

The output of resonator 540 is coupled to the input of amplifier 560 (see FIG. 14), and the output of amplifier 560 is coupled to the input of frequency multiplier 570. Frequency multiplier 570 includes a clipper section (e.g., resistor and two diodes) similar to the clipper section of tripler 530. The amplifier converts the clipped signal into a square wave. A Surface Acoustic Wave filter (SAW filter) is used as a bandpass filter to pass only a frequency equal to an even multiple (in this example, 8 times) of the fundamental frequency of the square wave. At the frequencies represented here (e.g., FC of 804 MHz in this example) bulk acoustic wave devices such as a quartz crystal oscillator do not work well. Instead, a surface acoustic wave device is used. The SAW filter typically has a bandwidth of about 2% to 5% that, at the FC, amounts to about 16 MHz to 40 MHz. Also, SAW filters typically have a high insertion loss, in the order of −5 dB to −15 dB. A possible alternative is to use a three-phase SAW filter where the insertion loss is only −2 to −10 dB. In either case, amplification is needed to maintain suitable signal to noise ratios.

In a particular variant of this improvement, the surface acoustic wave filter uses quartz as a substrate to better match the temperature drift characteristics of the quartz crystals in oscillator 510 and resonator 540. More generally, the material used in the SAW filter of frequency multiplier 570 and the crystals in oscillator 510 and resonator 540 are all made of materials that are matched for temperature drift, and in particular, made of the same material.

The output of frequency multiplier 570 (FIG. 14) is coupled to the input of amplifier 590. In FIG. 14, amplifier 590 is a functional depiction of an amplifier that produces a sinusoidal wave for coupling to some circuits and produces clock pulses for other circuits. For example, the output of amplifier 590 is used in some embodiments as the output of frequency source 310 (see FIG. 5). Amplifier 590 is also to be regarded as a functional depiction of a clock source and clock distribution network that is used in some embodiments as a clock signal at frequency FC for digital processing, as will be discussed later.

The component circuits depicted in FIGS. 13 and 14 are schematic representations of the circuits without showing details, and the details shown are not necessarily required. Other circuits having the corresponding functions of oscillator, resonator, frequency multiplier and amplifier are to be regarded as equivalent. Other technologies may be selected to achieve these functions. However, the frequency of operation has a significant impact on the selection of suitable technologies for these functions. Furthermore, whatever technology and circuit is selected, it is specifically desired to achieve a high degree of stability of FC.

In fact, substitutions may be freely made in accordance with these teachings. For example, the 33.5 MHz crystal controlled oscillator 510 may be replaced with a cascaded (i.e., coupled) series of a crystal controlled oscillator (frequency of 1.046875 MHz), an amplifier, a frequency multiplier (times 4 multiplier), a crystal stabilized resonator (frequency of 4.1875 MHz), an amplifier, a frequency multiplier (times 8 multiplier), a crystal stabilized resonator (frequency of 33.5 MHz) and an amplifier. The frequency determinative element in this case would be the crystal-controlled oscillator (frequency of 1.046875 MHz). Such a quartz crystal could have a Q of about 10 million, and assuming other oscillator losses are well controlled, the oscillator would have a high Q. The bandwidth of the crystal would be about one-tenth of a Hertz.

Figure 15:
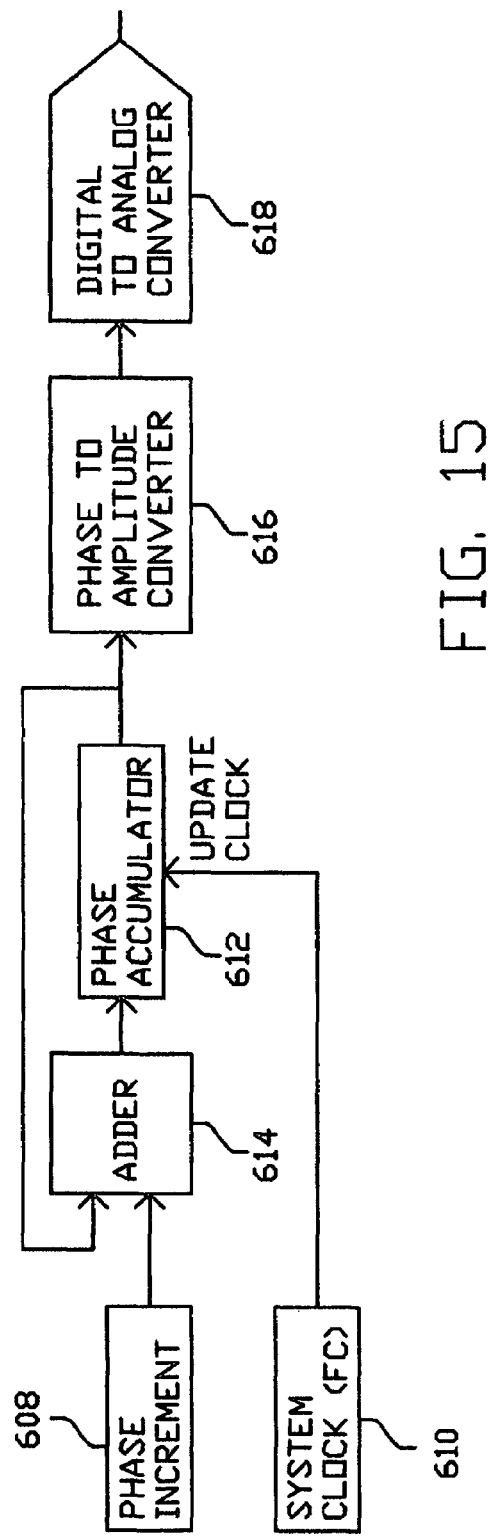
FIG. 15 is a schematic diagram depicting a direct digital synthesizer as used in examples of the present invention.

In FIG. 15, a direct digital synthesizer (DDS) is depicted as used in some embodiments of the improvement described herein. A system clock 610 drives the DDS. In some embodiments, the output of clock distribution network 590 (FIG. 14) is used for the output of clock 610 (FIG. 15). Phase increment register 608 is a digital register that is preloaded during a DDS setup sequence. Phase accumulator 612 is a digital register that is loaded synchronously with clock 610. Adder 614 computes the sum of the value stored in the phase increment and the value of the current phase accumulator. At the next FC clock from 610, the sum is synchronously loaded into the phase accumulator.

Phase accumulator 612 is of finite length, for example, 32 bits long. After a sufficient number of FC clock pulses, any finite phase increment will cause the phase accumulator to overflow. When the phase accumulator overflows, the phase integrates to and through 360 degrees. The phase accumulator is a modulo counter with modulus $2^{32}$, in the present example. One full cycle of the phase accumulator is mapped to 360 degrees of phase. Thus, the least significant bit LSB of the phase accumulator represents 360 degrees divided by $2^{32}$. The number of such LSB increments per FC clock is stored in phase increment 608. For example, to generate the phase value of a frequency that is one-eighth of the FC clock frequency, the phase increment register is preloaded with a phase increment of one-eighth of $2^{32}$ or $2^{29}$. Modulo phase accumulator 612 will overflow every eighth FC clock pulse. Similarly, changing the value stored in phase increment 608 generates the phases of other frequencies. Converter 16 converts the phase from phase accumulator 612 into the amplitude of a signal (e.g., a sine wave or a cosine wave) at the specified phase. When the phase is converted into the amplitude in converter 616, the resulting sinusoidal signal is processed through digital to analog converter 618 (DAC 618). With the advance of DDS technology, some DDS circuits are even being offered for sale in a single integrated circuit package. For example, AD9858 is a single package DDS with a 1 GSPS (clock speed), a 32 bit phase accumulator and a 10 bit DAC offered by Analog Devices™.

In general, a DDS is capable of generating non-sinusoidal signals. However, for purposes of the improvements described herein, the DDS is limited to sinusoidal waveform generation with as little distortion and noise as possible.

The basic DDS equation governing the frequency (call it $F_{out}$) of generated sine waves is that the ratio of the frequency of the signal out of the DAC (i.e., $F_{out}$) to the FC clock frequency (i.e., FC) is equal to the ratio of the value stored in the phase increment (called it M) to the full value of the phase accumulator that represents 360 degrees (in the case being discussed, this full value is $2^{32}$). In equation form this is $$\frac{F_{out}}{FC} = \frac{M}{2^{32}}. \tag{20}$$

To avoid or at least minimize phase jitter, $F_{out}$ is limited to frequencies that can be generated by integral values of M in the improvements described herein.

The crystal-controlled oscillator 510 (FIG. 13) may generate a 33.5 MHz signal, but it might be designed to generate other frequencies. The FC clock frequency will vary correspondingly. When the FC clock frequency varies because the frequency from crystal-controlled oscillator 510 is designed to be a different frequency, the DDS output frequency $F_{out}$ will automatically vary proportionately.

In another example, the circuits of FIGS. 13 and 14 are designed to generate an FC clock frequency of 805,306,368 Hz. This FC clock frequency will be used throughout this example; however, other clock frequencies could be used. Specifically, manufacturing tolerances in the center frequency of the quartz crystal used in crystal-controlled oscillator 510 will affect slight differences in frequencies in the improvements described herein.

The DDS depicted in FIG. 15 substitutes for frequency source 206 and DAC 208 of FIG. 4. The phase increment of the DDS is preloaded with a value of 1,073,742,156 to generate a signal with an output frequency $F_{out}$ equal to 201,326,654 1/4 Hz. This signal is used as the local oscillator signal LO IN coupled the mixer of FIG. 16.

Figure 16:
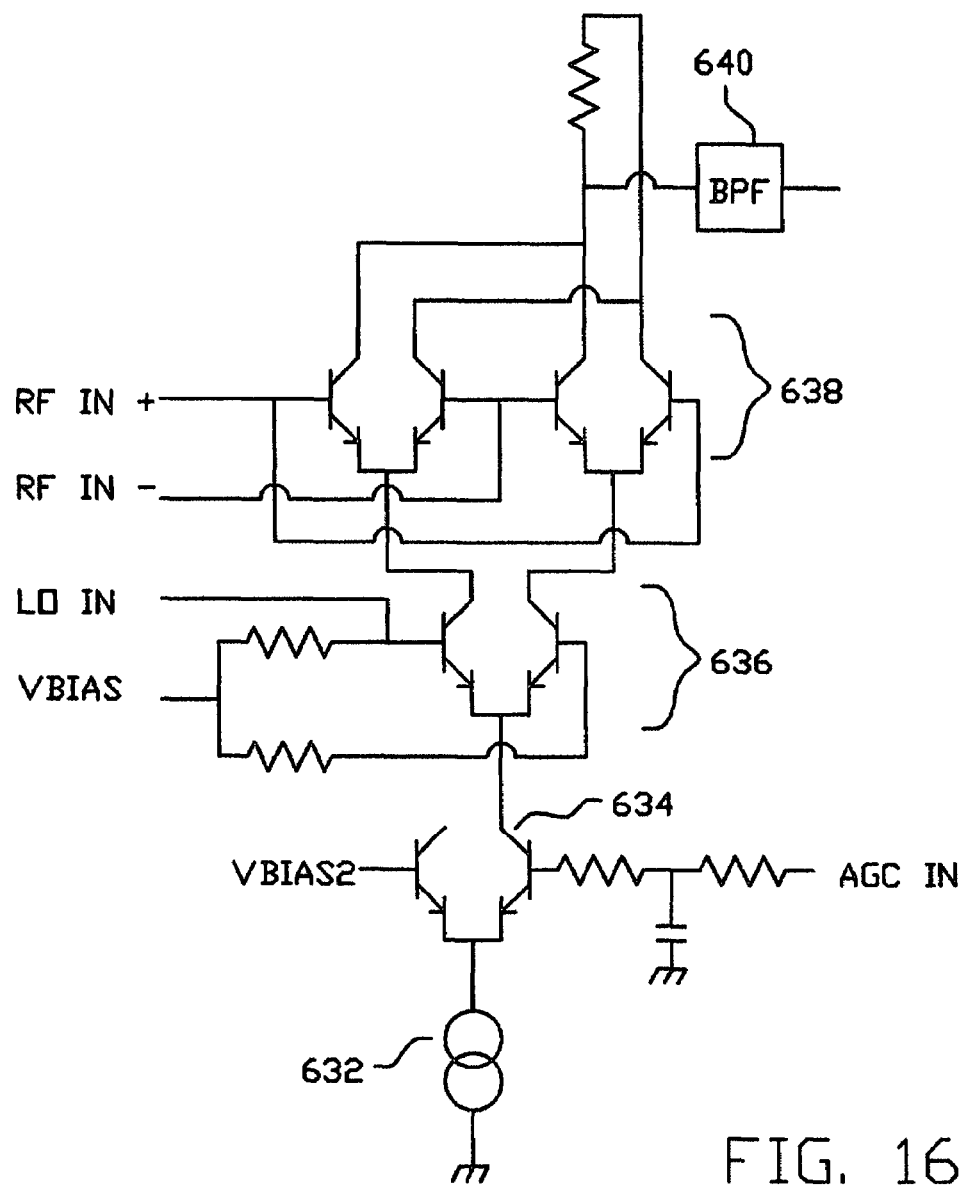
FIG. 16 is a schematic diagram depicting an up converter as used in examples of the present invention.

FIG. 16 depicts of double balanced mixer of the type generally referred to as a Gilbert mixer. The mixer depicted in FIG. 16 is slighted modified from the more basic mixer by the inclusion of an emitter-coupled pair of transistors at 634 between current source 632 and the lower section 636 of the mixer. The voltage difference between the automatic gain control signal AGC IN and the bias voltage VBIAS2 controls how much of the current through current source 632 also passes through lower section 636 of the mixer. By varying the amount of current passing through lower section 636 of the mixer, the gain of the mixer is controlled due to the non-linear properties of the base to emitter junction of the transistors. Similarly, the voltage difference between local oscillator signal LO IN from DAC 618 (FIG. 15) and bias voltage VBIAS controls how the total current through both transistors of lower section 636 of the mixer is to be apportioned between the two emitter-coupled pairs of transistors that make up upper section 638 of the mixer. The collector currents that pass through one transistor of each of the two emitter-coupled pairs of transistors that make up upper section 638 of the mixer are combined and converted to a voltage on a resistor. The voltage signal is coupled to bandpass filter 640. As depicted in FIG. 16, upper section 638 includes circuit components for a balanced input signal, and lower section 636 includes circuit components for an unbalanced input signal. In variants, each of the upper section and the lower section may be configured for either balanced or unbalanced signal input.

In FIG. 16, one input to the mixer is coupled to the local oscillator signal LO IN, and the other input of the mixer is coupled to the RF IN signal, in this case, to the FC sinusoidal signal from FIG. 14. The local oscillator signal LO IN is the $F_{out}$ signal of the DDS and has a frequency of 201,326,654 1/4 Hz as discussed above. The FC sinusoidal signal has a frequency of FC that is 805,306,368 Hz in this example. The sum and difference frequencies are produced at the mixer output. Bandpass filter 640 selectively passes only the sum frequency, that in this example, is 1,006,633,022 1/4 Hz.

The Gilbert mixer depicted in FIG. 16 is but an example of the different types of mixers that work well in the described frequency range. Other types of mixers may be used, although double balanced mixers, whether they are transistor or diode based, have the advantage of good isolation between input signals and output signals, for example 20 dB or more of isolation. This makes the design of bandpass filter 640 easier due to the attenuation of out of band signals (e.g., mixer input signals) of 20 or more dB. At a center frequency of about 1,007 MHz in the present example, SAW filter technologies are possible, but difficult, for filter 640 since the line widths and spacing would have to be so tight. Electron beam exposure of emulsion etching masks might help. Stripline or microstrip filters may be used such as a combline filter, but this technology requires multiple stages and the area require at this frequency could be substantial. On the other hand, discrete component filters are possible at this frequency. Conductors and insulators deposited on an insulating substrate and etched thereafter can be used to form discrete capacitors of small capacitance based on overlapping, but insulated, conductors or conductors etched from a single layer conductor and disposed side by side with a narrow gap between. Inductors can be made from round or square conductor spirals with a second insulated conductor layer used to connect the center of the spiral with other components disposed outside of the spiral's peripheral. In combination, the capacitors and inductors can be used to implement Butterworth or similar discrete filters to have a 1,007 MHz center frequency and a high Q. In any event, the combination of the out of band rejection of the double balanced mixer and band stop of filter 640 significantly rejects signals from the DAC of FIG. 15 and the FC sinusoidal signal from amplifier 590 of FIG. 14 but pass the sum signal having a frequency of about 1,007 MHz in this example.

The mixer depicted in FIG. 16 with its bandpass filter 640 in the present improvement provides the function of mixer 320 and bandpass filter 330 of FIG. 5. The input signal LO IN to the mixer of FIG. 16 corresponds to signal 202 of FIGS. 2 and 5, the input signal RF IN to the mixer of FIG. 16 corresponds to signal coupled between frequency source 310 and mixer 320 of FIG. 5, and the output of bandpass filter 640 of FIG. 16 corresponds to reference signal 302 of FIGS. 2 and 5. The output of bandpass filter 640 is coupled to the offset mixer (see 120 of FIG. 3).

Figure 17:
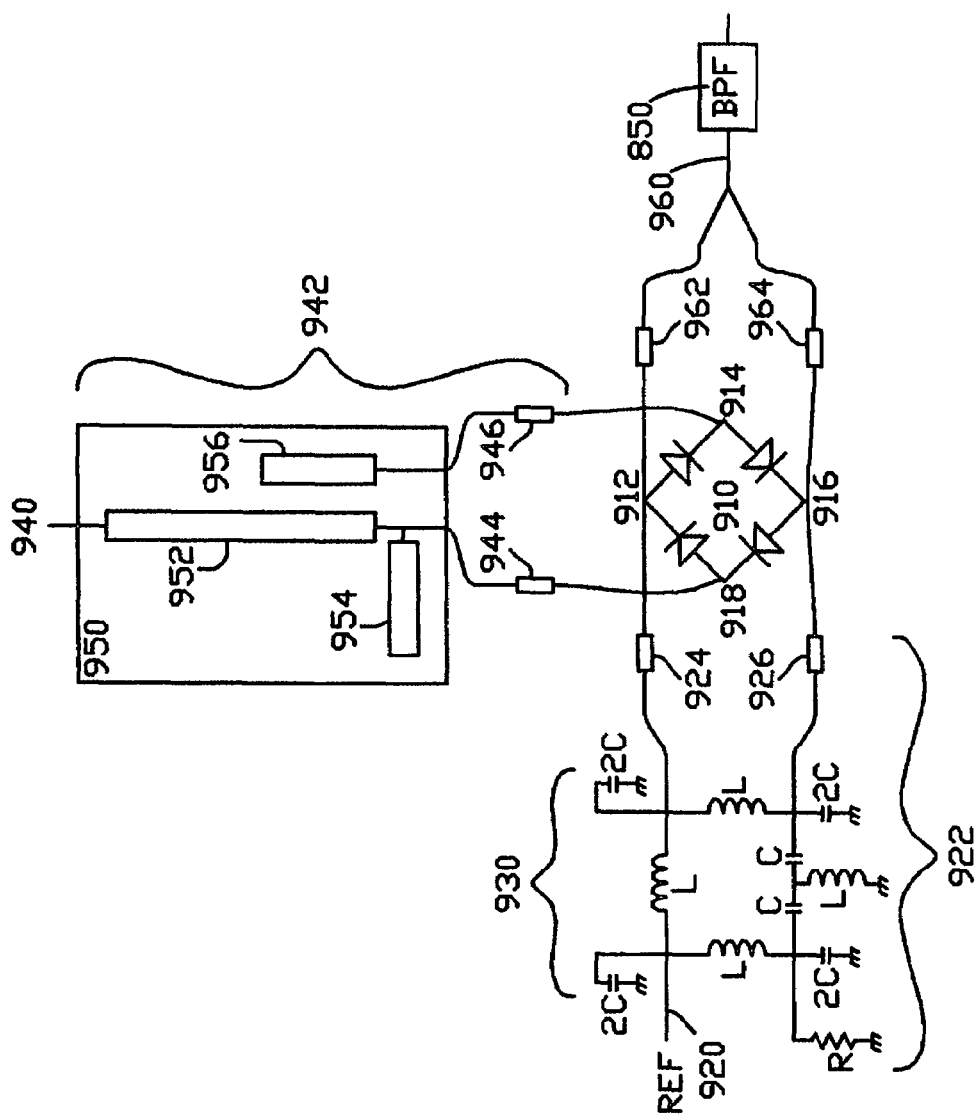
FIG. 17 is a schematic diagram depicting a doubly balanced mixer as used in examples of the present invention.

In the present improvement, FIG. 17 depicts an offset mixer that is an example of mixer 120 and bandpass filter 130 (of FIG. 3). This offset mixer may be used in embodiments of the present improvement. The reference signal REF in FIG. 17 corresponds to reference signal 302 from FIGS. 2 and 5, and reference signal REF is a signal at a single predetermined frequency that is spectrally pure (i.e., very narrow band). The signal from the frequency source FREQ SOURCE in FIG. 17 corresponds to the signal coupled, from frequency source 110 to mixer 120 of FIG. 3, and the signal FREQ SOURCE is a signal that may be tuned by frequency source 110 over a range of frequencies. In the present example of the improvement, the range of frequencies from the signal FREQ SOURCE varies from 3,825 MHz to 4,295 MHz, and the frequency of the reference signal REF is 1,006,633,022 1/4 Hz. The mixer depicted in FIG. 17 produces a difference signal with frequency that varies from 2,818 MHz to 3,288 MHz, in the present example, and a sum signal with frequency that varies from 4,832 MHz to 5,302 MHz. The output signal is filtered through bandpass filter 850 to pass either the sum signal or the difference signal. In the present example, bandpass filter 850 is designed to pass the sum signal.

FIG. 17 depicts a double balanced mixer and filter 850 used in the role of mixer 120 and filter 130 (of FIG. 3). A diode quad is central to this type of double balanced mixer. Such a diode quad is typically manufactured monolithically in a single semiconductor chip so the diodes are matched as closely as possible. In FIG. 17, diode quad 910 includes four diodes arranged in a "rat race" having terminals 912, 914, 916 and 918.

A first mixer input at 920 injects the signal with the lowest frequency (in this case, signal REF) into embedding circuit 922 of the mixer. In the present example, the signal coupled to input 920 has a frequency of 1,006,633,022¼ Hz as discussed above. Embedding circuit 922 includes inductors 924 and 926 and a balun 930. Balun 930 is implemented as a 180-degree coupler to convert an unbalanced signal input at 920 into balanced output signals at outputs coupled to inductors 924 and 926. The isolated port of the balun is terminated in resistance R where R equals the input impedance Z0 of the balun. The signal power of the input at 920 is split into two equal parts as signals exit the balun into inductors 924 and 926, but the signals are 180 degrees out of phase (a balanced line).

The inductors of the balun are selected so that their inductance L is equal to $\sqrt{2}*Zo/\omega$ where $\omega=2\pi*f$ where f is the frequency at input 920, e.g., 1,006,633,022¼ Hz in the present example. The capacitance C of the capacitors in the balun is equal to:

$$\frac{1}{\sqrt{2}*Zo*\omega}. \quad (21)$$

For Zo equal to 50 ohms, L is equal to approximately 11 nH, C is equal to approximately 2.3 pf and 2C is equal to approximately 4.5 pf at the frequency used in this example. Capacitors are available in such sizes as chip capacitors and inductors are available in comparable sizes so that balun 930 can be implemented on a substrate such as an alumna substrate. Such a balun performs well over a 20% bandwidth.

Alternatively, balun 930 may be implemented as a coupled transmission line so as to include a main transmission segment, a coupled line and stub tuner to match impedance. The coupled transmission line implementation would work just as fine as the lumped constant design, but would require more substrate area than a lumped constant design at the frequency in this example.

Elements 924 and 926 are inductors since the signal input at 920 has the lowest input frequency of the signals input to the mixer (about 1 GHz) compared to the frequency at input 940 that varies from 3.825 GHz to 4.295 GHz, compared to the difference signal with frequency that varies from 2.818 GHz to 3.288 GHz, and compared to the sum signal with frequency that varies from 4.832 GHz to 5.302 GHz in the present example.

A second mixer input at 940 injects the higher frequency into embedding circuit 942 of the mixer. In the present example, the signal coupled to input 940 has a frequency that varies over a bandwidth from 3,825 MHz to 4,295 MHz. Embedding circuit 942 includes capacitors 944 and 946 and balun 950. Elements 944 and 946 are capacitors since the signal input at 940 is the higher input frequency to the mixer. Balun 950 includes main transmission segment 952, coupled line 954 and stub tuner 956.

The two frequencies are mixed in diode quad 910, and the mixed output is passed out of the mixer through capacitors 962 and 964 to the output terminal at 960. The output signal includes the sum signal with frequency that varies from 4,832 MHz to 5,302 MHz, in the present example, and the difference signal with frequency that varies from 2,818 MHz to 3,288 MHz, in the present example. Very little of the signal at 940 couples to the output signal at 960 due to the structural arrangement of the double balanced mixer depicted in FIG. 17. Isolation of output 960 from input 940 in excess of 30 dB can be achieved with reasonable care to maintain balance between components.

The signal at 920 could leak through to the mixer to the output signal at 960. Therefore, capacitors 962 and 964 are sized to pass a frequency that varies from 4,832 MHz to 5,302 MHz but block the low frequency of 1,006,633,022¼ Hz. Similarly, inductors 924 and 926 are sized to block high frequencies in the ranges from 4,832 MHz to 5,302 MHz but pass the low frequency of 1,006,633,022¼ Hz. Furthermore, the frequency differences between the signal at 920 and the sum signal with frequency that varies from 4,832 MHz to 5,302 MHz are such that bandpass filter 850 further attenuates the local oscillator signals.

The signal FREQ SOURCE with frequency that varies from 3,825 MHz to 4,295 MHz is suppressed by about 30 dB as it passes through the double balanced mixer of FIG. 17 due to the symmetry of mixer structure, and the signal is further suppressed by bandpass filter 850. The sum and difference signals are produced by the action of the mixer of FIG. 17. When the sum signal is desired, bandpass filter 850 attenuates the difference signal with frequency that varies from 2,818 MHz to 3,288 MHz, in the present example, with respect to the sum signal with frequency that varies from 4,832 MHz to 5,302 MHz in the present example. The band stop region of the filter covers frequencies of 3,288 MHz and lower, and the band pass region of the filter covers frequencies of 4,832 MHz and higher. When greater attenuation of the difference signal with respect to the sum signal is desired than can be easily provided by bandpass filter 850, a single sideband frequency converter can be used.

In a more specific example, an RF bridge (100, FIG. 2) is coupled to a processor (200, FIG. 2) to receive a reference signal (302, FIG. 2) from the processor. The RF bridge (100) includes a first frequency converter (160, FIG. 3), a second frequency converter (140, FIG. 3), a frequency source (110, FIG. 3) and a doubly balanced mixer (see FIG. 17, also see 120, FIG. 3). The first frequency converter (160, FIG. 3) is coupled to a first antenna (102, FIG. 3), and the second frequency converter (140, FIG. 3) is coupled to a second antenna (104, FIG. 3). The frequency source (110, FIG. 3) is coupled to the first frequency converter (160, FIG. 3). The doubly balanced mixer (see FIG. 17, also see 120, FIG. 3) is coupled to the reference signal (302, FIG. 3) and coupled between the frequency source (110, FIG. 3) and the second frequency converter (140, FIG. 3).

In a variant of this example, the doubly balanced mixer (FIG. 17) includes a diode quad (910), and the diode quad includes first, second, third and fourth terminals (914, 916, 918, 912, respectively). The first and third terminals (914, 918) are coupled to the frequency source (940), and the second and fourth terminals (916, 912) are coupled to the reference signal (920).

In an embodiment of this variant, the second and fourth terminals (916, 912) are also coupled to the second frequency converter (140, FIG. 3), for example, coupled through filter 850 of FIG. 17 or filter 130 of FIG. 3.

In operation, signals are processed through the RF bridge by mixing a reference signal (920 of FIG. 17) from a processor (200, FIG. 3) with a source signal (940 of FIG. 17) from a frequency source (110, FIG. 3) in a doubly balanced mixer (FIG. 17 as an example of 120 of FIG. 3). The signals are further processed by mixing a first antenna signal (from 102 of FIG. 3) with the source signal (940 of FIG. 17 as an example of the signal from 110, FIG. 3) in a first frequency converter (160 of FIG. 3), and mixing a second antenna signal (from 104 of FIG. 3) with an offset signal (960 of FIG. 17) from the doubly balanced mixer (FIG. 17) in a second frequency converter (140 of FIG. 3).

In a variant of this operation where the doubly balanced mixer (FIG. 17) includes a diode quad (910) and the diode quad includes first, second, third and fourth terminals (914, 916, 918, 912, respectively), the mixing of the reference signal with the source signal further includes coupling the first and third terminals (914, 918) to a balanced signal (passing through 944, 946 of FIG. 17) derived from the source signal (940). The mixing of the reference signal with the source signal further includes coupling the second and fourth terminals (916, 912) to a balanced signal (passing through 924, 926 of FIG. 17) derived from the reference signal (920).

In an example of this variant, the mixing of the reference signal with the source signal further includes coupling the second and fourth terminals (916, 912) to the second frequency converter (passing through 962, 964 and 850 of FIG. 17 to 140 of FIG. 3).

In this example, the two input signals to the mixer have frequencies of:

1. spectrally pure 1,006,633,022¼ Hz (reference signal), and
2. from 3,825 MHz to 4,295 MHz (frequency source 110 of FIG. 3).

Signals produced as mixer products have frequencies that vary:

3. from 2,818 MHz to 3,288 MHz (difference signal); and
4. from 4,832 MHz to 5,302 MHz (sum signal).

Only the sum signal is desired in this example. An advantage of the presently disclosed structure is that the symmetry of the mixer structure (FIG. 17) suppresses the power of signal 940 (from frequency source 110 of FIG. 3) by about 30 dB as it passes through the double balanced mixer to the output at 960. Furthermore, to the extent that signal power from the reference signal at 920 passes through the mixer (FIG. 17) to the output at 960, the frequency of the reference signal can be effectively blocked by a narrow band blocking filter built into filter 850.

However, both the sum signal and the difference signal will be present at substantial power at the filter output at 960. It is only filter 850 (in FIG. 17 as an example of filter 130 of FIG. 3) that provides and significant band stop of the difference signal (at 2,818 MHz to 3,288 MHz) and band pass of the sum signal (at 4,832 MHz to 5,302 MHz). As discussed herein, filters having broad pass band regions and broad stop band regions that are close together in the spectrum and yet have wide transfer function margins between the stop and pass band regions are difficult to achieve. In this frequency range multi-stage strip line or microstrip filters (e.g., combline filters) may be used with or without multiple dielectric resonators to sharpen filter performance near the band edges in the band stop to band pass spectral region. Alternatively, discrete component filters (using capacitors and inductors) implementing Butterworth or similar filters may be used as discussed above. However, the frequency in this example is high enough to make it difficult to use discrete filters. Success with discrete filters would generally require that the filters be made using monolithic microwave integrated circuit technology (MMIC technology).

Figure 18:
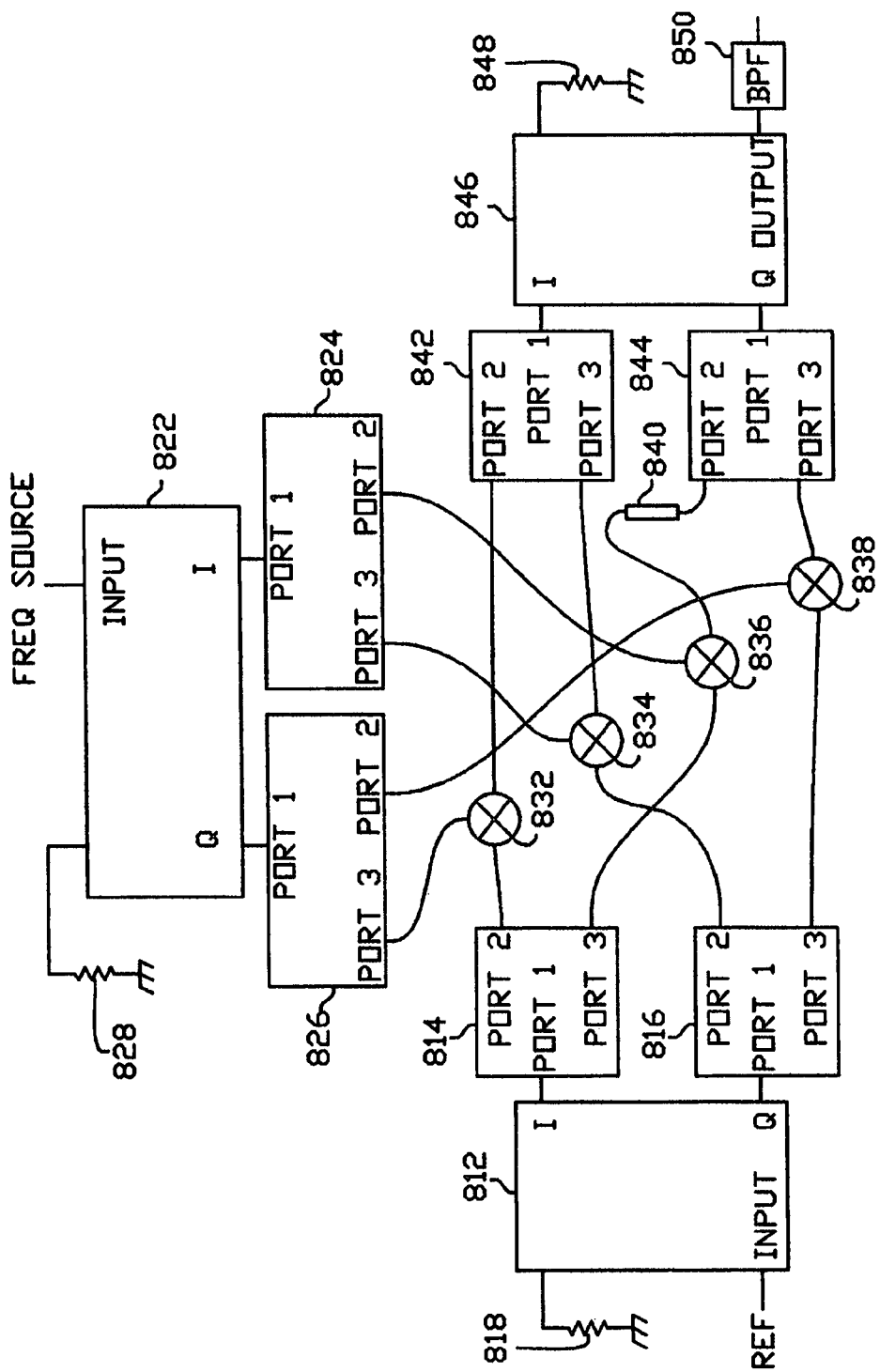
FIG. 18 is a schematic diagram depicting a single sideband frequency converter as used in examples of the present invention.

An elegant way to suppress the difference signal relative to the sum signal is to use a single sideband frequency converter to pass only the upper sideband and suppress the lower side band. FIG. 18 depicts an offset mixer that is an alternative example of mixer 120 and filter 130 (of FIG. 3). The offset mixer of FIG. 18 is of the type referred to as a single sideband frequency converter.

This single sideband frequency converter (i.e., offset mixer) may be used in embodiments of the present improvement. The reference signal REF in FIG. 18 corresponds to reference signal 302 from FIGS. 2 and 5, and reference signal REF is a signal at a single predetermined frequency that is spectrally pure (i.e., very narrow band). The signal from the frequency source FREQ SOURCE in FIG. 18 corresponds to the signal coupled from frequency source 110 to mixer 120 of FIG. 3, and the signal FREQ SOURCE is a signal that may be tuned by frequency source 110 over a range of frequencies. In the present example of the improvement, the range of frequencies varies from 3,825 MHz to 4,295 MHz.

This single sideband frequency converter controls the amplitude and phase of its internal signals so that upon recombination of the signals the lower sideband mixer products are cancelled and the upper sideband mixer products are provided at its output to be filtered through bandpass filter 850 (as an example of filter 130 of FIG. 3). At least because phase is to be controlled, lines connecting the frequency converter's components should be carefully arranged to maintain proper phase relationships as discussed herein.

Reference signal REF is coupled to the input port of quadrature coupler 812. Responsive to reference signal REF, coupler 812 provides an in-phase signal (at the port labeled I) and a quadrature-phase signal (at the port labeled Q) to port 1 of power splitters 814 and 816, respectively. The isolated port of coupler 812 is terminated in resistive load 818. Splitter 814 splits the I signal into two signals of equal power and phase that are provided at ports 2 and 3. Similarly, splitter 816 splits the Q signal into two signals of equal power and phase that are provided at ports 2 and 3. A signal at either port 2 or 3 of splitter 814 is orthogonal to a signal at either port 2 or 3 of splitter 816. Ports 2 and 3 of splitters 814 and 816 provide four signals coupled to the local oscillator inputs of respective mixers 832, 834, 836, 838.

Figure 19:
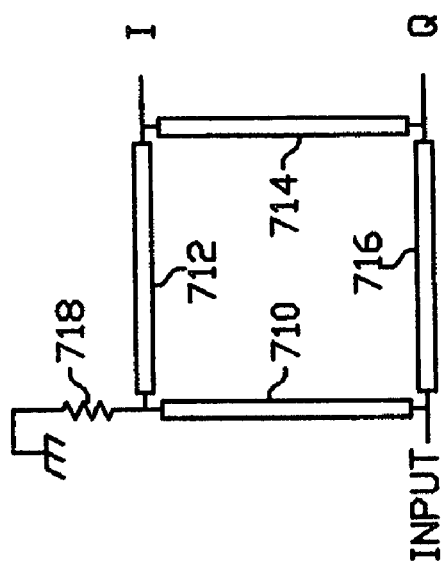

In particular embodiments, quadrature coupler 812 of FIG. 18 is a box type branch line coupler as depicted in FIG. 19, preferably a single-box branch line coupler since reference signal REF is a signal at a single predetermined frequency. The coupler of FIG. 19 includes four transmission line segments 710, 712, 714, 716. Each of the segments preferably has a length of one quarter-wavelength, but any odd multiple of a quarter-wavelength will do (e.g., ¾, ⁵⁄₄, etc). The coupler is fed from a point at the intersection of segments 716 and 710 (port 1), and an isolation port is terminated at the intersection of segments 710 and 712 (port 2) into load 718 (or 818 of FIG. 18). Outputs are taken from both the intersection of segments 712 and 714 (port 3) or the intersection of segments 714 and 716 (port 4). Port 1 is driven from a source having an impedance of Z0, and ports 2, 3 and 4 are terminated in loads having an impedance of Z0. Each of transmission line segments 710 and 714 has an impedance of Z0 for the segment. Each of transmission line segments 712 and 716 has an impedance of $\sqrt{2}$*Z0 for the segment.

The single-box branch line coupler resonates at a wavelength equal to the perimeter of the coupler. The coupling between port 1 and ports 3 and 4 (the I and Q ports) is frequency dependent. However, this proves to be no limitation since reference signal REF is a signal of a predetermined frequency. In the example of the improvement discussed herein, reference signal REF has a frequency equal to 1,006,633,022¼ Hz. This single narrow band signal is easy to orthogonalize in coupler 812. A signal entering port 1 is split into two quadrature signals having equal power and output at ports 3 and 4. When impedances are properly matched, the amplitude of the I signal is nearly identical to the amplitude of the Q signal, and the phase of the two signals are perfectly orthogonal. However, the return loss (reflections back from port 1 or into isolated port 2) are more sensitive to frequency. However, at the single frequency of reference signal REF, the signal power reflected from port 1 is more than 40 dB lower than the input signal power and the signal power out of isolated port 2 is more than 40 dB lower than the input signal power.

Quadrature coupler 812 (FIG. 18) could be implemented as a Lange quadrature coupler. Lange couplers have interdigitated parallel striplines or microstrips, and are characterized by a broader bandwidth for the same performance. Coupler 812 could also be implemented as a lumped element quadrature coupler. Lumped element quadrature couplers typically have narrow band performance (e.g., 1%), but this does not present a limitation since reference signal REF has a single predetermined frequency. At the frequency of reference signal REF (i.e., about 1 GHz), the lumped element components (inductors and capacitors) could be implemented in either monolithic microwave integrated circuits or metalizations deposited on insulating substrates such as alumina. Inductors might be implemented as spiral coils or even a single layer loop, and capacitors may be implemented as either overlaid capacitor electrodes insulated from one another or as edge butted conductors on in a single layer of metallization.

Referring again to the offset mixer depicted in FIG. 18, the in-phase signal at the port labeled I of coupler 812 is coupled to port 1 of power splitter 814, and the quadrature-phase signal at the port labeled Q of coupler 812 is coupled to port 1 of power splitter 816. The isolated port of coupler 812 is terminated in resistive load 818. Splitter 814 splits the I signal into two signals of equal power and phase that are provided at ports 2 and 3. Similarly, splitter 816 splits the Q signal into two signals of equal power and phase that are provided at ports 2 and 3. Ports 2 and 3 of splitters 814 and 816 provide four signals coupled to the local oscillator inputs of respective mixers 832, 834, 836, 838.

Figure 21:
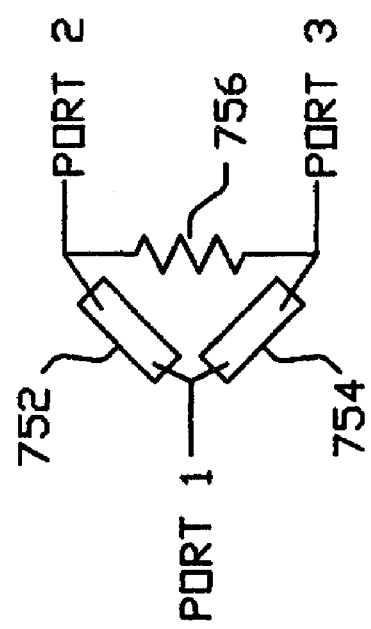

An example of power splitter 814 or 816 is depicted in FIG. 21. The splitter in this example is referred to as a Wilkerson power splitter. In FIG. 21, port 1 is driven from a line having an impedance of Z0, and loads applied to ports 2 and 3 each have an impedance of Z0. Resistance 756 between ports 2 and 3 is two times Z0, and the impedances of arms 752 and 754 are each $\sqrt{2}*Z0$. Arms 752 and 754 are each preferably of length equal to a quarter-wavelength, but any odd multiple of a quarter-wavelength will do (e.g., ¾, 5/4, etc). Lumped element versions of the Wilkerson power splitter use the same resistor, but replace arms 752 and 754 with inductors and couple each port to ground through a capacitor. The lumped element version has about one-half the bandwidth of the micro-strip versions.

Referring again to the offset mixer depicted in FIG. 18, coupler 822 and splitters 824 and 826 perform similar functions to the functions performed by coupler 812 and splitters 814 and 816, except that they perform at a frequency that may vary over a bandwidth from 3,825 MHz to 4,295 MHz, at least in the present example of the improvement described herein.

Figure 20:
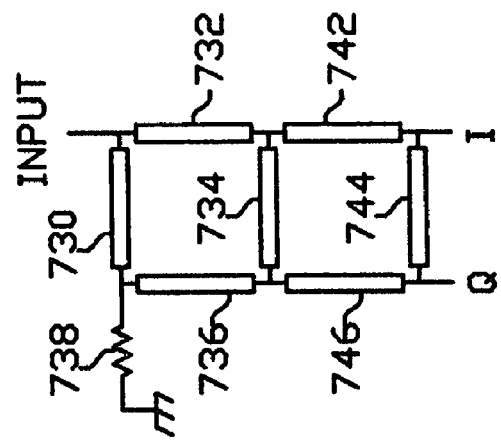
FIGS. 19 and 20 are schematic diagrams depicting quadrature couplers as used in examples of the present invention.

A single-box branchline coupler has a relatively narrow band over which the performance is achieved, at least as to the signal reflected from input port 1 and the signal out of isolated port 2. Therefore, for coupler 822, a double-box branchline coupler (see FIG. 20) is the device of choice. The coupler of FIG. 20 includes seven transmission line segments 730, 732, 734, 736, 742, 744, 746. Each of the segments preferably has a length of one quarter-wavelength, but any odd multiple of a quarter-wavelength will do (e.g., ¾, 5/4, etc). The coupler is fed from a point at the intersection of segments 732 and 730 (port 1), and an isolation port is terminated at the intersection of segments 730 and 736 (port 2) into load 738 (or 828 of FIG. 18). Outputs are taken from both the intersection of segments 742 and 744 (port 3) or the intersection of segments 744 and 746 (port 4). Port 1 is driven from a source having an impedance of Z0 and ports 2, 3 and 4 are terminated in loads having an impedance of Z0. Each of transmission line segments 732, 736, 742 and 746 has an impedance of Z0 for the segment. Each of transmission line segments 730 and 744 has an impedance of $(Z0+\sqrt{2}*Z0)$ for the segment. The coupling transmission line segment 734 has an impedance of $\sqrt{2}*Z0$ for the segment. These line lengths and impedances may be adjusted with minimal experimentation to optimize the orthogonality of the I and Q signals and equalize the amplitudes of the I and Q signals over the bandwidth of interest (e.g., from 3,825 MHz to 4,295 MHz in the present example of the improvement described herein).

Lumped element branchline couplers may be used in place of double-box branchline couplers but typically have lower performance in the frequency range from 3,825 MHz to 4,295 MHz. If lumped element circuits are used, the elements are best achieved in this frequency range using monolithic microwave integrated circuits. Lumped elements made as spirals and capacitors from stripline technologies would be more difficult to achieve, but not impossible.

Referring again to the single sideband mixer depicted in FIG. 18, splitters 824 and 826 perform similar functions to the functions performed by splitters 814 and 816, except that they perform at a frequency that may vary over a bandwidth from 3,825 MHz to 4,295 MHz, at least in the present example of the improvement described herein. This band spread is about 12%. Single stage Wilkerson power splitters provide respectable performance over a bandwidth of about 20%. However, a multistage splitter may be used when greater performance is desired as measure by phase and amplitude performance. Just like multistage branchline couplers can achieve broadband coupler performance, multistage Wilkerson power splitters can achieve broadband splitter performance.

Figure 22:
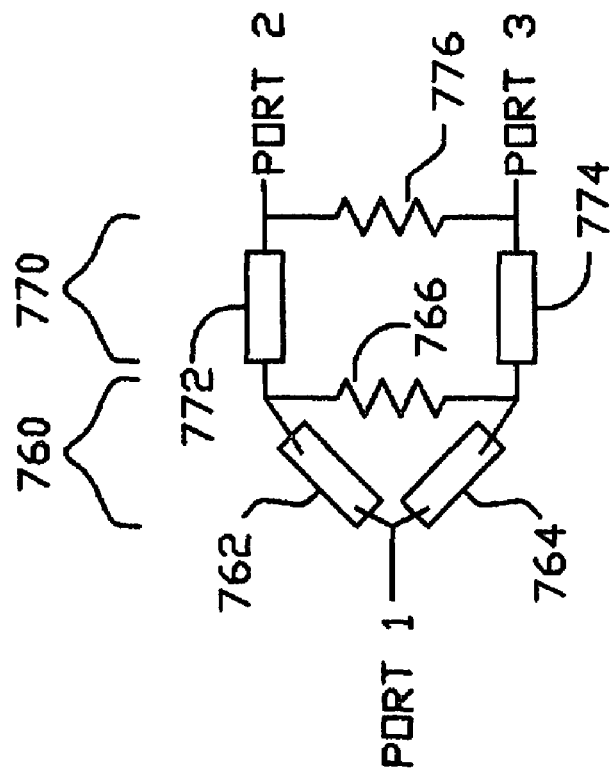
FIGS. 21 and 22 are schematic diagrams depicting power splitters as used in examples of the present invention.

FIG. 22 depicts a two-stage Wilkerson power splitter. Such a splitter provides improved phase and amplitude equalization over a bandwidth than a single stage Wilkerson splitter.

Setting aside for the moment the question of implementation of mixers 832, 834, 836, 838, the outputs of mixers 832, 834, 836, 838 are coupled to combiners 842, 844 and branchline coupler 846. Power splitters (e.g. FIGS. 21 and 22) function as power combiners when operated in a reverse direction. Furthermore, when a branchline coupler is excited by a pair of signals in phase quadrature, the input becomes an output and the coupler operates in reverse. The combined output of coupler 846 passes through bandpass filter 850. Note the similarity between mixer 400 depicted in FIG. 8 and the offset mixer depicted in FIG. 18. Both implement a single sideband function by judicious control of phase and amplitude of signals internal to the single sideband mixer.

Also note that the single sideband mixer of FIG. 18 incorporates a 180-degree phase shifter at 840 of FIG. 18 at the place of the minus sign at the input to sine adder 408 in FIG. 8. The 180-degree phase shift can be accomplished with a one-half wavelength line stretcher when operated at a single frequency. However, over a bandwidth, slight phase errors may be introduced.

Figure 23:
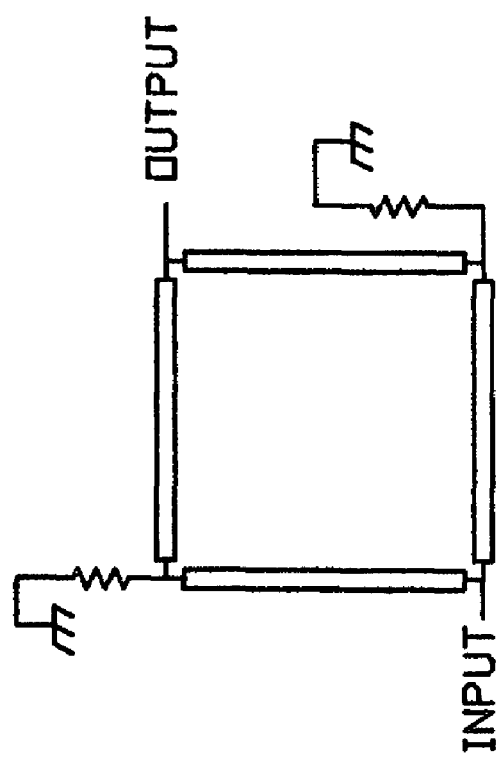

There are many ways to achieve a 180-degree phase shift while minimizing the slight phase errors that arise with a simple line stretcher. In FIG. 23, a single-box branchline coupler produces one output that is delayed with respect to the input by 90 degrees and another output that is delayed with respect to the input by 180 degrees. A 180-degree phase shifter is achieved by replacing line stretcher 840 with a single-box branchline coupler, terminating the 90 degree delayed signal in an impedance matched load and coupling the 180-degree delayed signal into port 2 of combiner 844 (FIG. 18). This achieves the 180-degree phase delay across a broad band, but the output signal power is half of the input power since the other half dissipates in the matched termination. For proper operation of the single sideband mixer of FIG. 18, it is necessary to similarly attenuate all the other signals into combiners 842 and 844, but the attenuation can be achieved with extremely broad band resistive attenuators.

Figure 24:
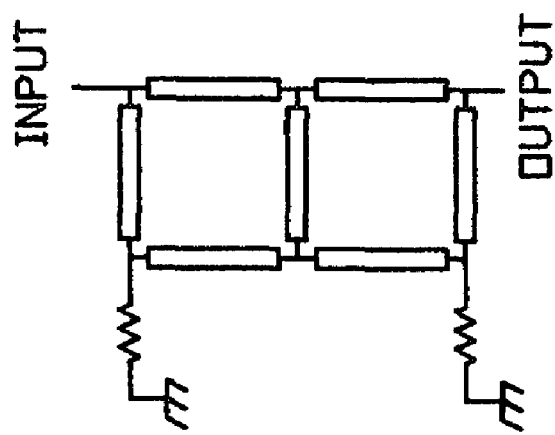
FIGS. 23 and 24 are schematic diagrams depicting couplers used as broad band line stretchers as used in examples of the present invention.

In FIG. 24, a double-box branchline coupler produces one output that is delayed with respect to the input by 180 degrees and another output that is delayed with respect to the input by 270 degrees. Just count the number of quarter-wavelength transmission line segments. A 180-degree phase shift is achieved by replacing line stretcher 840 with a double-box branchline coupler, terminating the 270 degree delayed signal in an impedance matched load and coupling the 180-degree delayed signal into port 2 of combiner 844. This achieves the 180-degree phase delay across an even broader band. However, the output signal power is half of the input power since the other half dissipates in the matched termination. Here again, it is necessary to similarly attenuate all the other signals that are coupled combiners 842 and 844, but the attenuation can be achieved with extremely broadband resistive attenuators.

An implementation for mixers 832, 834, 836, 838 of FIG. 18 is now considered. At the frequencies involved in the present example, the mixers are usually based on mixer diodes. The mixers 832, 834, 836, 838 provide mixing of reference signal REF (about 1,007 MHz) with the signal from frequency source FREQ SOURCE that can vary in frequency over a bandwidth from 3,825 MHz to 4,295 MHz, at least in the present example of the improvement described herein. The output of the single sideband mixer is then filtered through bandpass filter 850 (FIG. 18). Bandpass filter is designed to pass 4,832 MHz to 5,302 MHz, at least in the present example of the improvement described herein.

A single diode mixer could be used for implementation of each of the mixers 832, 834, 836, 838. The two input signals to such a mixer are the signal REF (at about 1,007 MHz) and the signal from frequency source FREQ SOURCE (at a frequency from 3,825 MHz to 4,295 MHz). The output signals from such a mixer are the sum and difference signals plus bleed through of the input signals. The task of isolating the desired output signal is the burden of the output filter. The single sideband mixer of FIG. 18, when tuned to the upper sideband, suppresses the lower sideband by about 25 dB due to phase cancellation as discussed with respect to FIG. 8. Therefore when a single diode mixer is used for each of the mixers 832, 834, 836, 838, the output signals of the single sideband mixer depicted in FIG. 18 includes the sum signal plus bleed through of the two input signals. The difference signal is present in the output, but it is suppressed by about 25 dB. Higher order spurious signals (spurs) resulting from the mixers are also present in the output, but such spurs do not have high signal power when the mixers are properly designed.

A balanced mixer is a preferred choice for implementation of each of the mixers 832, 834, 836, 838. A balanced mixer produces sum and difference frequencies but suppresses the carrier signal. The carrier signal is one of the inputs to the balanced mixer, and the carrier signal is defined as the signal into the balanced mixer that will be suppressed. This feature eliminates, or at least reduces, bleed through of one of the mixer input signals. Additionally, the single sideband mixer of FIG. 18 will suppress the difference signal because of the single sideband mixer's phase and amplitude structure, so the difference signal is not a concern when using a single sideband frequency converter even when other types of mixers are used to implement each of the mixers 832, 834, 836, 838.

However, it is still desired to suppress bleed through of at least one of the input signals to the mixers, and the carrier that is suppressed by the balanced mixer is one of the input signals to the mixers. Embodiments of the improvement described herein are arranged to couple the signal from frequency source FREQ SOURCE (at a frequency from 3,825 MHz to 4,295 MHz) to the balanced mixer as the carrier to be suppressed (typically by about 30 dB). In such embodiments, the output signals from the single sideband mixer depicted in FIG. 18 (tuned to the upper sideband) include the signal REF (at about 1,007 MHz) and the sum signal (i.e., the desired signal at frequencies between 4,832 MHz to 5,302 MHz, at least in the present example of the improvement described herein). It is therefore up to bandpass filter 850 (FIG. 18) to have a band stop designed into the filter to suppress the signal REF (at about 1,007 MHz).

The double-balanced mixer discussed with respect to FIG. 17 is but an example of the general class of balanced mixers suitable for implementation of each of the mixers 832, 834, 836, 838 of FIG. 18. A diode quad is central to this type of double balanced mixer. A first mixer input at 920 injects the lowest frequency into embedding circuit 922 of the mixer. The first mixer input for each of the mixers 832, 834, 836, 838 comes from either power splitter 814 or 816 according to FIG. 18. A second mixer input at 940 injects the higher frequency into embedding circuit 942 of the mixer. The second mixer input for each of the mixers 832, 834, 836, 838 comes from either power splitter 824 or 826 according to FIG. 18.

The two input frequencies mix in diode quad 910, and the mixed output is passed out of the mixer to the output terminal at 960. The output signal will include the sum signal with frequency that varies from 4,832 MHz to 5,302 MHz, in the present example, and the difference signal with frequency that varies from 2,818 MHz to 3,288 MHz, in the present example. Very little of the signal at 940 couples to the output signal at 960 due to the structural arrangement of the double-balanced mixer depicted in FIG. 17. Isolation in excess of 30 dB can be achieved.

The signal at 920 (FIG. 17) could punch through the mixer to the output signal at 960. Therefore, capacitors 962 and 964 are sized to pass a frequency that varies from 4,832 MHz to 5,302 MHz but block the low frequency of 1,006,633,022¼ Hz. Similarly, inductors 924 and 926 are sized to block high frequencies in the ranges from 4,832 MHz to 5,302 MHz but pass the low frequency of 1,006,633,022¼ Hz. Furthermore, the frequency differences between the signal at 920 and the sum signal with frequency that varies from 4,832 MHz to 5,302 MHz are such that the physical size of combiners 842 and 844 and coupler 846 (see FIG. 18) will naturally attenuate a signal with a frequency of 1,006,633,022¼ Hz. Bandpass filter 850 includes a stop band at about 1,007 MHz to further attenuate the local oscillator signal REF. Since the phase and amplitude processing of the single sideband mixer depicted in FIG. 18 suppresses the lower sideband (e.g., the difference signal with frequency that varies from 2,818 MHz to 3,288 MHz, in the present example), the output signal from the single sideband frequency converter depicted in FIG. 18 is substantially limited to a frequency that varies from 4,832 MHz to 5,302 MHz even before the output signal passes through filter 850.

In a more specific example, an RF bridge (100, FIG. 2) is coupled to a processor (200, FIG. 2) to receive a reference signal (302, FIG. 2) from the processor. The RF bridge (100) includes a first frequency converter (160, FIG. 3), a second frequency converter (140, FIG. 3), a frequency source (110, FIG. 3) and a single sideband frequency converter (see FIG. 18, also see 120, FIG. 3). The first frequency converter (160, FIG. 3) is coupled to a first antenna (102, FIG. 3), and the second frequency converter (140, FIG. 3) is coupled to a second antenna (104, FIG. 3). The frequency source (110, FIG. 3) is coupled to the first frequency converter (160, FIG. 3). The single sideband frequency converter (see FIG. 18, also see 120, FIG. 3) is coupled to the reference signal (302, FIG. 3) and coupled between the frequency source (110, FIG. 3) and the second frequency converter (140, FIG. 3).

In a variant of this example, the single sideband frequency converter (see FIG. 18, also see 120, FIG. 3) includes a first balanced mixer (832, FIG. 18).

In an embodiment of this variant, the single sideband frequency converter (see FIG. 18, also see 120, FIG. 3) includes a first quadrature coupler (822, FIG. 18) coupled between the frequency source (110, FIG. 3) and the first balanced mixer (832, FIG. 18).

In another embodiment of this variant, the single sideband frequency converter (see FIG. 18, also see 120, FIG. 3) includes another quadrature coupler (812, FIG. 18) coupled between the reference signal REF and the first balanced mixer (832, FIG. 18).

In a second variant of this example, the first balanced mixer 832, FIG. 18) is a doubly balanced mixer (as depicted in FIG. 17) that includes a diode quad (910, FIG. 17), and the diode quad (910) includes first, second, third and fourth terminals (914, 916, 918, 912, respectively). The first and third terminals (914, 918) are coupled to the frequency source (110, FIG. 3), and the second and fourth terminals (916, 912) are coupled to the reference signal REF.

In a third variant of this example, the single sideband frequency converter (see FIG. 18, also see 120, FIG. 3) includes three additional balanced mixers (834, 836, 838).

In operation, signals are processed through the RF bridge by mixing a reference signal (REF of FIG. 18) from a processor (200, FIG. 3) with a source signal (FREQ SOURCE of FIG. 18) from a frequency source (110, FIG. 3) in a single sideband converter (FIG. 18 as an example of 120 of FIG. 3). The signals are further processed by mixing a first antenna signal (from 102 of FIG. 3) with the source signal (FREQ SOURCE of FIG. 18 as an example of the signal from 110, FIG. 3) in a first frequency converter (160 of FIG. 3), and mixing a second antenna signal (from 104 of FIG. 3) with an offset signal (passing though filter 850 of FIG. 18) from the single sideband frequency converter (FIG. 18 as an example of 120 of FIG. 3) in a second frequency converter (140 of FIG. 3).

In a first variant of this operation, the mixing of the reference signal (REF, FIG. 18) with the source signal (FREQ SOURCE, FIG. 18) includes mixing a first signal derived from the reference signal with a first signal derived from the source signal in a first balanced mixer (832, FIG. 18).

In a second variant of this operation, the mixing of the reference signal (REF, FIG. 18) with the source signal (FREQ SOURCE, FIG. 18) includes both forming in-phase and quadrature-phase components (e.g., in 812, FIG. 18) of the reference signal REF, and mixing the in-phase and quadrature-phase components with either the source signal (FREQ SOURCE, FIG. 18) or a signal derived from the source signal (e.g., a signal out of the I port or the Q port of 822, FIG. 18).

In a third variant of this operation, the mixing of the reference signal (REF, FIG. 18) with the source signal (FREQ SOURCE, FIG. 18) includes both forming in-phase and quadrature-phase components (e.g., in 822, FIG. 18) of the source signal (FREQ SOURCE), and mixing the in-phase and quadrature-phase components with either the reference signal (REF, FIG. 18) or a signal derived from the reference signal (e.g., a signal out of the I port or the Q port of 812, FIG. 18).

In an embodiment of the first variant of this operation where the first balanced mixer (832, FIG. 18) includes a doubly balanced mixer (as depicted in FIG. 17) that includes a diode quad (910, FIG. 17) and the diode quad includes first, second, third and fourth terminals (914, 916, 918, 912, respectively, FIG. 17), the mixing of the reference signal with the source signal further includes coupling the first and third terminals (914, 918, FIG. 17) to a balanced signal (passing through 944, 946 of FIG. 17) derived from the source signal (FREQ SOURCE of FIG. 18 and passed through port 3 of 826 of FIG. 18, and depicted at 940 of FIG. 17). The mixing of the reference signal with the source signal further includes coupling the second and fourth terminals (916, 912, FIG. 17) to a balanced signal (passing through 924, 926 of FIG. 17) derived from the reference signal (REF of FIG. 18 and passed through port 2 of 814 of FIG. 18, and depicted at 920 of FIG. 17).

In a specific example of the embodiment of the first variant of this operation, the mixing of the reference signal with the source signal further includes coupling the second and fourth terminals (916, 912, FIG. 17) to a balanced signal (passing through 924, 926 of FIG. 17 through 842 and 846 of FIG. 18 and through filter 850 to the second frequency converter (140, FIG. 3).

In another embodiment of the first variant of this example of this operation, the mixing of the reference signal (REF, FIG. 18) with the source signal (FREQ SOURCE, FIG. 18) includes mixing a second signal derived from the reference signal (e.g., the signal from port 2 of 816 of FIG. 18) with a second signal derived from the source signal (e.g., the signal from port 3 of 824 of FIG. 18) in a second balanced mixer (834, FIG. 18). The mixing of the reference signal with the source signal further includes mixing a third signal derived from the reference signal (e.g., the signal from port 3 of 814 of FIG. 18) with a third signal derived from the source signal (e.g., the signal from port 2 of 824 of FIG. 18) in a third balanced mixer (836, FIG. 18). The mixing of the reference signal with the source signal further includes mixing a fourth signal derived from the reference signal (e.g., the signal from port 3 of 816 of FIG. 18) with a fourth signal derived from the source signal (e.g., the signal from port 2 of 826 of FIG. 18) in a fourth balanced mixer (838, FIG. 18). The balanced mixers are not necessarily required to be doubly balanced mixers.

In this example using a single sideband frequency converter, the two input signals to the mixer have frequencies of:

1. spectrally pure 1,006,633,022¼ Hz (reference signal), and 2. from 3,825 MHz to 4,295 MHz (frequency source 110 of FIG. 3), and the signals produced as mixer products have frequencies that vary:

3. from 2,818 MHz to 3,288 MHz (difference signal); and 4. from 4,832 MHz to 5,302 MHz (sum signal).

Only the sum signal is desired in this example. First, the symmetry of the balanced mixer structure (either doubly balanced as in FIG. 17 or any generally balanced mixer) suppresses the power of the carrier signal by about 30 dB. The present improvement configures the signal from frequency source 110 of FIG. 3 as the carrier signal (at a frequency that varies from 3,825 MHz to 4,295 MHz), so that the output power at the frequency of the carrier signal is suppressed by about 30 dB as it passes through the any balanced mixer.

Second, by controlling the amplitudes and phases of signals internal to the single sideband frequency converter (FIG. 18), the configuration of the single sideband frequency converter suppresses by about 25 dB the signal power of the lower sideband signal (i.e., the difference signal at a frequency that varies from 2,818 MHz to 3,288 MHz).

Third, although reference signal REF (the second input to the single sideband mixer) has the potential to bleed through to the output of the single sideband converter (FIG. 18), it is a very narrow band signal and easy to block. To the extent that signal power from reference signal REF passes through the single sideband frequency converter (FIG. 18) to pass through output filter 850, the frequency of the reference signal can be effectively blocked by a narrow band blocking filter built into filter 850, preferably controlled by a dielectric resonator or similar component.

The use of the single sideband frequency converter (FIG. 18) with balanced mixers (not necessarily doubly balanced) has the advantage of suppressing the power of the difference signal and the signal from the frequency source (110, FIG. 3) at the output. The suppression of these broad band signals relieves design constraints that would otherwise have to be imposed on filter 850 (FIG. 18) or filter 130 (FIG. 3). Any bleed through of signal power from reference signal REF is easily suppressed by a narrow band stop band filter.

Briefly referring to RF bridge 100 of FIG. 3, frequency source 110 provides a first LO signal to frequency converter 160. In addition, frequency source 110 is frequency shifted in offset mixer 120 and filter 130 by reference signal REF to provide a second LO signal to frequency converter 140. In the example discussed herein, the signal FREQ SOURCE from frequency source 110 has a frequency that varies from 3,825 MHz to 4,295 MHz. The second LO signal input to frequency converter 140 has a frequency that varies from 3,825 MHz to 4,295 MHz (i.e., the signal FREQ SOURCE from frequency source 110) plus 1,006,633,022¼ Hz (i.e., reference signal REF). In the example discussed herein, offset mixer 120 and filter 130 of FIG. 3 is implemented as either the double-balanced mixer depicted in FIG. 17 or the single sideband frequency converter depicted in FIG. 18.

Figure 25:
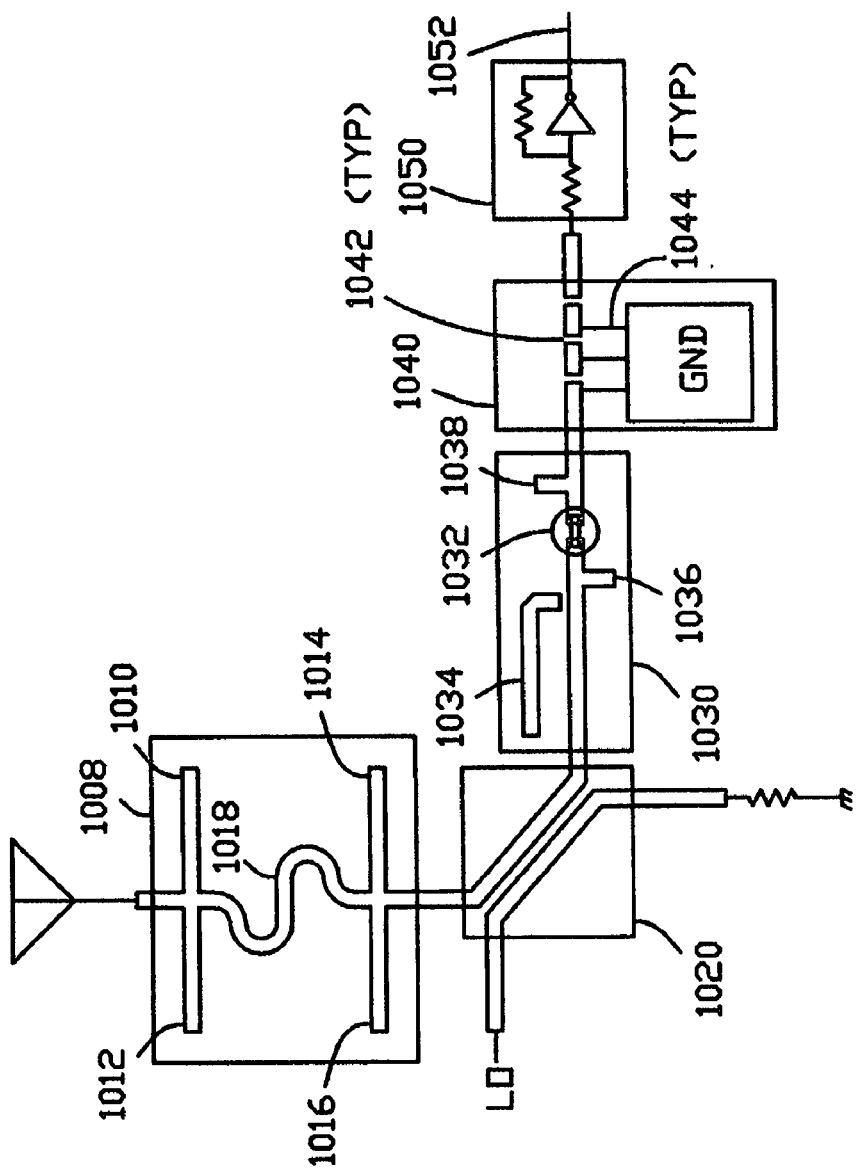
FIG. 25 is a schematic diagram depicting an RF frequency converter to mix antenna signals as used in examples of the present invention.

FIG. 25 depicts details embodiments of frequency converter 140 or frequency converter 160 as used in the present example. When FIG. 25 depicts an embodiment implementing frequency converter 160 of FIG. 3, bandpass filter 1008 functions as an anti-alias filter between antenna 102 and frequency converter 160. When FIG. 25 depicts an embodiment implementing frequency converter 140 of FIG. 3, bandpass filter 1008 functions as an anti-alias filter between antenna 104 and frequency converter 140. In either case, bandpass filter 1008 passes signals in the band between 2,500 MHz and 3,000 MHz, at least in the present example. Bandpass filter 1008 includes tuning stubs 1010, 1012, 1014 and 1016 that provide capacitive reactance at the bandpass frequencies. Meander line 1018 is of a length that provides inductive reactance at the bandpass frequencies. The inductive reactance of meander line 1018 and the capacitive reactance of tuning stubs 1010, 1012, 1014 and 1016 are selected to provide a bandpass filter. Other embodiments use different anti-alias filter or omit the anti-alias filter altogether.

The output of band pass filter 1008 is coupled to a first input of directional coupler 1020. A second input of directional coupler 1020 is a local oscillator input and is coupled to a local oscillator source. When FIG. 25 depicts an embodiment implementing frequency converter 160 of FIG. 3, the local oscillator input to directional coupler 1020 is coupled to the signal FREQ SOURCE from frequency source 110. When FIG. 25 depicts an embodiment implementing frequency converter 140 of FIG. 3, the local oscillator input to directional coupler 1020 is coupled to an output of offset mixer 120 and filter 130 of FIG. 3. In the present example, frequency converter 120 and filter 130 are implemented as either the double-balanced mixer depicted in FIG. 17 or the single sideband frequency converter depicted in FIG. 18.

In the frequency ranges discussed in the present example, directional coupler 1020 may be implemented as coupled parallel transmission lines, overlapping parallel transmissions, or even discrete components using monolithic microwave integrated circuits. The signal from the local oscillator input is superimposed on signals from the antenna and coupled to microwave mixer 1030. Unused signal power from the local oscillator input is terminated in a load. Other embodiments have the local oscillator coupled directly to the mixer diode.

The superimposed signals that are input into microwave mixer 1030 are mixed on nonlinear diode 1032. Typically, nonlinear diode 1032 is a Schottky barrier diode. The mixer image is terminated by image reflection filter 1034 on the input side of diode 1032. Image reflection filter 1034 is capacitively coupled to the input transmission line and may be terminated in either an open circuit or a short circuit. Microwave mixer 1030 further includes stub tuners 1036 and 1038 that function to impedance match diode 1032 to the rest of microwave mixer 1030. The diode manufacturer will typically provide guidance for such matching. Other embodiments have other mixer devices, such as transistors.

The output of microwave mixer 1030 is coupled to high pass filter 1040. Filter 1040 includes one or more series capacitors 1042 (typically, a gap in the transmission line at the frequencies of this example) and includes one or more inductances to ground (typically, a narrow long transmission line have inductance properties at the frequencies of this example). Then, the output of high pass filter 1040 is coupled to amplifier 1050 to provide an amplified signal at terminal 1052. The amplified signal at terminal 1052 is the sum signal of the mixer products, and the signal is filtered through a high Q filter (in this example, dielectric resonator bandpass filter depicted in FIG. 26).

In the example discussed herein, the mixer diode has a noise figure of about 4 dB, and the signal out of the amplifier (typically a 5 dB amplifier), raises the equivalent noise figure to about 5 dB. The signal insertion loss through direction coupler 1020 is about 3 dB, and the signal insertion loss through diode 1032 is about 3 dB, at least in the present example.

Figure 26:
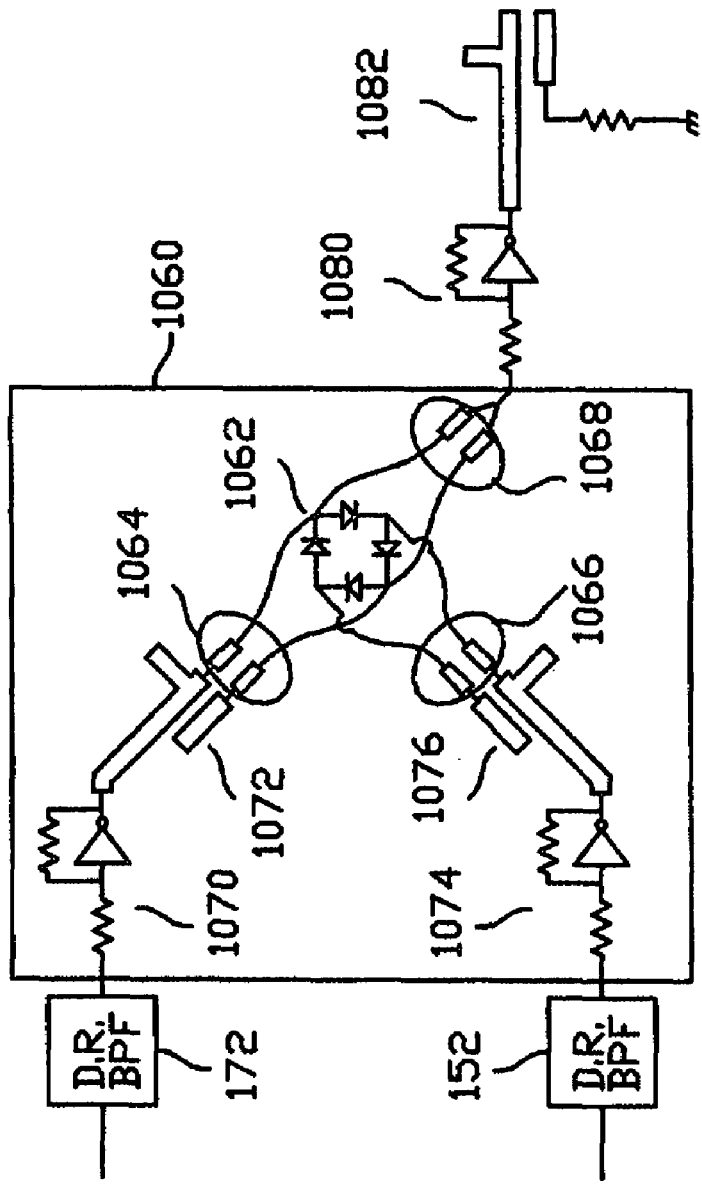
FIG. 26 is a schematic diagram depicting a mixer as used in examples of the present invention.

FIG. 26 depicts dielectric resonator band pass filters 152 and 172 (DR filters 152 and 172) as embodiments of filters 150 and 170 depicted in FIG. 3. In the present example, frequency source 110 steps through its band of frequencies in 1 MHz increments (i.e., producing 1 MHz channels). As a rule of thumb, the bandwidth (measured at 3 dB points) of DR filters 152 and 172 should be at least 20% greater than the channel width. Therefore, the bandwidth of the DR filters should be 1.2 MHz. Larger channel widths could be employed at the expense of increasing the noise bandwidth of the process. The center frequencies of DR filters 172 and 152 are 6,820 MHz and the sum of 6,820 MHz and 1,006,633,022¼ Hz (i.e., reference signal REF), respectively, at least in this example. The Q (quality factor) of DR filters 172 and 152 should be 5,683 or less and 6,523 or less, respectively. The bandwidth for calculation of noise is 1.2 MHz in the present example.

Also, FIG. 26 depicts frequency converter 1060, amplifier 1080 and balun 1082 as embodiments of frequency converter 180 and filter 190 depicted in FIG. 3. Frequency converter 1060 is based on a double-balanced mixer using diode quad 1062. The input signals into frequency converter 1060 have frequencies that are the center frequencies of DR filters 172 and 152 (i.e., 6,820 MHz and the sum of 6,820 MHz and 1,006,633,022¼ Hz (i.e., reference signal REF), respectively. Amplifier 1070 amplifies the signal from DR filter 172, and balun 1072 converts the unbalanced output signal from amplifier 1070 into a balanced signal. Amplifier 1074 amplifies the signal from DR filter 152, and balun 1076 converts the unbalanced output signal from amplifier 1074 into a balanced signal. The balanced signals from baluns 1072 and 1076 are coupled to diode quad 1062 through high pass filters 1064 and 1066, respectfully. Each of high pass filters 1064 and 1066 are typically a pair of matched capacitors sized to pass 6.8 GHz to 7.9 GHz at the frequencies described in the present example. Low pass filter 1068 couples the lower sideband of the mixer products into amplifier 1080. Low pass filter 1068 is typically a pair of matched inductors sized to pass 1.007 GHz but block 6.8 GHz to 7.9 GHz at the frequencies described in the present example.

The symmetry and structure of the RF bridge causes the frequencies generated in frequency source 110 (FIG. 3) to be nulled out in frequency converter 1060, and the difference in frequencies between the signals received on antennas 102 and 104 (FIG. 3) from the distant EMITTER (FIGS. 10-12) are modulated onto a carrier signal at 1,006,633,022¼ Hz (i.e., reference signal REF) that is amplified in amplifier 1080. The noise bandwidth of the signal through amplifier 1080 is defined by the bandwidth of DR filters 152 and 172. Frequency converter 1060 may be implemented in discrete components or integrated in a microwave integrated circuit (MIC).

Figure 27:
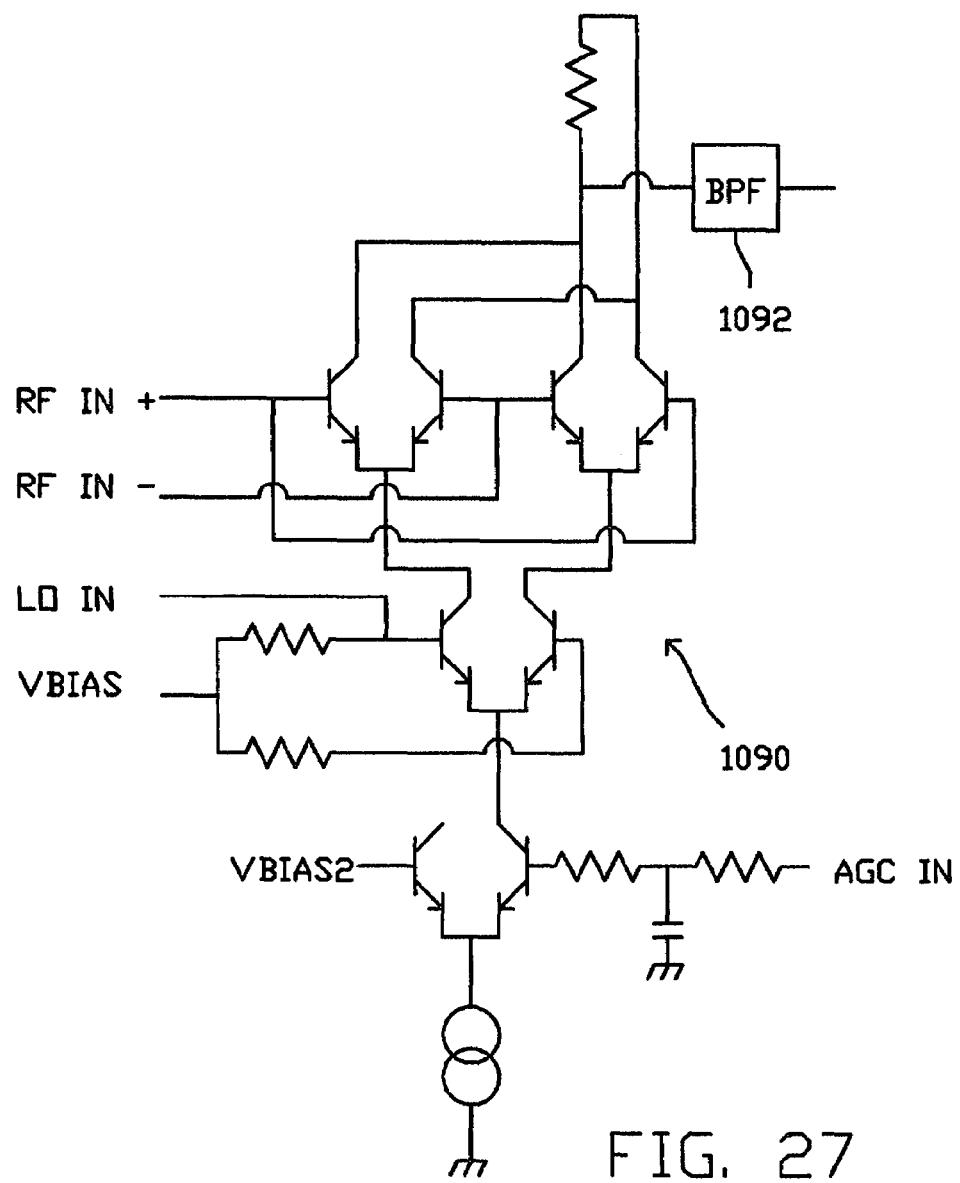
FIG. 27 is a schematic diagram depicting a down converter as used in examples of the present invention.

FIG. 27 depicts a Gilbert style double-balanced mixer (as mixer 1090) and band pass filter 1092 as an embodiment of mixer 340 and filter 350 as depicted in FIG. 5. Band pass filter 1092 corresponds to filter 350 of FIG. 5 providing information signal 204. In mixer 1090 depicted in FIG. 27, balanced line mixer input RF IN is coupled to the output of balun 1082 of FIG. 26 and functions as input signal 304 of FIG. 5. Alternatively, the coupling between amplifier 1080 of FIG. 26 and the RF input to mixer 1090 could be based on an unbalanced line. The operation of a mixer of the type depicted in FIG. 27 is discussed with respect to FIG. 16. However, other mixer types may be employed.

The local oscillator input LO IN to the mixer of FIG. 27 is coupled to the FC sinusoidal signal from FIG. 14 having a frequency, in this example, of 805,306,368 Hz. The output of mixer 1090 is coupled to band pass filter 1092. Band pass filter 1092 has a center frequency of 201,326,654¼ Hz in this example.

In a further example, band pass filter 1092 operates like resonator 540 of FIG. 13. In embodiments of band pass filter 1092, the filter is a crystal-controlled oscillator with a synchronization input that is coupled to the output of mixer 1090. The crystal-controlled oscillator is adjusted for a slightly less than unity oscillator loop gain so nonlinear distortions do not lead to spurious frequencies, so non-resonant frequencies do not self oscillate and so the desired resonant frequency resonates due to the additional energy at the resonant frequency added to the circuit by the synchronizing input. Band pass filter 1092 may advantageously include an AT cut quartz crystal that is cut to oscillate at 201,326,654¼ Hz in an overtone mode with a Q of about 75,000. Band pass filter 1092 would then have a bandwidth (at the 3 dB points) of about 3,000 Hz and a pass band center of 201,326,654¼ Hz. The noise bandwidth of the information signal is thus reduced from 1.2 MHz to 3,000 Hz providing significant improvement in signal to noise ratio.

The up converter and band pass filter depicted in FIG. 16 is but an example that corresponds to mixer 320 and band pass filter 330 depicted in FIG. 5. Similarly, the down converter and band pass filter depicted in FIG. 27 is but an example that corresponds to mixer 340 and band pass filter 350 also depicted in FIG. 5. Furthermore, the sinusoidal wave output of amplifier 590 depicted in FIG. 14 is but an example of frequency source 310 also depicted in FIG. 5. However, because band pass filter 1092 of FIG. 27 is a narrow band filter, the LO frequency source (e.g., 310, FIG. 5) must track frequency drift in the band pass of filter 1092 with sufficient accuracy so that information signals stay within the band pass of filter 1092 even though the environmental temperature may drift and even after significant component aging. Similarly, the reference frequency provided by the DDS depicted in FIG. 15 must also track frequency drift in the band pass of filter 1092 with sufficient accuracy so that information signals stay within the band pass of filter 1092 even though the environmental temperature may drift and even after significant component aging. A preferred way to achieve these goals is to provide a single reference source that provides the frequency reference for both the LO frequency source (e.g., 310, FIG. 5 or amplifier 590, FIG. 14) and the DDS depicted in FIG. 15 and provide that the frequency determining element of this common frequency source (e.g., a quartz crystal) is made from the same material as the frequency determining element as used in band pass filter 1092 of FIG. 27.

Figure 28:
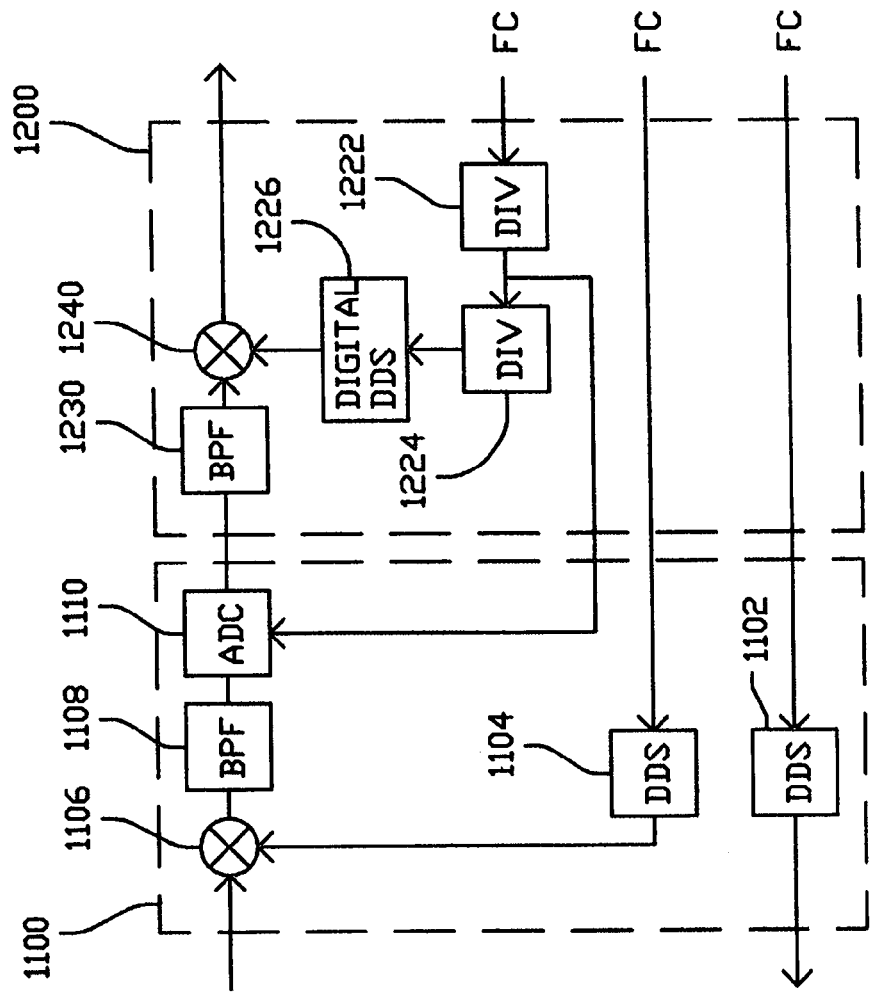
FIG. 28 is a schematic diagram depicting a portion of a processor as used in examples of the present invention.

FIG. 28 depicts a portion of an embodiment of processor 200 of FIGS. 2 and 4. FIG. 28 depicts analog front end 1100 and digital pre-processor 1200. Analog front end 1100 includes DDS 1102 and DDS 1104, the operation of which are described herein with respect to FIG. 15. DDS 1102 is an example of frequency source 206 and DAC 208 of FIG. 4. The analog output signal of each DDS is limited to frequencies achievable with integer values of the phase increment word M in accordance with:

$$F_{out} = \frac{M}{2^{32}} \cdot FC. \tag{22}$$

In the present example, the FC clock frequency is 805,306,368 Hz. The phase increment word M for DDS 1102 is preloaded with a value of 1,073,742,156 so that DDS 1102 generates a signal with an output frequency $F_{out}$ equal to 201,326,654¼ Hz. In the example presently under discussion, the phase increment word M for DDS 1104 is preloaded with a value of 1,073,406,602 so that DDS 1104 generates a signal with an output frequency $F_{out}$ equal to 201,263,737⅞ Hz.

In FIG. 28, analog front end 1100 further includes mixer 1106 and band pass filter 1108. Mixer 1106 mixes two signals that have very nearly the same frequency, about 201 MHz. An example of mixer 1106 is a Gilbert type double-balanced mixer as discussed herein with respect to FIG. 16. The mixer output includes a signal with both the sum and difference frequencies, but in the present example, it is the difference frequency that is desired. The difference frequency is 62,916⅜ Hz. Band pass filter 1108 is a very narrow band filter that has a pass band at 62,916⅜ Hz to select the difference frequency and reject out-of-band noise.

It is important to remember that 62,916⅜ Hz is the carrier frequency through band pass filter 1108 in this example. The difference in frequencies received at antennas 102 and 104 (FIGS. 1-3, 10 and 12) from a common emitter is ($\omega-\omega_O$) as discussed herein with respect to Tables 1 and 2. In the operating conditions discussed with respect to Tables 1 and 2, the frequency difference ($\omega-\omega_O$) to be measured is very small, typically between 0.5 and 1.4 Hz. This frequency difference has been modulated onto the carrier signal that has a 62,916⅜ Hz carrier frequency when the signal passes through band pass filter 1108 in this example. The pass band through filter 1108 need be no larger than, for example +/−3.2 Hz, implying a resonator filter where the resonator has a Q of about 10,000 and a pass band center frequency of 62,916⅜ Hz. A quartz crystal resonator filter is the logical choice. Quartz crystal resonators cut to resonate at 62,916⅜ Hz are typically "tuning fork" crystals. Millions of such tuning fork crystals that resonate at 32.8 kHz are made annually for use in crystal-controlled watches. Band pass filter 1108, in this example, is stabilized with a tuning fork quartz crystal to have a pass band of +/−3.2 Hz and a center frequency of 62,916⅜ Hz.

In FIG. 28, analog front end 1100 further includes analog-to-digital converter 1110 (ADC 1110). ADC 1110 is an example of ADC 210 of FIG. 4. Trigger pulses trigger ADC 1110 to generate digital output words. In this example, the trigger pulses repeat at a sample rate of 524,288 samples per second (SPS) producing digital words at the output of ADC 1110 at a rate of 524,288 SPS. Thus, a new digital word (i.e., sample) is prepared by ADC 1110 for every 43.2 degrees of phase of the signal out of band pass filter 1108.

As an example, a receiver as depicted in FIG. 1 or 2 includes RF bridge 100 and processor 200 coupled to the RF bridge to receive information signal 204 from the RF bridge. The processor includes a clock source (see FIGS. 13 and 14) and a processor front end (e.g., 1100 of FIG. 28). Processor front end 1100 includes a first frequency source 1102 operable to generate a reference signal based on a signal FC from the clock source and a second frequency source 1104 operable to generate a first local oscillator signal based on signal FC from the clock source. The reference signal 202 is coupled to the RF bridge 100 either directly (FIG. 1) or indirectly (FIG. 2). Processor front end 1100 also includes a processor down converter 1106 operable to heterodyne the first local oscillator signal (e.g., the signal from 1104) and the information signal (e.g., 204, FIG. 1 or 2). An example of the first local oscillator signal is the signal coupled from source 1104 to down converter 1106 as depicted in FIG. 28. Processor front end 1100 further includes an analog to digital converter 1110 coupled, directly or indirectly, to the processor down converter 1106 and operable to provide a digitized down converted signal. In some particular examples, the reference signal 202 (FIG. 1 or 2) and first local oscillator signal are characterized by a predetermined reference frequency and a predetermined local oscillator frequency respectively, and the predetermined local oscillator frequency and the predetermined reference frequency are different from one another.

In operation, a reference signal is generated based on a signal FC from a clock source (e.g., FIGS. 13 and 14). The reference signal may be generated in a DDS as depicted in FIG. 15. The reference signal is coupled to an RF bridge (100, FIG. 1 or 2). RF bridge 100 generates an information signal based on the reference signal with a frequency difference modulated thereon. The frequency difference is a difference between frequencies of first and second RF signals received at respective first and second antennas 102, 104. A first local oscillator signal is generated based on the signal FC from the clock source. The first local oscillator signal and the information signal are heterodyned to provide a heterodyned signal. The heterodyned signal, or a signal derived from the heterodyned signal, is sampled in an analog to digital converter to provide a digitized down converted signal. Typically, the reference signal and the first local oscillator signal are characterized by a predetermined reference frequency and a predetermined local oscillator frequency respectively, and the predetermined local oscillator frequency and the predetermined reference frequency are different from one another.

In a variant of the above example, the processor front end 1100 further includes a filter 1108 coupled between the processor down converter 1106 and the analog to digital converter 1110. Filter 1108 is characterized by a pass band that passes frequencies within a frequency band centered about a frequency equal to a difference between the predetermined local oscillator frequency and the predetermined reference frequency, and filter 1108 is further characterized by a stop band that blocks frequencies within a frequency band centered about a frequency equal to a sum of the predetermined local oscillator frequency and the predetermined reference frequency.

In FIG. 28, digital pre-processor 1200 includes frequency divider 1122 to provide the sample pulses to ADC 1110. Digital pre-processor also includes digital divider 1224, digital DDS 1226, digital filter 1230 and digital mixer 1240 (i.e., digital multiplier). Digital filter 1230 is another example of band pass filter 220 of FIG. 4, and digital mixer 1240 is an example of mixer 240 of FIG. 4. Digital divider 1222 divides the FC clock frequency (i.e., 805,306,368 Hz) by 1536 to produce the ADC 1110 sample rate of 524,288 SPS. Digital divider 1224 then divides the ADC 1110 sample rate of 524,288 SPS by 2 to provide a sample rate of 262,144 SPS to drive digital DDS 1226. Digital DDS 1226 is a DDS similar to the DDS discussed with respect to FIG. 15 except that no digital-to-analog converter is provided because the output of DDS 1226 is a series of digital words that repeat at 262,144 SPS. Digital DDS 1226 is an example of frequency source 230 of FIG. 4.

Figure 29:
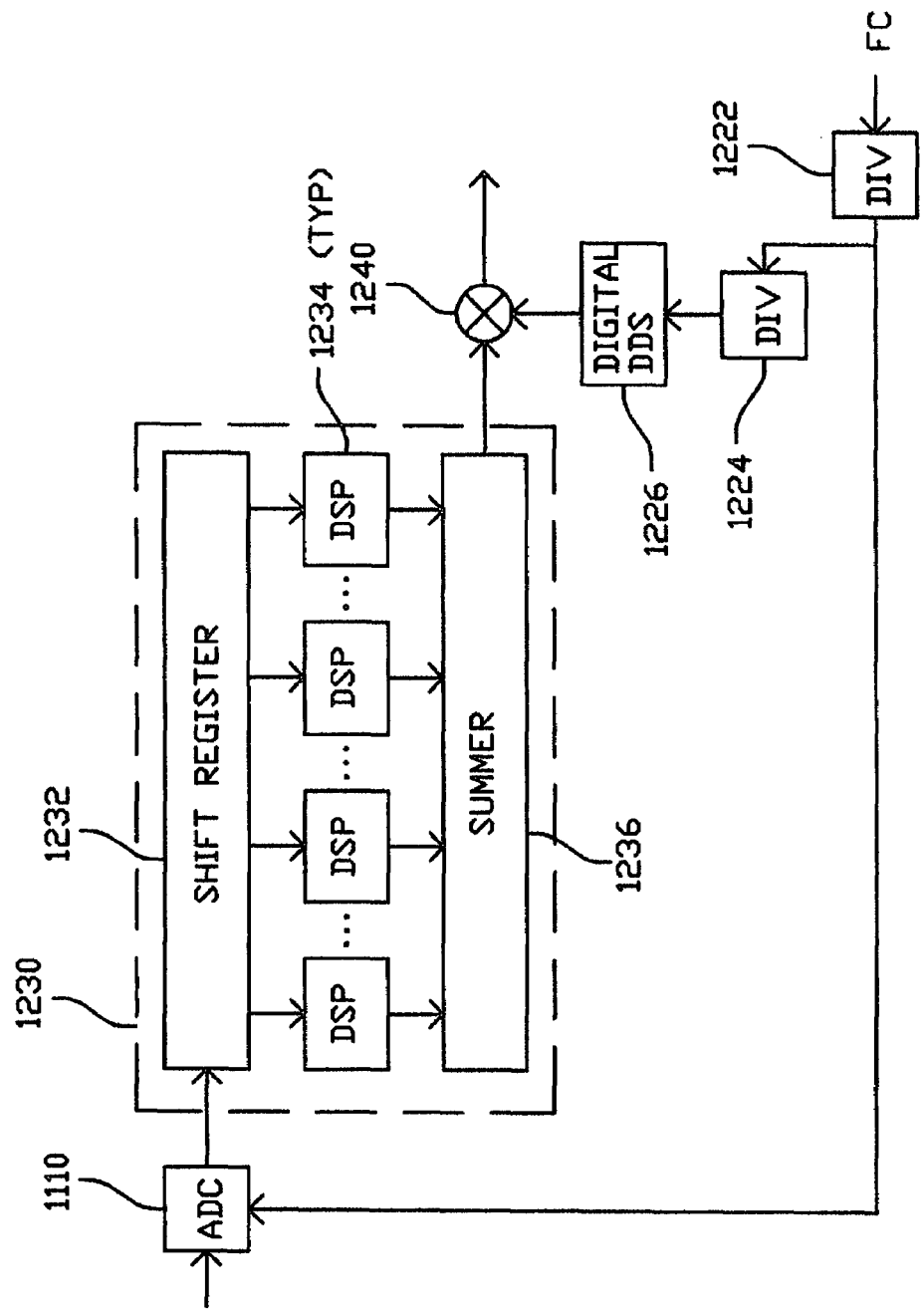
FIG. 29 is a schematic diagram depicting a representative portion of a FIR filter as used in examples of the present invention.

In FIG. 28, digital pre-processor 1200 includes a filter 1230. Filter 1230 is preferably a finite impulse response filter (FIR filter), sometimes called a transversal filter. FIG. 29 depicts are representative example of a FIR filter as FIR filter 1230. FIR filter 1230 includes shift register 1232, one or more digital signal processors 1234 (DSPs 1234) and a summer 1236.

FIG. 29 depicts only four of plural DSPs for clarity. In the present example 64 DSPs are used but more or fewer DSPs could be used. Shift register 1232 stores a series of 65,536 digital words received in sequence from ADC 1110 over a one-eighth second time period. This register length represents one-eighth of a second worth of samples when the ADC samples at 524,288 SPS. One 64$^{th}$ of shift register 1232 (i.e., 1,024 digital words) is allocated to each of the DSPs. Each DSP multiplies each of the 1,024 digital words by a corresponding filter weight and sums all of its multiplication products together before providing the sum at the output of the DSP. Summer 1236 sums the output of each of the DSPs.

The output of FIR filter 1230 is a sequence of digital words at a sample rate of 262,144 SPS to match the sample rate out of digital DDS 1226. Each DSP 1234 is budgeted about 3.8 microseconds to perform its allocation of 1,024 multiplies and adds. Each DSP must then be able to process its allocation of multiplies and adds at a rate that approximates 269 MSPS. When faster DSPs are available fewer DSPs are needed. If only slower DSPs are available, more DSPs are needed. The length of shift register 1232 and the filter weights used in FIR filter 1230 enable a filter to be implemented that has a time constant of one-eighth of a second and a bandwidth of about 8 Hz. Preferably, the filter weights are complex numbers and their accumulated sum is a complex number.

Digital DDS 1226 includes a phase memory of 262,144 addresses storing both sine and cosine values for angles between 0 and 360 degrees. Actually, good design and some basic trigonometry can reduce the memory requirement to 32,768 addresses by taking advantage of some symmetry, if desired. In any event, address 1 corresponds to an angle of 0.001373291 degrees, address 2 corresponds to an angle of 0.002746582 degrees and so forth up to address 262,144 that corresponds to an angle of 360 degrees. The frequency at the output of digital DDS 1226 is given by:

$$F_{out} = \frac{M}{2^{18}} \cdot FC. \qquad (23)$$

The length of the phase table in this example is 262,144, and that equals $2^{18}$. In the present example, the phase increment value M is 62,852 and the clock frequency FC at which the phase accumulator is clock is 262,144 SPS. Therefore, the output frequency $F_{out}$ is 62,852 Hz.

The output of summer 1236 is a carrier signal with a frequency of 62,916⅜ Hz, and this carrier signal is coupled to a first input of multiplier 1240. The output of digital DDS 1226 is a LO signal with a frequency of 62,852 Hz, and this LO signal is coupled to a second input to multiplier 1240. Multiplier 1240 performs 262,144 multiplies per second to keep up with the processing rate. Multiplier 1240 is a digital mixer that produces sum and difference frequencies. The sum frequency is equal to 62,916⅜ Hz plus 62,852 Hz, and the sum is equal to 125,768⅜ Hz. The difference frequency is equal to 62,916⅜ Hz minus 62,852 Hz, and the difference is equal to 64⅜ Hz. A properly designed low pass filter can easily eliminate the sum frequency. Alternatively, discrete Fourier transformer 260 and 270 (see DFTs 260, 270 of FIG. 4) can eliminate the sum frequency because the center frequency of each DFT is much lower than 125,768⅜ Hz.

Figure 30:
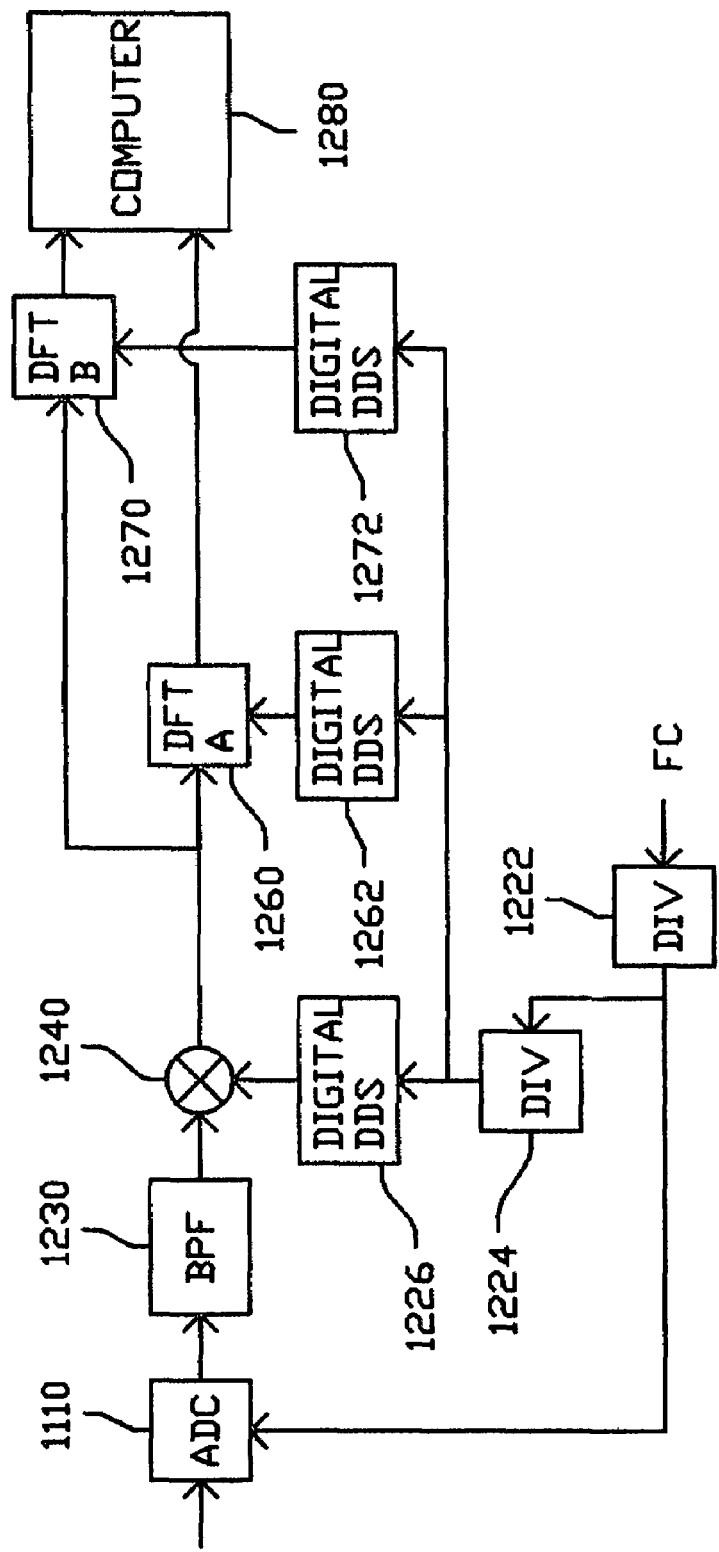
FIG. 30 is a schematic diagram depicting an additional portion of the processor partially depicted in FIG. 28 as used in examples of the present invention.

FIG. 30 depicts an additional portion of an embodiment of processor 200 of FIGS. 2 and 4. FIG. 30 depicts DFT 1260, digital DDS 1262, DFT 1270, digital DDS 1272 and computer 1280. DFT 1260 is an example of DFT 260 of FIG. 4. DFT 1270 is an example of DFT 270 of FIG. 4. Computer 1280 is an example of computer 280 of FIG. 4.

Digital DDS 1262 provides the weights required for DFT 1260. See FIG. 9 for details of the connection. In this example, the phase table for digital DDS 1262 is the same length as the phase table used in digital DDS 1226 (i.e., 262,144 for 360 degrees), although in general, it need not be the same. In digital DDS 1262, the phase increment value M is 44, and the clock frequency FC at which the phase accumulator is clocked is 262,144 SPS. Therefore, the output frequency $F_{out}$ is 44 Hz. Digital DDS 1262 provides weights to DFT 1260, preferably in the form of complex values of a sinusoidal wave sampled at 262,144 SPS.

Similarly, in digital DDS 1272, the phase increment value M is 84, and the clock frequency FC at which the phase accumulator is clocked is 262,144 SPS. Therefore, the output frequency $F_{out}$ is 84 Hz. Digital DDS 1272 provides weights to DFT 1270, preferably in the form of complex values of a sinusoidal wave sampled at 262,144 SPS.

A frequency discriminator is implemented within computer 1280 as discussed herein with respect to equation 6 and FIG. 4. DFT 1260 filters the output of mixer 1240 through a discrete Fourier transform with center frequency of 44 Hz, and DFT 1270 filters the output of mixer 1240 through a discrete Fourier transform with center frequency of 84 Hz. The center of the frequency discriminator is 64 Hz, and the carrier signal upon which is modulated the frequency difference to be determined has a carrier frequency equal to 64⅜ Hz. The carrier signal without any modulation will be detected as a ⅜ Hz frequency bias. This frequency bias will have to be accounted for since the frequency difference, between signals on antennas 102 and 104, that is to be detected is measured as a difference from this ⅜ Hz frequency bias.

One way to account for this frequency bias is to use a larger phase table. For example, the phase table for digital DDS 1262 could be eight times the length of the phase table used in digital DDS 1226 (i.e., eight times the length is $2^{21}$=2,097, 152 for 360 degrees). In digital DDS 1262, the phase increment value M is 355, and the clock frequency FC at which the phase accumulator is clocked is 262,144 SPS. Therefore, the output frequency $F_{out}$ is 44⅜ Hz. Digital DDS 1262 provides weights to DFT 1260, preferably in the form of complex values of a sinusoidal wave sampled at 262,144 SPS. Similarly, in digital DDS 1272, the phase increment value M is 675, and the clock frequency FC at which the phase accumulator is clocked is 262,144 SPS. Therefore, the output frequency $F_{out}$ is 84⅜ Hz. Digital DDS 1272 provides weights to DFT 1270, preferably in the form of complex values of a sinusoidal wave sampled at 262,144 SPS.

When the fractional part of the carrier frequency is not an integer multiple of a power of ½ (e.g., ⅜), it may not be easy arrange digital DDSs 1262 and 1272 so that the frequency discriminator implemented in computer 1280 has a center null exactly equal to the carrier frequency of the signal out of multiplier 1240. A small frequency bias results and must be dealt with by making a corresponding correction to the apparent frequency bias.

In some examples where the processor includes a clock source and a processor front end (e.g., 1100, FIG. 28) as discussed above, the processor further includes a first numerically controlled oscillator (e.g., 1262, FIG. 30) to generate a weight signal and a Fourier transformer (e.g., 1260, FIG. 30) coupled to the weight signal and an output of the analog to digital converter (e.g., 1110, FIG. 28). However, the coupling of the Fourier transformer and the analog to digital converter (e.g., 1110, FIG. 28) may include intervening filters, mixers and other signal processing elements. Numerical controlled oscillator 1262 (NCO 1262) is like a DDS (e.g., FIG. 15), but without the digital to analog converter (618, FIG. 15). NCO 1262 is operable to generate a weight signal based on the signal FC from the clock source. A Fourier weight signal is typically a sampled sinusoidal signal. Each sample is usually a digitized expression of the sample, and often a complex digital word.

In operation, a first weight signal is generated based on the signal FC from the clock source. A corresponding first Fourier transform is formed from the first weight signal and a signal derived from the digitized down converted signal.

In some other examples where the processor includes a clock source and a processor front end (e.g., 1100, FIG. 28) as discussed above, the processor further includes a first numerically controlled oscillator (e.g., 1262, FIG. 30) to generate a first weight signal, a second numerically controlled oscillator (e.g., 1272, FIG. 30) to generate a second weight signal, a first Fourier transformer (e.g., 1260, FIG. 30) coupled to the first weight signal and an output of the analog to digital converter (e.g., 1110, FIG. 28), and a second Fourier transformer (e.g., 1270, FIG. 30) coupled to the second weight signal and the output of the analog to digital converter (e.g., 1110, FIG. 28).

Although the coupling of the Fourier transformer and the analog to digital converter may include intervening signal processing elements, the first and second Fourier transformers process the same signal whether it be directly from the analog to digital converter or a derived signal from signal processing elements. Typically, the first and second weight signals are characterized by predetermined first and second weight frequencies respectively, and the first and second weight frequencies are different from one another.

In operation, a first weight signal is generated based on the signal from the clock source, and a second weight signal is generated based on the signal from the clock source. A first Fourier transform is formed from the first weight signal and a signal derived from the digitized down converted signal. A second Fourier transform is formed from the second weight signal and the signal derived from the digitized down converted signal and the second weight signal. Typically, the first and second weight signals are characterized by first and second predetermined weight frequencies respectively, and the first and second weight frequencies are different from one another.

Figure 31:
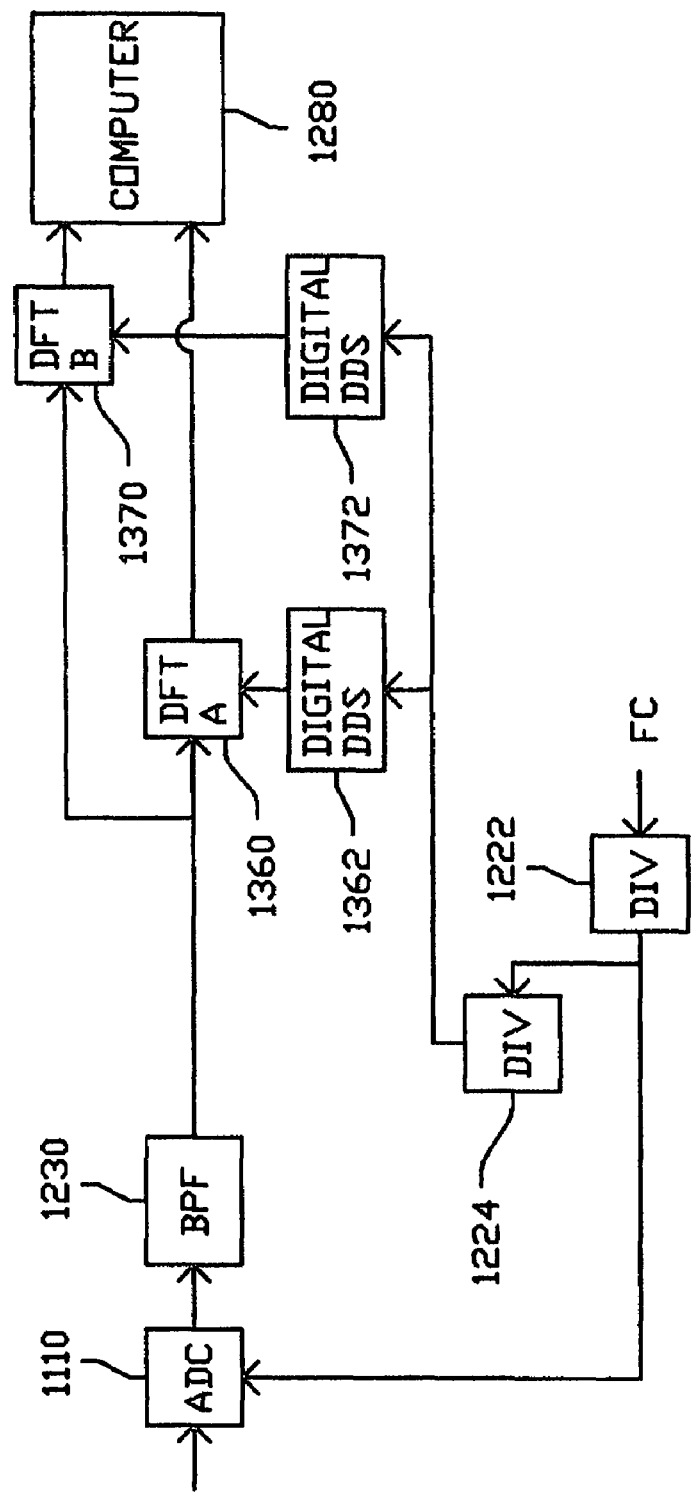
FIG. 31 is a schematic diagram depicting an alternative to the additional portion of the processor depicted in FIG. 30 as used in examples of the present invention.

FIG. 31 depicts another approach. In FIG. 31, the output of filter 1230 is coupled directly to DFT 1360 and DFT 1370. Digital DDSs 1362 and 1372 provide complex values of the DFT weights to DFT 1360 and DFT 1370, respectively.

As discussed above, the phase table for digital DDS 1362 is eight times the length of the phase table used in digital DDS 1226 of FIGS. 28 and 29. The length of the phase table in digital DDS 1362 is $2^{21}=2,097,152$ for 360 degrees. In digital DDS 1362, the phase increment value M is 503,171, and the clock frequency FC at which the phase accumulator is clocked is 262,144 SPS. Therefore, the output frequency $F_{out}$ is 62,896⅜ Hz. Digital DDS 1362 provides weights to DFT 1360, preferably in the form of complex values of a sinusoidal wave sampled at 262,144 SPS. Similarly, in digital DDS 1372, the phase increment value M is 503,491, and the clock frequency FC at which the phase accumulator is clocked is 262,144 SPS. Therefore, the output frequency $F_{out}$ is 62,936⅜ Hz. Digital DDS 1372 provides weights to DFT 1370, preferably in the form of complex values of a sinusoidal wave sampled at 262,144 SPS.

Two issues should be addressed with respect to the improvement disclosed herein. First, the narrow band requirements imposed on digital FIR filter 1230 are computationally burdensome, and in particular, burdensome on the number of multiplies and adds that are required each second. The second issue to be addressed is that many emitters are pulsed emitters, at least for emitters in the class that are to be ranged on.

A pulsed emitter may have a pulse duration (PD) that is only one-tenth of one percent of the pulse repetition interval (PRI). For much of the timeline, the receiver will be integrating noise, and the pulse duration may be so short that ADC 1110 may miss the pulse altogether when sampled at 524,288 SPS. One-microsecond pulses would have just a little over a 50% probability of being sampled by ADC 1110. It is desirable to increase the sample rate, but this adds even more computational burden.

Technology help may be found in some developing technologies used in cell phones and wireless Internet connections. A technology generally referred to as software defined radio (SDR) has been developing rapidly. A software defined radio typically has an RF front end, an ADC, a digital pre-processor and a DSP. Typical of this technology is an ADC such as AD6600 manufactured by Analog Devices™ and a digital down converter (hereinafter DDC) as a digital pre-processor such as AD6620 manufactured by Analog Devices™. Such a pre-processor is often followed by a DSP.

In order to better detect short pulsed emitter signals, the bandwidth of the pass band of DR band pass filters 152 and 172 (see FIG. 26) is increased to about 3½ MHz. Such a filter might be made as a stripline filter instead of a dielectric resonator. An ADC triggered at a rate of up to 3 MSPS to convert a signal within such bandwidth to a complex value (i.e., I and Q or magnitude and phase) should produce statistically independent (i.e., uncorrelated) samples. Similarly, an ADC triggered at a rate of up to 6 MSPS to convert a signal within such bandwidth to a real value should produce statistically independent (i.e., uncorrelated) samples. Therefore, the bandwidth of the pass band of band pass filter 1092 (see FIG. 27) is also increased to about 3½ MHz.

Figure 32:
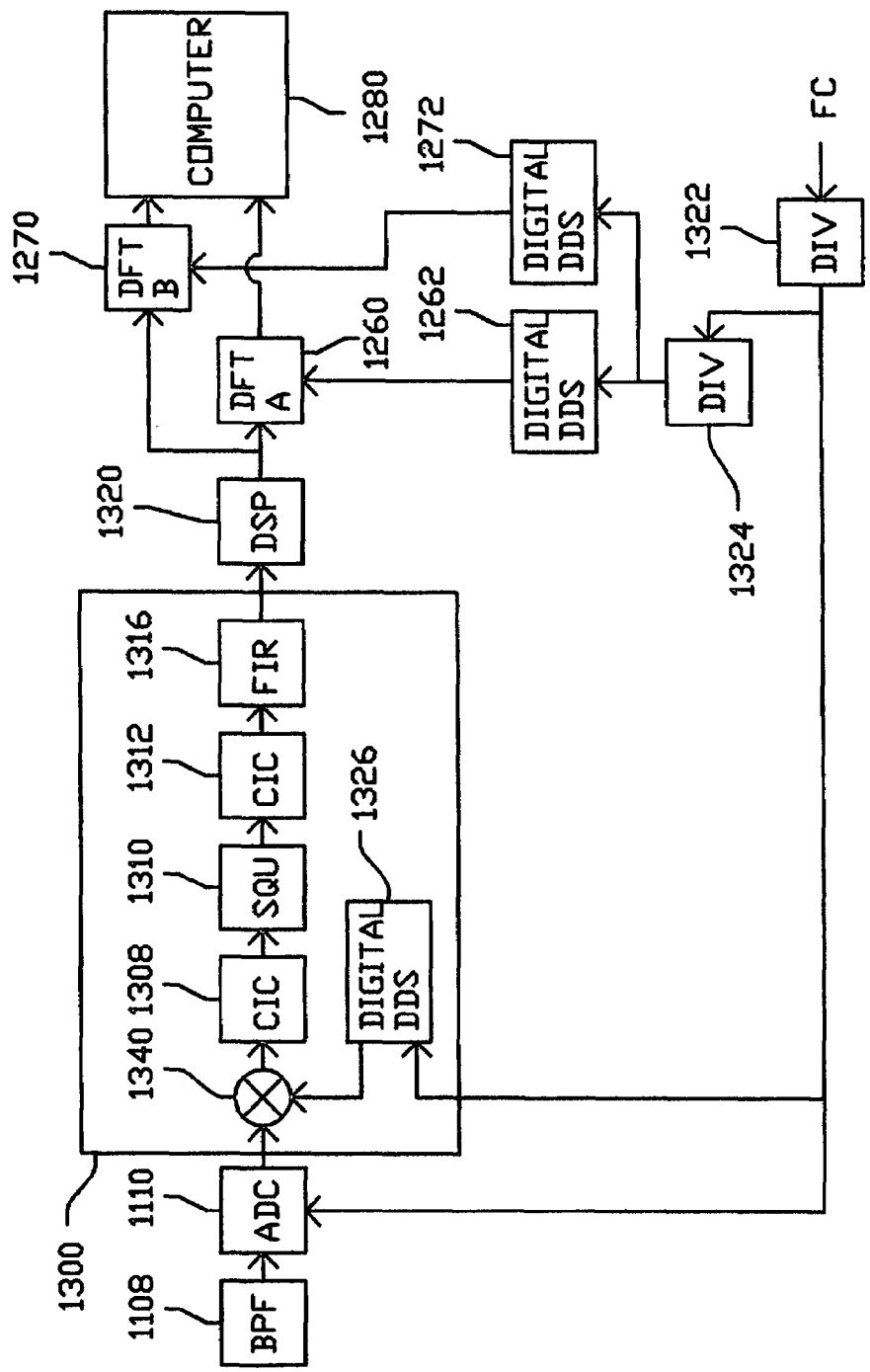
FIG. 32 is a schematic diagram depicting an alternative using a digital down converter to the additional portion of the processor depicted in FIG. 30 as used in examples of the present invention.

FIG. 32 depicts an embodiment of the improvement described herein in which a digital down converter (DDC) is used. In FIG. 32, band pass filter 1108 and ADC 1110 are examples of the band pass filter 1108 and ADC 1110 depicted in FIG. 28. However, the band pass of filter 1108 in FIG. 32 is broadened to 3½ MHz to be able to detect short pulses. It is important to remember that while 62,916⅜ Hz is the carrier frequency through band pass filter 1108 (in this example), this carrier frequency has been gated by a pulse function. The duty cycle of the pulses may be very low. Therefore, it is desirable to sample the signal passing through band pass filter 1108 at a very high rate. In this example, pulse divider 1322 divides pulses from the FC clock by twelve (12) to provide the sample triggers to ADC 1110 at a rate of 67,108,864 SPS, and the phase increment of the carrier signal increases from sample to sample by about one-third of a degree. Although this appears to be serious over sampling (in a Nyquist sense), it is important to remember that the carrier signal is pulsed on and off by a pulse signal that may have very short pulse duration. Such short pulses have high frequency spectral components when subjected to Fourier analysis. The high sample rate is needed and desired.

In FIG. 32, the output of ADC 1110 is coupled to DDC 1300. An example of a DDC is AD6620 manufactured by Analog Devices™, although the design of any specific DDC may differ. Common to most DDCs is the digital DDS 1326 (sometimes called a numerical controlled oscillator NCO) and multiplier 1340 (sometimes called a mixer). Digital DDS 1326 is an example of digital DDS 1226 depicted in FIG. 28, and multiplier 1340 is an example of multiplier 1240 depicted in FIG. 28. Preferably digital DDS 1326 provides both the digital sine and cosine signals (i.e., in-phase and quadrature-phase signals) as a series of complex numbers (digital words). The ADC typically provides a series of real digital words, and multiplier 1340 multiplies the real input by the complex local oscillator input to produce a complex signal output. In this example, digital DDS 1326 provides a signal having a frequency of 62,980⅜ Hz. Since 62,916⅜ Hz is the carrier frequency through band pass filter 1108, the lower sideband signal output from the digital mixer (multiplier 1340) is a carrier signal having a frequency of 64 Hz, at least in the present example.

The remaining circuits in DDC 1300 of FIG. 32 include cascaded integrator-comb filter 1308 (CIC filter 1308), squelch circuit 1310, cascaded integrator-comb filter 1312 (CIC filter 1312) and finite impulse response filter 1316 (FIR filter 1316). The function of these circuits will now be explained.

The frequency of the signal output from mixer 1340 is only 64 Hz, but this signal is ridiculously over sampled at a rate of 67,108,864 SPS. One reason for the high sampling rate is that the signals from many emitters are pulsed signals. As discussed herein, the band passes of filters 152 and 172 of FIG. 26 and of filter 1092 of FIG. 27 have been set to about 3½ MHz so that signal bandwidths of 3 MHz can be processed. Sample rates in excess of 6 MSPS (i.e., the Nyquist sample rate for real samples) will not be statistically independent of one another. It is thus unnecessary to carry the high sample rate through the entire process. Therefore and in order to economize the processing, the sample rate needs to be reduced without loosing information content. This is a process called decimation. Integrator-comb filter 1308 (CIC filter 1308) can decimate the signal as well as filter the signal. In the present example, CIC filter 1308 is set to filter the signal and decimate the signal by a factor of 8:1. The sample rate at the output of CIC filter 1308 is 8,388,608 SPS in this example. This rate is just a little over the rate above which statistical independence of the samples cannot be assured because of bandwidth limitation in filters. The filtering process is discussed below with respect to CIC filter 1312.

In yet other examples where the processor includes a clock source and a processor front end (e.g., 1100, FIG. 28) as discussed above, the processor further includes a first numerically controlled oscillator (e.g., 1326, FIG. 32) and a digital down converter 1300 that includes a digital mixer 1340. NCO 1326 is operable to generate a digital oscillator signal based on the signal FC from the clock source. Digital mixer 1340 is coupled to NCO 1326 and coupled, directly or indirectly to the analog to digital converter 1110. In some of these embodiments digital down converter 1300 includes a cascaded integrator-comb filter (i.e., a CIC filter) coupled to digital mixer 1340. In FIG. 32, CIC filter is coupled to digital mixer 1340.

In operation, a first digital oscillator signal is generated based on the signal FC from the clock source, and the first digital oscillator signal is heterodyned with either the digitized down converted signal directly from analog to digital converter 1110 or a signal derived from the digitized down converted signal. In some of these operations a result of the heterodyning is filtered in a cascaded integrator-comb filter 1308.

In some other examples where the processor includes a clock source and a processor front end, a first numerically controlled oscillator, and a digital down converter as discussed above, the processor further includes a second numerically controlled oscillator (NCO 1262), and a first Fourier transformer 1260. In FIG. 32, NCO 1262 is operable to generate a weight signal based on the signal FC from the clock source. First Fourier transformer 1260 is coupled to the first weight signal and coupled, directly or indirectly, to an output of the digital down converter 1300.

In operation, a first weight signal is generated based on the signal FC from the clock source. A corresponding first Fourier transform is formed from the first weight signal and a signal derived from a result of the heterodyning.

In still other examples where the processor includes a clock source and a processor front end, a first numerically controlled oscillator, and a digital down converter as discussed above, the processor further includes a second numerically controlled oscillator (NCO 1262), a first Fourier transformer 1260, a third numerically controlled oscillator (NCO 1272), and a second Fourier transformer 1270. NCO 1262 is operable to generate a first weight signal based on the signal FC from the clock source. The first Fourier transformer 1260 is coupled to the first weight signal and coupled, directly or indirectly, to an output of the digital down converter 1300. NCO 1272 is operable to generate a second weight signal based on the signal FC from the clock source. The second Fourier transformer is coupled to the second weight signal and coupled, directly or indirectly, to the output of the digital down converter 1300. Typically, the first and second weight signals are characterized by predetermined first and second weight frequencies respectively, and the first and second weight frequencies are different from one another.

In operation, a first weight signal is generated based on the signal FC from the clock source, and a second weight signal is generated based on the signal FC from the clock source. A corresponding first Fourier transform is formed from the first weight signal and a signal derived from a result of the heterodyning, and a corresponding second Fourier transform is formed from the second weight signal and a signal derived from a result of the heterodyning. Typically, the first and second weight signals are characterized by first and second predetermined weight frequencies respectively, and the first and second weight frequencies are different from one another.

The signal out of CIC filter 1308 is input to squelch circuit 1310. The purpose of squelch circuit 1310 is to detect when a pulse signal is present. When the signal magnitude exceeds a predetermined threshold, the signal is passed through squelch circuit 1310. When the signal is less than the threshold, the value zero is substituted for the signal so noise is not further integrated into the signal. The signal into squelch circuit 1310 is a series of complex digital words, each complex word representing an in-phase component (I) and a quadrature-phase component (Q). The magnitude squared of the signal is simply I squared plus Q squared since the magnitude is the hypotenuse of a right triangle whose sides are I and Q. However, multiplying to form squares and forming square roots are computationally intensive processes. A less computationally intensive process exists to detect when the magnitude of the signal is greater than a predetermined threshold. The magnitude is approximated from the formula:

$$\text{Magnitude}=\text{MAX}(I,Q)+\tfrac{3}{8}\text{MIN}(I,Q). \quad (24)$$

The maximum between two numbers and the minimum between two numbers can be determined without multiplies. The ⅜ scaling is formed by simply shifting digital representations of MIN to form one-half MIN, shifting digital representations of ½ MIN to form one-eighth MIN, and subtracting one-eighth from ½ to form ⅜ MIN(I, Q) which is then added to the MAX function. No multiplies are necessary. A closer approximation is achieved by replacing ⅜ (i.e., 0.375) with 0.407 but this would require a multiply.

The approximated magnitude of the signal computed as described herein is compared to a predetermined threshold to decide whether a signal is present or not. For example, the two numbers are subtracted and the sign bit tells whether the threshold is exceeded. If the signal is greater than the threshold, the signal is passed through squelch circuit 1310. If the threshold is not exceeded, a zero is substituted for the signal at the output for squelch circuit 1310. The consequences resulting from a single complex word being erroneous (determined to be above the threshold) is only that a single word of noise (a low power signal anyway) is integrated into the accumulated filter output. This single word of noise would be of little consequence. However, there is no sense in accumulating noise in a CIC filter if it can be avoided, and squelch circuit 1310 helps avoid the accumulation of noise.

The output of squelch circuit 1310 is coupled to the input of cascaded integrator-comb filter 1312 (CIC filter 1312). CIC filter 1312 is designed to further decimate that sample rate by a ratio of 32:1. The output of CIC filter 1312 is a series of digital words at a rate of 262,144 SPS.

The two basic building blocks of a CIC filter are an integrator and a comb. The integrator is a single-pole infinite impulse response filter with a unity feedback coefficient and is sometimes called an accumulator. The comb filter is an odd-symmetric finite impulse response filter easily adapted for decimation and is sometimes called a transversal filter. The integrator has a power response of a low pass filter with a −20 dB per decade rolloff, and its output is given by:

$$y[n]=y[n-1]+x[n], \quad (25)$$

and its transfer function in the z-plane is:

$$H_I[z] = \frac{1}{1-z^{-1}}. \quad (26)$$

The comb filter has a power response of a high pass filter with a 20 dB per decade gain, and its output is given by:

$$y[n]=x[n]-y[n-RM] \quad (27)$$

where R is the decimation rate and M is a differential delay design parameter. The comb filter transfer function in the z-plane is:

$$H_C[z]=1-z^{-RM}. \quad (28)$$

A CIC decimating filter is constructed by cascading one or more integrators followed by one or more comb filters sampled at a reduced (i.e., decimated) sample rate. The transfer function of such a CIC filter is given by:

$$H[z] = H_I^N[z] \cdot H_C^N[z] = \frac{(1-z^{-RM})^N}{(1-z^{-1})^N} \quad (29)$$

where N is the number of stages of integrators and stages of comb filters. Such a filter is equivalent to an N stage FIR filter. For more explanation of the principals of a CIC filter, refer to E. B. Hogenauer, "An Economical Class Of Digital Filters For Decimation And Interpolation," *IEEE Transactions On Acoustics, Speech And Signal Processing*, ASSP-29(2): 155-162, 1981. It is the discovery of the extreme narrow band nature of the signal passing through band pass filter 1108 and the requirement for a very high sample rate of ADC 1110 necessitated by the narrow pulse nature of many emitter signals in the present application that are new, not the operating principals of the CIC filter.

The output of CIC filter 1312 is coupled to the input of FIR filter 1316. FIR filter 1316 operates similarly to filter 1230 depicted in FIG. 29. In the present example, FIR filter 1316 includes a shift register with 256 taps (and 256 multiplies) and is designed to decimate the signal at a ratio of 4:1. The filter length is 256 taps, is clocked at 262,144 SPS, holds almost one millisecond of information, and therefore, has a corresponding bandwidth of 1,024 Hz. Since the signal is decimated at a ratio of 4:1, the 1,024 Hz bandwidth signal is output at a rate of 65,536 SPS.

In FIG. 32, the output of FIR filter 1316 is coupled to DSP 1320. DSP 1320 further implements a FIR filter without further decimation. The filter length is 8,192 taps, is clocked at 65,536 SPS, holds one-eighth of a second of information, and therefore, has a corresponding bandwidth of 8 Hz. Since the signal is not further decimated, the 8 Hz bandwidth signal is output at a rate of 65,536 SPS.

In FIG. 32, DFT 1260, digital DDS 1262, DFT 1270, digital DDS 1272 and computer 1280 operate similarly to the DFT 1260, the digital DDS 1262, the DFT 1270, the digital DDS 1272 and the computer 1280 depicted in FIG. 30. Digital DDS 1262 and digital DDS 1272 provide the weights to DFT 1260 and DFT 1270, respectively, at sample rates that match the sample rate out of DSP 1320, 65,536 SPS in this example. DFT 1260 and DFT 1270 may be implemented in a DSP, as a part of DSP 1320, as a part of computer 1280 or in discrete components, depending on the speed and memory capacity available.

A frequency discriminator is implemented within computer 1280 as discussed herein with respect to equation 6 and FIG. 4. DFT 1260 filters the output of DSP 1320 through a discrete Fourier transform with center frequency of, for example, 44 Hz. DFT 1270 filters the output of DSP 1320 through a discrete Fourier transform with center frequency of, for example, 84 Hz. The center of the frequency discriminator is 64 Hz, and the carrier signal upon which is modulated the frequency difference to be determined has a carrier frequency equal to 64 Hz. The center frequencies are symmetrically displaced about carrier frequency, 64 Hz in this example, although the displacement from the DFT center frequency to the carrier frequency need not be exactly 32 Hz as used in this example. The frequency difference between signals received at antennas 102 and 104 from a single emitter is determined within computer 1280 as discussed herein with respect to equation 6 and FIG. 4.

The frequency difference to be measured is of the order of magnitude of only one Hertz. Therefore, careful attention must be paid to any source of frequency error. These frequency error sources occur at mixers, multipliers or other frequency converters including discrete Fourier transforms, but the errors are caused by frequency errors in the local oscillator signals or DFT weight signals that drive the mixer, multiplier, frequency converter or DFT. To control the sources of error, all frequency sources in the present improvement are either derived from one central frequency source or the frequency source is "nulled out" or cancelled by the arrangement of circuits. In the present improvement, the central frequency source is the system clock FC. System clock FC controls the frequencies produced by digital DDSs 1262, 1272 and 1306 (FIG. 32), digital DDS 1226 (FIGS. 28-30), digital DDSs 1362 and 1372 (FIG. 31) and DDSs 1102 and 1104 (FIG. 28). The frequency source 310 (FIG. 5) in the example discussed herein is the sinusoidal signal based on system clock FC, but it may be any convenient frequency source since frequency source 310 is "nulled out." Similarly, frequency source 110 is "nulled out" in mixer 180 (see FIG. 3).

Having described preferred embodiments of a novel and improved processor for an angle rate interferometer (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set forth in the appended claims.

What is claimed is:

1. A receiver comprising an RF bridge and a processor coupled to the RF bridge to receive an information signal from the RF bridge, the processor including a clock source and a processor front end, the processor front end comprising:
   a first frequency source operable to generate a reference signal at a predetermined reference frequency based on a signal from the clock source, the reference signal being coupled to the RF bridge, the RF bridge being operable to provide the information signal at the predetermined reference frequency with a frequency difference modulated thereon, the frequency difference being a difference between frequencies of first and second RF signals received at respective first and second antennas;

a second frequency source operable to generate a first local oscillator signal based on the signal from the clock source;

a processor down converter operable to heterodyne the first local oscillator signal and the information signal; and an analog to digital converter coupled to the processor down converter and operable to provide a digitized down converted signal.

2. A receiver according to claim 1, wherein:

the first local oscillator signal is characterized by a predetermined local oscillator frequency;

the predetermined local oscillator frequency and the predetermined reference frequency are different from one another;

the processor front end further comprises a filter coupled between the processor down converter and the analog to digital converter;

the filter is characterized by a pass band that passes frequencies within a frequency band centered about a frequency equal to a difference between the predetermined local oscillator frequency and the predetermined reference frequency; and the filter is further characterized by a stop band that blocks frequencies within a frequency band centered about a frequency equal to a sum of the predetermined local oscillator frequency and the predetermined reference frequency.

3. A receiver according to claim 1, wherein the processor further comprises:

a first numerically controlled oscillator operable to generate a first weight signal based on the signal from the clock source; and a first Fourier transformer coupled to an output of the analog to digital converter and the first weight signal.

4. A receiver according to claim 1, wherein the processor further comprises:

a first numerically controlled oscillator operable to generate a first weight signal based on the signal from the clock source;

a first Fourier transformer coupled to an output of the analog to digital converter and the first weight signal;

a second numerically controlled oscillator operable to generate a second weight signal based on the signal from the clock source; and a second Fourier transformer coupled to the output of the analog to digital converter and the second weight signal.

5. A receiver according to claim 4, wherein:

the first and second weight signals are characterized by predetermined first and second weight frequencies respectively; and the first and second weight frequencies are different from one another.

6. A receiver according to claim 1, wherein the processor further comprises:

a first numerically controlled oscillator operable to generate a first digital oscillator signal based on the signal from the clock source; and a digital down converter that includes a digital mixer coupled to the analog to digital converter.

7. A receiver according to claim 6, wherein the digital down converter further includes a cascaded integrator-comb filter coupled to the digital mixer.

8. A receiver according to claim 6, wherein the processor further comprises:

a second numerically controlled oscillator operable to generate a first weight signal based on the signal from the clock source; and a first Fourier transformer coupled to an output of the digital down converter and the first weight signal.

9. A receiver according to claim 6, wherein the processor further comprises:

a second numerically controlled oscillator operable to generate a first weight signal based on the signal from the clock source;

a third numerically controlled oscillator operable to generate a second weight signal based on the signal from the clock source, the first and second weight signals being characterized by predetermined first and second weight frequencies respectively, the first and second weight frequencies being different from one another;

a first Fourier transformer coupled to an output of the digital down converter and the first weight signal;

a second Fourier transformer coupled to the output of the digital down converter and the second weight signal.

10. A receiver according to claim 1, wherein signals coupled between the RF bridge and the processor consist essentially of the reference signal and the information signal.

11. A method comprising:

generating a reference signal at a predetermined reference frequency based on a signal from a clock source, the reference signal being coupled to an RF bridge;

generating an information signal in the RF bridge at the predetermined reference frequency with a frequency difference modulated thereon, the frequency difference being a difference between frequencies of first and second RF signals received at respective first and second antennas;

generating a first local oscillator signal based on the signal from the clock source;

heterodyning the first local oscillator signal and the information signal to provide a heterodyned signal; and sampling the heterodyned signal in an analog to digital converter to provide a digitized down converted signal.

12. A method according to claim 11, further comprising filtering the heterodyned signal before sampling, wherein:

the first local oscillator signal is characterized by a predetermined local oscillator frequency;

the predetermined local oscillator frequency and the predetermined reference frequency are different from one another;

the filtering passes frequencies within a frequency band centered about a frequency equal to a difference between the predetermined local oscillator frequency and the predetermined reference frequency; and the filter further blocks frequencies within a frequency band centered about a frequency equal to a sum of the predetermined local oscillator frequency and the predetermined reference frequency.

13. A method according to claim 11, further comprising:

generating a first weight signal based on the signal from the clock source; and forming a first Fourier transform from a signal derived from the digitized down converted signal and the first weight signal.

14. A receiver according to claim 11, further comprising:

generating a first weight signal based on the signal from the clock source;

generating a second weight signal based on the signal from the clock source;

forming a first Fourier transform from a signal derived from the digitized down converted signal and the first weight signal; and forming a second Fourier transform from the signal derived from the digitized down converted signal and the second weight signal.

15. A method according to claim 14, wherein:

the first and second weight signals are characterized by first and second predetermined weight frequencies respectively; and the first and second weight frequencies are different from one another.

16. A method according to claim 11, further comprising:

generating a first digital oscillator signal based on the signal from the clock source; and heterodyning the first digital oscillator signal and one of the digitized down converted signal directly and a signal derived from the digitized down converted signal.

17. A method according to claim 16, further comprising filtering a result of the heterodyning in a cascaded integrator-comb filter.

18. A method according to claim 16, further comprising:

generating a first weight signal based on the signal from the clock source; and forming a first Fourier transform from a signal derived from a result of the heterodyning and the first weight signal.

19. A method according to claim 16, further comprising:

generating a first weight signal based on the signal from the clock source;

generating a second weight signal based on the signal from the clock source, the first and second weight signals being characterized by first and second predetermined weight frequencies respectively, the first and second weight frequencies being different from one another;

forming a first Fourier transform from a signal derived from a result of the heterodyning and the first weight signal; and forming a second Fourier transform from the signal derived from the result of the heterodyning and the second weight signal.

20. A receiver comprising an RF bridge and a processor coupled to the RF bridge to receive an information signal from the RF bridge, the processor including a digital clock source and a processor front end, the processor front end comprising:

a first frequency source operable to generate a reference signal based on a signal from the digital clock source, the reference signal being coupled to the RF bridge;

a second frequency source operable to generate a first local oscillator signal based on the signal from the digital clock source;

a processor down converter operable to heterodyne the first local oscillator signal and the information signal; and an analog to digital converter coupled to the processor down converter and operable to provide a digitized down converted signal at a sample rate derived from the digital clock source.

21. A receiver according to claim 20, wherein:

the reference signal is characterized by a predetermined reference frequency;

the first local oscillator signal is characterized by a predetermined local oscillator frequency;

the predetermined local oscillator frequency and the predetermined reference frequency are different from one another;

the processor front end further comprises a filter coupled between the processor down converter and the analog to digital converter;

the filter is characterized by a pass band that passes frequencies within a frequency band centered about a frequency equal to a difference between the predetermined local oscillator frequency and the predetermined reference frequency; and the filter is further characterized by a stop band that blocks frequencies within a frequency band centered about a frequency equal to a sum of the predetermined local oscillator frequency and the predetermined reference frequency.

22. A receiver according to claim 20, wherein the processor further comprises:

a first numerically controlled oscillator operable to generate a first weight signal based on the signal from the digital clock source; and a first Fourier transformer coupled to an output of the analog to digital converter and the first weight signal.

23. A receiver according to claim 20, wherein the processor further comprises:

a first numerically controlled oscillator operable to generate a first digital oscillator signal based on the signal from the digital clock source; and a digital down converter that includes a digital mixer coupled to the analog to digital converter.

24. A receiver according to claim 23, wherein the digital down converter further includes a cascaded integrator-comb filter coupled to the digital mixer.

25. A receiver according to claim 20, wherein signals coupled between the RF bridge and the processor consist essentially of the reference signal and the information signal.

* * * * *